United States Patent
Hart et al.

(10) Patent No.: US 10,620,344 B2
(45) Date of Patent: Apr. 14, 2020

(54) LOW CONTRAST ANTI-REFLECTION ARTICLES WITH REDUCED SCRATCH AND FINGERPRINT VISIBILITY

(71) Applicant: Corning Incorporated, Corning, NY (US)

(72) Inventors: Shandon Dee Hart, Corning, NY (US); Karl William Koch, Elmira, NY (US); Charles Andrew Paulson, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 148 days.

(21) Appl. No.: 15/313,733

(22) PCT Filed: May 22, 2015

(86) PCT No.: PCT/US2015/032138
§ 371 (c)(1),
(2) Date: Nov. 23, 2016

(87) PCT Pub. No.: WO2015/179739
PCT Pub. Date: Nov. 26, 2015

(65) Prior Publication Data
US 2017/0199307 A1    Jul. 13, 2017

Related U.S. Application Data

(60) Provisional application No. 62/002,466, filed on May 23, 2014.

(51) Int. Cl.
| | | |
|---|---|---|
| G02B 1/11 | (2015.01) | |
| G02B 1/115 | (2015.01) | |
| C03C 17/34 | (2006.01) | |

(52) U.S. Cl.
CPC ............ *G02B 1/11* (2013.01); *C03C 17/3417* (2013.01); *C03C 17/3435* (2013.01); *G02B 1/115* (2013.01); *C03C 2217/734* (2013.01)

(58) Field of Classification Search
CPC combination set(s) only.
See application file for complete search history.

(56) References Cited

U.S. PATENT DOCUMENTS

| | | | |
|---|---|---|---|
| 4,128,303 A | 12/1978 | Onoki et al. | |
| 4,966,437 A | 10/1990 | Rahn | |
| (Continued) | | | |

FOREIGN PATENT DOCUMENTS

| | | |
|---|---|---|
| CN | 102850761 A | 1/2013 |
| CN | 103395247 A | 11/2013 |
| (Continued) | | |

OTHER PUBLICATIONS

International Search Report and Written Opinion of the International Searching Authority; PCT/US2015/032138; dated Oct. 28, 2015.

(Continued)

*Primary Examiner* — Anthony J Frost

(57) ABSTRACT

Embodiments of articles including a low-contrast anti-reflection coating are disclosed. The coated surface of such articles exhibits a reduced difference in reflectance between a pristine state and when a surface defect is present. In one or more embodiments, the coated surface of such articles exhibits a first average reflectance in the range from about 0.6% to about 6.0% in a pristine condition and a second average reflectance of about 8% or less after removal of a surface thickness of the anti-reflection coating. In other embodiments, the coated substrate exhibits a second average reflectance of about 10% or less, when the coated surface comprises a contaminant. In some embodiments, the coated substrate exhibits a first color coordinate ($a^*_1$, $b^*_1$) in a pristine condition and a second color coordinate ($a^*_2$, $b^*_2$) after the presence of a surface defect such that $\Delta a^*b^*$ is about 6 or less.

20 Claims, 37 Drawing Sheets

(56) References Cited

U.S. PATENT DOCUMENTS

| | | | |
|---|---|---|---|
| 4,995,684 A | 2/1991 | Tustison et al. | |
| 5,847,876 A * | 12/1998 | Ferrante | C03C 17/3452 |
| | | | 359/581 |
| 5,948,481 A | 9/1999 | Yan et al. | |
| 8,287,994 B2 * | 10/2012 | Fukawa | C03C 17/3441 |
| | | | 428/212 |
| 8,312,739 B2 | 11/2012 | Lee et al. | |
| 8,561,429 B2 | 10/2013 | Allan et al. | |
| 8,982,466 B2 | 3/2015 | Neuffer | |
| 9,359,261 B2 | 6/2016 | Bellman et al. | |
| 2007/0285776 A1 | 12/2007 | Nakamura et al. | |
| 2011/0064943 A1 | 3/2011 | Wang | |
| 2012/0275026 A1 | 11/2012 | Zhou et al. | |
| 2013/0135741 A1 | 5/2013 | Lee et al. | |
| 2013/0176615 A1 | 7/2013 | Uefuji et al. | |
| 2014/0334006 A1 | 11/2014 | Adib et al. | |
| 2015/0279633 A1 | 10/2015 | Carducci et al. | |

FOREIGN PATENT DOCUMENTS

| | | | |
|---|---|---|---|
| JP | 07116623 A | 5/1995 | |
| JP | 08094805 A | 4/1996 | |
| JP | 2000171630 A | 6/2000 | |
| JP | 2006017870 A | 1/2006 | |
| JP | 2009122416 A | 6/2009 | |
| JP | 2010167744 A | 8/2010 | |
| JP | 2014071166 A | 4/2014 | |
| WO | 2000031569 A1 | 6/2000 | |

OTHER PUBLICATIONS

Southwell, "Coating design using very thin high-and low-index layers," Applied Optics, vol. 24, Issue 4, pp. 457-460, (Feb. 15, 1985).

Oliver, W.C.; Pharr, G. M. An improved technique for determining hardness and elastic modulus using load and displacement sensing indentation experiments. J. Mater. Res., vol. 7, No. 6, 1992, 1564-1583.

Oliver, W.C.; Pharr, G.M. Measurement of Hardness and Elastic Modulus by Instrument Indentation: Advances in Understanding and Refinements to Methodology. J. Mater. Res., vol. 19, No. 1, 2004, 3-20.

English Translation of CN201580039267.4 Office Action dated Jan. 22, 2018; 9 pages; Chinese Patent Office.

English Translation of TW104116507 Search Report dated Mar. 14, 2019, Taiwan Patent Office, 1 Pg.

English Translation of JP2016568004 Office Action dated Mar. 6, 2019, Japan Patent Office, 6 Pgs.

* cited by examiner

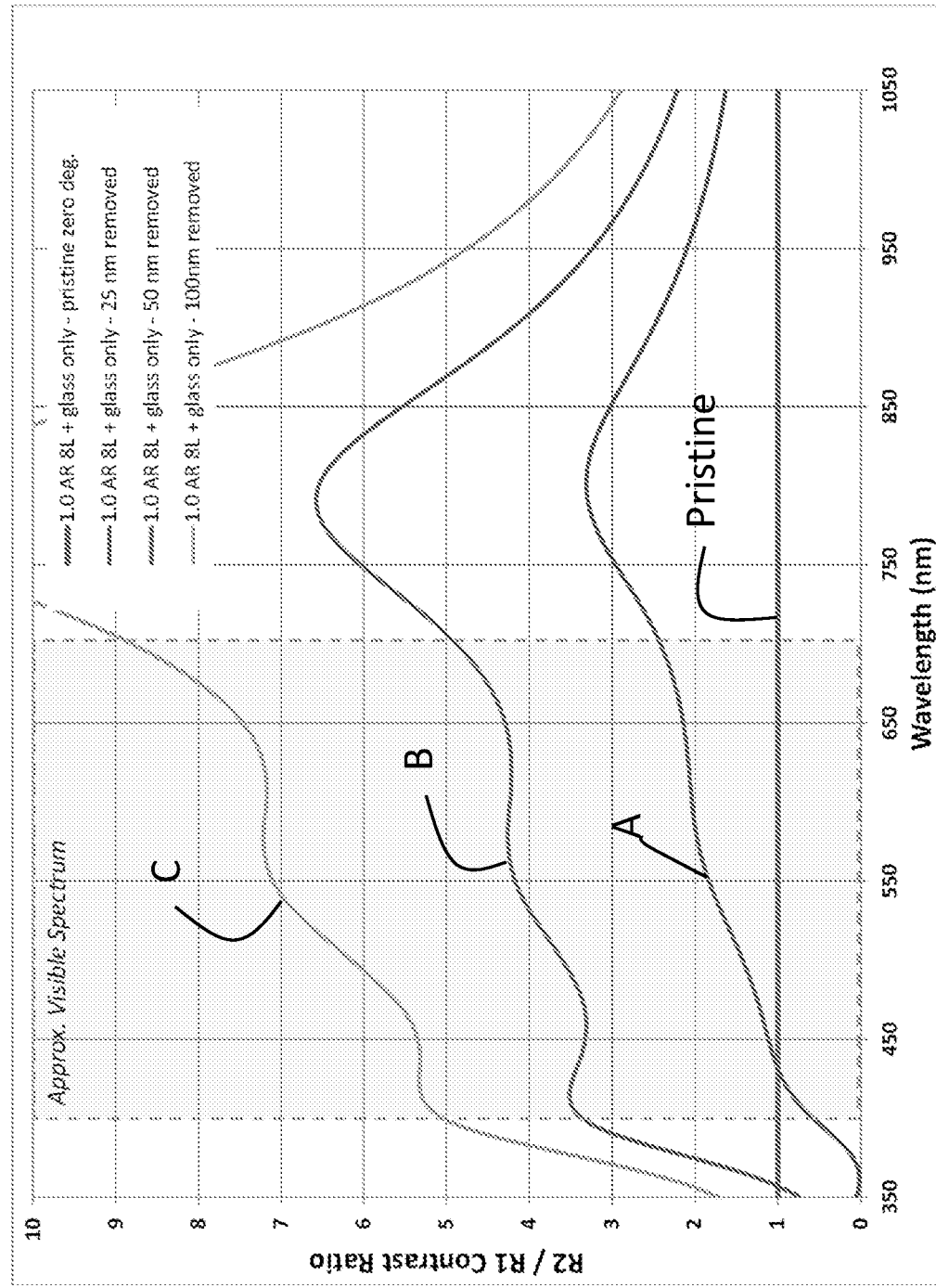

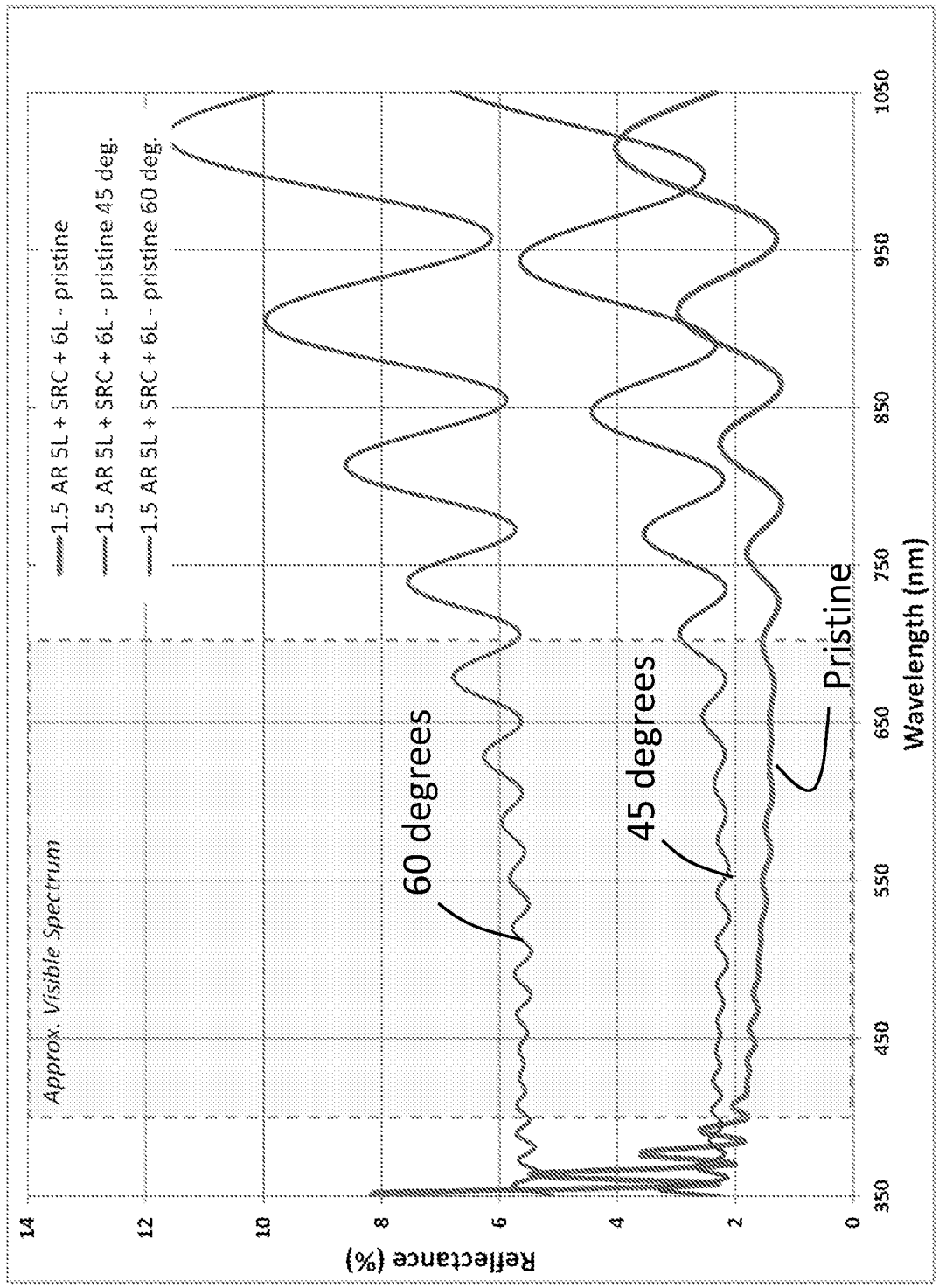

US 10,620,344 B2

LOW CONTRAST ANTI-REFLECTION ARTICLES WITH REDUCED SCRATCH AND FINGERPRINT VISIBILITY

CROSS-REFERENCE TO RELATED APPLICATIONS

This application claims the benefit of priority under 35 U.S.C. § 371 of International Patent Application Serial No. PCT/US15/32138, filed on May 22, 2015, which in turn, claims the benefit of priority of U.S. Provisional Patent Application Ser. No. 62/002,466 filed on May 23, 2014, the contents of each of which are relied upon and incorporated herein by reference in their entireties.

BACKGROUND

The disclosure relates to articles with a low contrast, anti-reflection coating and more particularly to such articles with reduced surface defect (e.g., scratches and fingerprints) visibility.

Transparent, scratch resistant films and hard coatings are used in the display cover glass market and other applications such as architectural, automotive, or other applications requiring high optical transmission and surface durability. These films and coatings have also been shown to improve the resistance to damage, during drop events onto hard and rough surfaces.

Anti-reflection coatings have also been developed for these markets and applications to reduce the intensity of reflected ambient light from a surface, to increase the transmittance, the readability and viewability of displays, and to reduce unwanted or distracting glare from eyeglasses, windows and other surfaces. Conventional anti-reflection coatings suffer from drawbacks including an increased visibility of surface defects (as described herein) when compared to surfaces with the same surface defects but that do not include an anti-reflection coating. As shown in FIG. 1, the visibility of a surface defect depends at least in part on reflectance contrast between a pristine portion of an anti-reflection coating and surface defect-containing portion of the same anti-reflection coating. FIG. 1 illustrates a known article 10 with a substrate 20 with a surface 22, and anti-reflection coating 30 disposed on the surface 22 forming a coated surface 32. In FIG. 1, the removal of a portion of the anti-reflection coating 30 (i.e., formation of a surface defect on the coated surface 32) forms a new surface that includes a surface defect 34. The coated surface 32 that is free of surface defects is considered pristine. As used herein, the phrase "pristine" means a coated surface that is free of surface defects, as defined herein. As shown in FIG. 1A, the pristine coated surface has a first reflectance % $R_1$ and the surface including a surface defect (shown by the removal of a surface thickness) exhibits a second reflectance % $R_2$ that is different from % $R_1$. Some anti-reflection coatings include alternating high refractive index layers and low refractive index layers, the second reflectance % $R_2$ differs from % $R_1$ because the material at the exposed surface that includes the surface defect 34 is different from the material at the pristine surface. This result is also present when the surface defect includes the addition of a contaminant on the coated surface, instead of the removal of a surface thickness. This difference in reflectance highlights the presence of a surface defect, which may be enhanced by the presence of a surface defect having varying surface thicknesses removed thickness, depending on the structure of the anti-reflection coating.

In addition, recently emerging coating materials for display covers may have high hardness or other improved mechanical properties; however, these improved mechanical properties are often fundamentally associated with materials having a higher refractive index, such as $Al_2O_3$, single-crystal $Al_2O_3$ (sapphire), AlNx, AlOxNy, SiNx, SiOxNy, and $ZrO_2$.

Accordingly, there is a need for specially designed coatings that reduce the reflectance associated with articles with high-index materials and/or transparent substrates, without substantially increasing the visibility of surface defects that may appear or form during use of the articles. The present disclosure relates to reduce reflectance, as compared to the same bare transparent substrates, while reducing visibility of surface defects.

SUMMARY

Various aspects of this disclosure related to transparent articles exhibiting low reflectance and reduced visibility of surface defects. The articles include an anti-reflection coating disposed on at least one surface that reduces the reflectance of the article and has attributes that reduce the contrast or visibility of surface defects. As used herein, the phrase "surface defects" includes the removal of a surface thickness of the anti-reflection coating (e.g., scratches, chips, and/or abraded areas on or in the anti-reflection coating); the addition of a material or contaminant to the coated surface of the anti-reflection coating (e.g., fingerprints, fingerprint residue(s) or fingerprint-simulating medium or media); delaminated areas of the anti-reflection coating; and other surface flaws that are introduced in and/or to the anti-reflective coating during normal use of the articles (i.e., not introduced during manufacture of the article or disposition of the anti-reflective coating). Surface defects should have a lateral dimension of about 1 μm or greater.

A first aspect of this disclosure pertains to articles including a substrate with a substrate surface, and an anti-reflection coating disposed on the substrate surface forming a coated surface. Unless otherwise specified, the coated surface is the surface of the anti-reflection coating and the underlying substrate (and/or other layers disposed between the substrate and the anti-reflection coating). In one or more embodiments, the coated surface exhibits a first average reflectance in the range from about 0.6% to about 6.0% over at least a portion of the visible spectrum in the range from about 450 to about 650 nm, when the coated surface is in a pristine condition, and a second average reflectance of about 8% or less (e.g., about 3% or less) over the visible spectrum, after removal of a surface thickness of the anti-reflection coating from the coated surface. In one variant, the anti-reflection coating comprises a coating thickness that is greater than the surface thickness. In another variant, the surface thickness is about 25 nm or greater (e.g., in the range from about 25 nm to about 100 nm or from about 25 nm to about 500 nm). In yet another variant, the anti-reflection coating includes multiple layers and specifically includes a first layer disposed on the substrate surface and a second layer disposed on the first layer, wherein the second layer has a having a thickness that is less than the surface thickness (or in other words, the surface thickness is greater than or equal to the layer thickness of the second layer).

In one embodiment, the coated surface may exhibit a first reflectance when the coated surface is in a pristine condition, and a second reflectance after removal of a surface thickness of the anti-reflection coating from the coated surface. At least one of the first reflectance and the second reflectance may exhibit an average oscillation amplitude of about 2% absolute reflectance or less, over the visible spectrum. In some embodiments, at wavelength widths of about 100 nm within the visible spectrum, at least one of the first reflectance and the second reflectance exhibits a maximum oscillation amplitude of about 2% absolute reflectance or less. The reflectances of such embodiments may be measured under an incident illumination angle in the range from about 0 degrees to about 60 degrees. In some embodiments, at least one of the first reflectance and the second reflectance comprises reflectance oscillations of less than 20% relative to a mean reflectance value, over the visible spectrum.

In one or more embodiments, the coated surface comprises a contrast ratio (the second average reflectance:the first average reflectance) in the range from about 0.5 to about 50, over the visible spectrum. In one or more embodiments, wherein the surface thickness comprises up to about 25 nm, the second average reflectance comprises about 6% or less, and the coated surface exhibits a contrast ratio (the second average reflectance:the first average reflectance) in the range from about 0.5 to about 10, over the visible spectrum. In some embodiments, wherein the surface thickness comprises up to about 50 nm, the second average reflectance comprises about 8% or less, and the coated surface exhibits a contrast ratio (the second average reflectance:the first average reflectance) in the range from about 0.5 to about 20, over the visible spectrum. In some embodiments, wherein the surface thickness comprises up to about 500 nm, the second average reflectance comprises about 12% or less, and the coated surface exhibits a contrast ratio (the second average reflectance:the first average reflectance) in the range from about 0.5 to about 50, over the visible spectrum. In one or more embodiments, the coated surface exhibits a contrast ratio of (the second average reflectance:the first average reflectance) of about less than 10, over the visible spectrum, and the first average reflectance and the second average reflectance are measured under an incident illumination angle in the range from about 0 degrees to about 60 degrees. The contrast ratio exhibited by some embodiments may exhibit oscillations having an average amplitude of about 1 or less in absolute ratio units, over the visible spectrum. In other embodiments, the first average reflectance and the second average reflectance are measured under an incident illumination angle in the range from about 0 degrees to about 60 degrees.

A second aspect of this disclosure pertains to an article including a substrate having a surface, and an anti-reflection coating disposed on the surface forming a coated surface in which the coated surface exhibits a first average reflectance when the anti-reflection coating is immersed in air and a second average reflectance that is about equal to or less than the first average reflectance (and may be less than about 1%) when the anti-reflection coating is immersed in a fingerprint-simulating medium. The fingerprint-simulating medium can include a refractive index in the range from about 1.4 to about 1.6.

A third aspect of this disclosure includes an article with a substrate having a surface, and an anti-reflection coating disposed on the surface forming a coated surface, in which the coated surface of the article exhibits a first average reflectance in the range from about 0.6% to about 6.0% over a visible spectrum in the range from about 450 to about 650 nm when the article is in a pristine condition, and a second average reflectance of about 10% or less over the visible spectrum, when the coated surface comprises a layer of fingerprint-simulating medium. The layer of fingerprint simulating medium may have a thickness in the range from about 100 nm to about 2000 nm, and an include a refractive index of 1.4-1.6.

The contrast ratio of the second average reflectance to the first average reflectance is about 20 or less, and the ratio comprises oscillations having an average amplitude of about 10 or less in absolute ratio units, over the visible spectrum. In some embodiments, the coated surface comprises the layer of fingerprint-simulating medium and a maximum reflectance value of about 8% absolute reflectance or less, across the visible spectrum, and the coated surface comprises the layer of fingerprint-simulating medium and a reflectance comprising a maximum oscillation amplitude of about 7.5% absolute reflectance or less, across the visible spectrum.

A fourth aspect of this disclosure pertains to an article including a substrate surface and an anti-reflection coating disposed on the substrate surface forming a coated surface, wherein the coated surface exhibits a first color coordinate $(a^*_1, b^*_1)$, when measured using an incident illumination angle in the range from about 0 degrees to about 75 degrees from normal incidence under an illuminant in a pristine condition, and a second color coordinate $(a^*_2, b^*_2)$, when measured using the incident illumination angle under the illuminant after removal of a surface thickness of the anti-reflection coating from the coated surface. The incident illumination angle may be about 60 degrees, and the surface thickness may be in a range from about 0.1 to about 100 nm.

The difference in color coordinates $(\Delta a^* b^*)$ may be about 6 or less or even about 3 or less. In some embodiments the surface thickness is in the range from about 0.1 nm to about 140 nm. The anti-reflection coating may have a first layer disposed on the surface and a second layer disposed on the first layer, wherein the first layer comprises a high-index material layer having a thickness of about 50 nm or less. In another embodiment, the anti-reflection coating includes a hard material having a hardness of greater than about 5 GPa, as measured by a Berkovich Indenter Hardness Test, as defined herein, over an indentation depth of about 100 nm or greater. In some embodiments, the article exhibits a hardness of about 5 GPa or greater as measured by a Berkovich Indenter Hardness Test, as defined herein, over an indentation depth of about 100 nm or greater.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 8B is a graph showing the contrast ratio of the article shown in FIG. 8A, after removal of different surface thicknesses;

FIG. 9C is a graph of reflectance spectra of Modeled Example 6 in a pristine condition, at different incident illumination angles;

DETAILED DESCRIPTION

Figure 1:
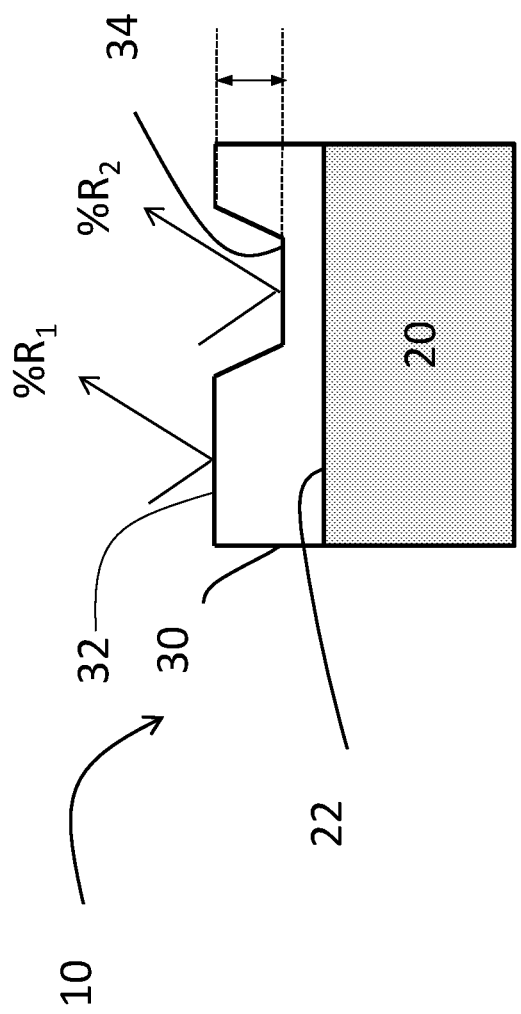
FIG. 1 is a side view of a known article including a substrate and an anti-reflection coating.

Reference will now be made in detail to various embodiment(s), examples of which are illustrated in the accompanying drawings. Whenever possible, the same reference numerals will be used throughout the drawings to refer to the same or like parts.

Figure 2:
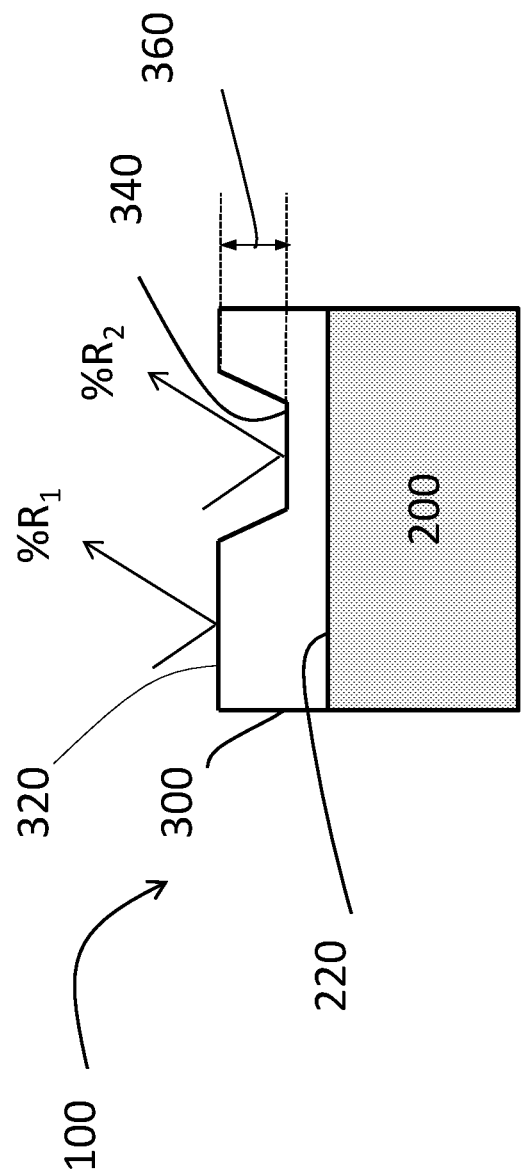
FIG. 2 is a side view of an article according to one or more embodiments with a surface defect that includes the removal of a surface thickness.

A first aspect of the present disclosure pertains to an article including a low contrast, anti-reflection coating. As shown in FIG. 2, the article 100 includes a substrate 200 with at least one substrate surface 220 and an anti-reflection coating 300 disposed on the at least one substrate surface, forming a coated surface 320, that reduces the reflectance of the article. In other words, the coated surface 320 exhibits a low reflectance or a reflectance that is less than the reflectance of the substrate surface 220 without the anti-reflection coating 300 disposed thereon. As used herein, the term "reflectance" is defined as the percentage of incident optical power within a given wavelength range that is reflected from a material (e.g., the article, the substrate, or the optical film or portions thereof). Reflectance is measured using a specific linewidth. In one or more embodiments, the spectral resolution of the characterization of the reflectance is less than 5 nm or 0.02 eV.

The average reflectance (% $R_{av1}$ and % $R_{av2}$) and the reflectance (% $R_1$ and % $R_2$) values and ranges described herein may be measured using under an incident illumination angle, which simulates the color exhibited or perceived in reflection of the coated surface, as the viewing angle changes. The incident illumination angle may be in the range from about 0 degrees to about 80 degrees, from about 0 degrees to about 75 degrees, from about 0 degrees to about 70 degrees, from about 0 degrees to about 65 degrees, from about 0 degrees to about 60 degrees, from about 0 degrees to about 55 degrees, from about 0 degrees to about 50 degrees, from about 0 degrees to about 45 degrees, from about 0 degrees to about 40 degrees, from about 0 degrees to about 35 degrees, from about 0 degrees to about 30 degrees, from about 0 degrees to about 25 degrees, from about 0 degrees to about 20 degrees, from about 0 degrees to about 15 degrees, from about 5 degrees to about 80 degrees, from about 5 degrees to about 80 degrees, from about 5 degrees to about 70 degrees, from about 5 degrees to about 65 degrees, from about 5 degrees to about 60 degrees, from about 5 degrees to about 55 degrees, from about 5 degrees to about 50 degrees, from about 5 degrees to about 45 degrees, from about 5 degrees to about 40 degrees, from about 5 degrees to about 35 degrees, from about 5 degrees to about 30 degrees, from about 5 degrees to about 25 degrees, from about 5 degrees to about 20 degrees, from about 5 degrees to about 15 degrees, and all ranges and sub-ranges therebetween. The illuminants used to measure average reflectance (% $R_{av1}$ and % $R_{av2}$) and the reflectance (% $R_1$ and % $R_2$) values and ranges described herein may include standard illuminants as determined by the CIE, including an A illuminant (representing tungsten-filament lighting), B illuminants (daylight simulating illuminants), C illuminants (daylight simulating illuminants), D series illuminants (representing natural daylight), and F series illuminants (representing various types of fluorescent lighting).

The anti-reflection coating 300 can be described as a "low-contrast" coating, as the contrast or visibility of surface defects in or on the anti-reflection coating is reduced, compared to a conventional anti-reflection coating. Contrast and visibility may be described in terms of relative reflectance between surfaces with and without surface defects.

Accordingly, the relative differences in the reflectance of the ant-reflection coatings in pristine condition and the same coating with a condition including a surface defect can be used to describe the low contrast attribute of the anti-reflection coatings described herein. Specifically, the ratios of the reflectances (i.e., contrast ratio), reflectance oscillations vs. wavelength and oscillations in contrast ratio vs. wavelength of the anti-reflection coating in a pristine condition and in a condition with a surface defect each individually and collectively influence the visibility and color of the anti-reflection coating and surface defects contained therein. Thus lower or smaller oscillations in reflectance and contrast ratios and smaller contrast ratios contribute to lower visibility of surface defects. Such surface defects can often create light scattering due to the defect size and shape; the performance of the anti-reflection coating of one or more embodiments generally neglects scattering effects, which is independent of the other optical behaviors described herein. Even in the presence of light scattering from surface defects, the optical performance of the anti-reflection coating embodiments describe herein significantly reduce the visibility of surface defects.

In one or more embodiments, the coated surface 320 exhibits a first average reflectance (% $R_{av1}$) or a first reflectance (% $R_1$) over at least a portion of the visible spectrum when the coated surface is in pristine condition and a second average reflectance (% $R_{av2}$) or a second reflectance (% $R_2$) over at least a portion of the visible spectrum when the coated surface comprises a surface defect 340, as described herein. The relative differences between % $R_1$ and % $R_2$, and between % $R_{av1}$ and % $R_{av2}$ is reduced when compared to known coatings. As used herein, the phrase "visible spectrum" includes wavelengths along the range from about 400 nm to about 700 nm or from about 450 nm to about 650 nm. The reflectance values or ranges described herein may be qualified as being across the visible spectrum or along a portion of the visible spectrum. A portion of the visible spectrum may be described as a "wavelength width", which may be a width of about 100 nm or 200 nm within the visible spectrum (e.g., from about 400 nm to about 500 nm, or from about 450 nm to about 650 nm.

In one or more specific embodiments, the surface defect 340 comprises the removal of a surface thickness 360 of the anti-reflection coating from the coated surface of about 25 nm or more, as shown in FIG. 2. In some embodiments, the surface thickness may be in the range from about 25 nm to about 500 nm. For example, the surface thickness may be in the range from about 25 nm to about 450 nm, from about 25 nm to about 400 nm, from about 25 nm to about 350 nm, from about 25 nm to about 300 nm, from about 25 nm to about 250 nm, from about 25 nm to about 200 nm, from about 25 nm to about 150 nm, from about 25 nm to about 100 nm, from about 50 nm to about 500 nm, from about 75 nm to about 500 nm, from about 100 nm to about 500 nm, from about 150 nm to about 500 nm, from about 200 nm to about 500 nm, from about 250 nm to about 500 nm, or from about 300 nm to about 500 nm.

In some embodiments, the anti-reflection coating comprises a thickness that is greater than the surface thickness. The removal of the surface thickness forms a surface defect 340 in that removal area, while the remaining coated surface 320 may form a pristine condition since there is no surface defect present.

Figure 3:
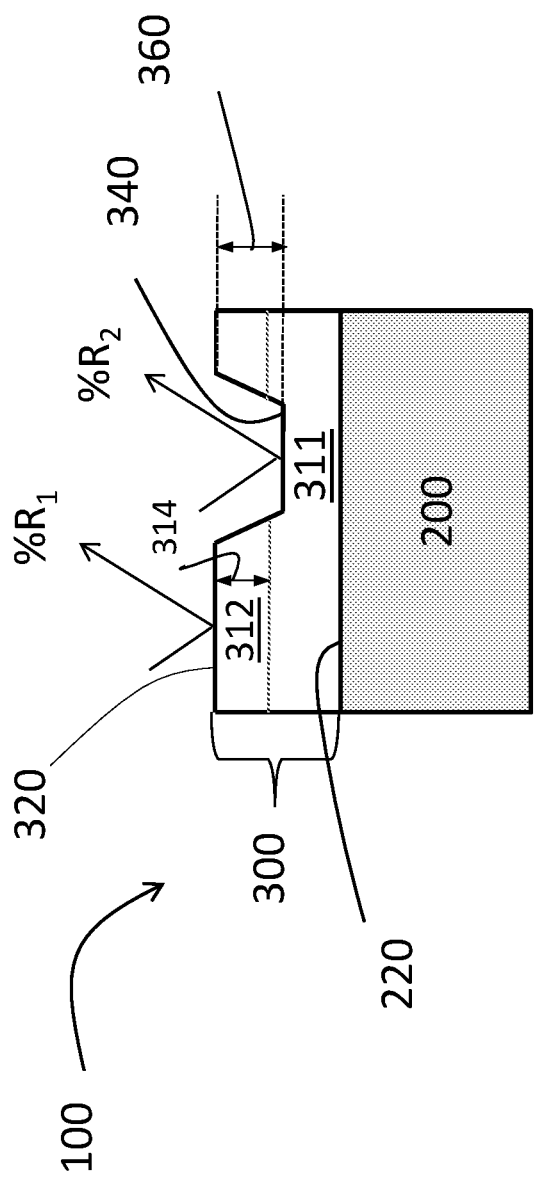
FIG. 3 is a side view of an article according to one or more embodiments with a multi-layered anti-reflection coating and a surface defect that includes the removal of a surface thickness.

In some embodiments, as shown in FIG. 3, the anti-reflection coating 300 includes a multi-layer coating that includes at least two layers such that a first layer 311 is disposed on the substrate surface 220 and a second layer 312 is disposed on the first layer 311. The second layer 312 may have a layer thickness 314 that is less than the surface thickness 360. In other words, the surface thickness 360 is greater than or equal to the layer thickness 314 of the second layer 312 such that removal of the surface thickness 360 includes removal of at least a portion of the second layer 312 from the coated surface 320. In such embodiments, the coated surface 320 includes areas formed from the second layer, which may provide a pristine condition, and areas formed from the first layer 311, which comprise a surface defect 340.

Figure 4:
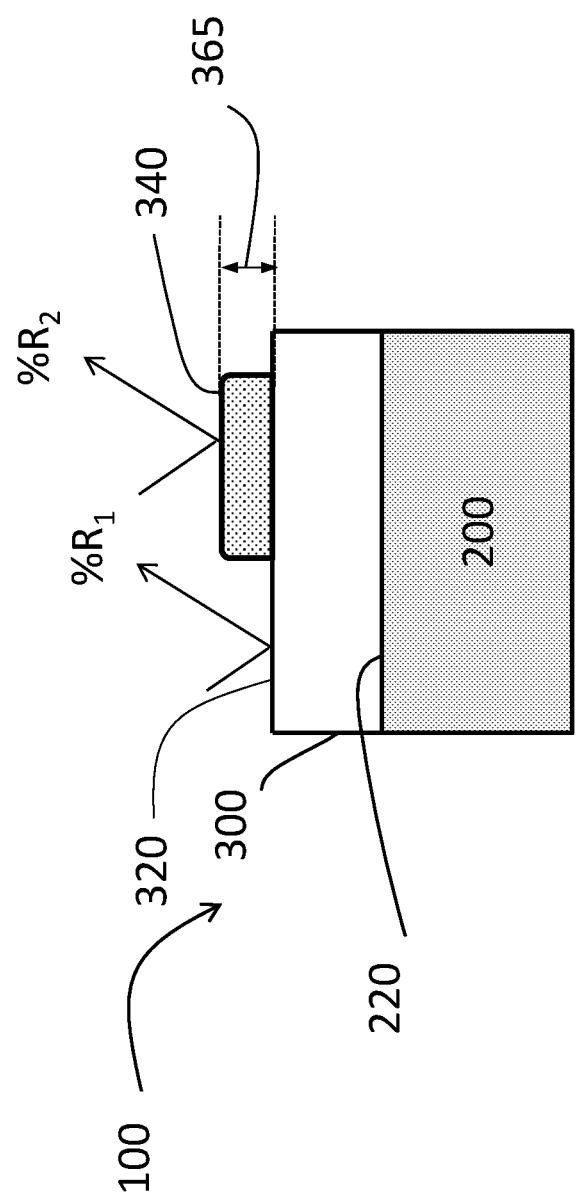
FIG. 4 is a side view of an article according to one or more embodiments with a surface defect that includes the addition of a contaminant.

As shown in FIG. 4, the surface defect 340 of one or more embodiments may include the addition of a material or contaminant 365 to the coated surface 320 of the anti-reflection coating 300 (e.g., fingerprints, fingerprint residue(s) or fingerprint-simulating medium or media). In some embodiments, the contaminant 365 may be present as a planar layer having a thickness in the range from about 100 nm to about 2000 nm. In specific embodiments, the thickness is intended to simulate a fingerprint droplet. The contaminant may have a refractive index in the range from about 1.4 to about 1.6, or about 1.49 to simulate oils contained in fingerprint residue. In some embodiments, % $R_1$ and/or % $R_{av1}$, and % $R_2$ and/or % $R_{av2}$ may be measured using the same techniques used to measure reflectance where the surface defect includes removal of a surface thickness or the addition of a contaminant. In other embodiments having a surface defect including the addition of a contaminant, % $R_1$ and/or % $R_{av1}$ may be measured or modeled when the anti-reflection coating is in an immersed stated or in or surrounded by air (i.e., % $R_1$ and/or % $R_{av1}$ at the air/anti-reflection coating interface is captured by a reflectance measurement system). In such embodiments, % $R_2$ and/or % $R_{av2}$ may be measured or modeled when the anti-reflection coating is in an immersed state or in or surrounded by the contaminant (i.e., % $R_2$ and/or % $R_{av2}$ at the air/contaminant interface is captured by a reflectance measurement system but reflectance from any air interfaces in system is removed or subtracted out). The detector or measurement system lens may be in contact with a contaminant bath that is also surrounding the coated surface of the article.

In one or more embodiments, % $R_{av2}$ may be equal to or less than % $R_{av1}$. In one or more embodiments % $R_{av1}$ may be in the range from about 0.5% to about 7%, or from about 0.6% to about 6.0%, over the entire visible spectrum or at least a portion of the visible spectrum. In one or more embodiments, % $R_{av2}$ may be about 10% or less (e.g., about 8% or less, about 6% or less, about 5% or less, about 4% or less, about 3% or less, or about 2% or less) or in the range from about 0.1% to about 8%, over the entire visible spectrum or at least a portion of the visible spectrum. Where the surface defect includes the addition of a contaminant, the % $R_{av2}$ may be about 2% or less, 1% or less, or about 0.5% or less, across at least a portion of the visible spectrum.

At least one of % $R_1$ and % $R_2$ may exhibit oscillations over the visible spectrum over which the reflectance was measured. At least one of % $R_1$ and % $R_2$ may include an average oscillation amplitude of about 2% absolute reflectance or less, over the visible spectrum. As used herein, the term "amplitude" includes the peak-to-valley change in reflectance (or transmittance) over the visible spectrum or a given wavelength width. The phrase "average oscillation amplitude" includes the peak-to-valley change in reflectance or transmittance averaged over every possible 100 nm wavelength range within the visible spectrum or over a given wavelength width. In some embodiments, the average oscillation amplitude may be about 1.75% or less, about 1.5% or less, about 1% or less, about 0.75% or less, about 0.5% or less, about 0.25% or less, or about 0.1% or less, in absolute reflectance terms, over the entire visible spectrum or a given wavelength width of about 100 nm. In some instances, the lower limit of the average oscillation amplitude may be about 0.1%. Accordingly, the average oscillation amplitude of at least one of % $R_1$ and % $R_2$ may be in the range from about 0.1% to about 2%, in absolute reflectance terms, over the entire visible spectrum or a given wavelength width of about 100 nm. The degree of oscillation may also be described in terms of a percent relative to an average reflectance or transmittance value, across the visible spectrum or over a given wavelength width. For example, at least one of % $R_1$ and % $R_2$ may exhibit reflectance oscillations of less than about 30%, less than about 20% or less than about 10%, relative to a mean reflectance value, over the visible spectrum or a given wavelength width. In one or more embodiments, where the surface defect includes the addition of a contaminant, the coated surface exhibits a maximum reflectance value of about 8% or less across the visible spectrum and optionally includes a maximum oscillation amplitude of about 7.5% absolute reflectance or less (e.g., about 6%, 5% or about 4% absolute reflectance or less), across the visible spectrum.

In one or more embodiments, the coated surface comprises a contrast ratio measured as the ratio of the second average reflectance to the first average reflectance (% $R_{av2}$: % $R_{av1}$), over the visible spectrum or a given wavelength width, provided that % $R_{av2}$ and % $R_{av1}$ are measured at the same incident illumination angle. In one or more embodiments, the contrast ratio may be in the range from about 0.5 to about 50. For example, the contrast ratio may be in the range from about 0.5 to about 45, from about 0.5 to about 40, from about 0.5 to about 35, from about 0.5 to about 30, from about 0.5 to about 25, from about 0.5 to about 20, from about 0.5 to about 15, from about 0.5 to about 10, from about 0.5 to about 8, from about 0.5 to about 6, or from about 0.5 to about 5. For comparison, known anti-reflection coatings, which have a surface defect of about 25 nm to about 500 nm surface thickness removed, typically exhibit a contrast ratio of about 100 or greater. In some instances, the contrast ratio of the anti-reflection coating may be related to the surface defect. For example, when the surface defect includes up to about 25 nm of surface thickness removal, the contrast ratio may be about 10 or less, about 5 or less or about 2 or less (with the lower limit being about 0.5); and the % $R_{av2}$ may about 6% or less, 4% or less, or about 3% or less. In another example, when the surface defect includes up to about 50 nm of surface thickness removal, the contrast ratio may be about 20 or less, 10 or less, about 5 or less, about 3 or less, or about 2 or less (with the lower limit being about 0.5); and the % $R_{av2}$ may about 8% or less, about 6% or less, or about 5% or less. In yet another example, when the surface defect includes up to about 100 nm of surface thickness removal, the contrast ratio may be about 50 or less, 20 or less, 10 or less, about 5 or less, or about 3 or less (with the lower limit being about 0.5); and the % $R_{av2}$ may about 12% or less, about 8% or less, about 7% or less, or about 6% or less. In another example, when the surface defect includes up to about 500 nm of surface thickness removal, the contrast ratio may be about 50 or less, 20 or less, 10 or less, about 5 or less, or about 3 or less (with the lower limit being about 0.5); and the % $R_{av2}$ may about 12% or less. In embodiments in which the surface defect includes the addition of a contaminant, the contrast ratio may be about 20 or less, about 10 or less, about 8 or less, about 6 or less, about 5 or less, about 4 or less, about 3 or less, about 2 or less (with the lower limit being about 0.5). Such contrast ratio and/or % $R_{av2}$ values may be along a visible spectrum in the range from about 400 nm to about 700 nm, or from about 450 nm to about 650 nm.

In one or more embodiments, the contrast ratio of the coated surface may exhibit oscillations. In some embodiments where the surface defect includes the removal of a surface thickness, the contrast ratio has an average oscillation amplitude of about 2 or less, about 1 or less or about 0.5 or less, in absolute ratio units, over the visible spectrum or a given wavelength width. In some embodiments where the surface defect includes the addition of a contaminant, the contrast ratio has an average oscillation amplitude of about 10 or less, about 7 or less or about 5 or less, in absolute ratio units, over the visible spectrum or a given wavelength width.

The performance of the anti-reflection coating 300 of one or more embodiments may be described in terms of the change in color in reflectance or transmittance of the article. The color may be represented by color values or coordinates (a*, b*) under the International Commission on Illumination ("CIE") L*, a*, b* colorimetry system. The change in color may be described as a color shift as determined by the following equation $\sqrt{((a*_2-a*_1)^2+(b*_2-b*_1)^2)}$, using the a* and b* coordinates of the coated surface. The coordinates $a*_1$ and $b*_1$ may be the color coordinates 1) of the coated surface in pristine condition or at areas where the coated surface is in a pristine; 2) (0, 0); or 3) a reference color coordinate. The coordinates $a*_2$ and $b*_2$ may be the color coordinates of the coated surface after formation of a surface defect or at areas including a surface defect. When measuring the color coordinates ($a*_1$, $b*_1$) and ($a*_2$, $b*_2$), the incident illumination angle and the illuminant are the same.

In some embodiments, the color shift may be described as Δa*b* and may about 6 or less at the incident illumination angles described herein (e.g., from about 0 degrees to about 75 degrees, from about 0 degrees to about 30 degrees or from about 30 degrees to about 75 degrees) and under the illuminants described herein. In some embodiments, the color shift may be about 5.5 or less, about 5 or less, about 4.5 or less, about 4 or less, about 3.5 or less, about 3 or less, about 2.5 or less, about 2 or less, about 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less. In some embodiments, the color shift may be about 0. In some embodiments, the coated surface exhibits such color shift ranges when the surface defect includes removal of a surface thickness in the range from about 0.1 nm to about 200 nm, or from about 0.1 nm to about 150 nm, or from about 0.1 nm to about 140 nm. In one or more specific embodiments, the color shift is about 3 or less, when the incident illumination angle is about 60 degrees and the surface thickness is in a range from about 0.1 to about 100 nm.

In one or more embodiments, the anti-reflection coating may include more than one layer. In some instances, the anti-reflection coating may include a first layer 311 disposed on the substrate surface 220 and a second layer 312 disposed on the first layer, wherein the first layer 311 comprises a high refractive index material (e.g., having a refractive index that is greater than the refractive index of the second layer 312). In some instances, the first layer 311 may have a thickness of about 50 nm or less. In some embodiments, more than one, or even all of the layers of the anti-reflection coating including a high refractive index material may be have a thickness of about 100 nm or less or about 50 nm or less.

The anti-reflection coating 300 and/or the article 100 may be described in terms of a hardness measured by a Berkovich Indenter Hardness Test. As used herein, the "Berkovich Indenter Hardness Test" includes measuring the hardness of a material on a surface thereof by indenting the surface with a diamond Berkovich indenter. The Berkovich Indenter Hardness Test includes indenting the coated surface 320 of the article or the surface of the anti-reflection coating (or the surface of any one or more of the layers in the anti-reflection coating, as described herein) with the diamond Berkovich indenter to form an indent to an indentation depth in the range from about 50 nm to about 1000 nm (or the entire thickness of the anti-reflection coating or layer, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. *J. Mater. Res.*, Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res.*, Vol. 19, No. 1, 2004, 3-20. As used herein, hardness refers to a maximum hardness, and not an average hardness.

In some embodiments, the anti-reflection coating 300 may exhibit a hardness of greater than about 5 GPa, as measured on the coated surface 320, by the Berkovitch Indenter Hardness Test. The anti-reflection coating may exhibit a hardness of about 8 GPa or greater, about 10 GPa or greater or about 12 GPa or greater. The article 100, including the anti-reflection coating 300 and any additional coatings, as described herein, may exhibit a hardness of about 5 GPa or greater, about 8 GPa or greater, about 10 GPa or greater or about 12 GPa or greater, as measured on the coated surface 320, by the Berkovitch Indenter Hardness Test. Such measured hardness values may be exhibited by the anti-reflection coating 300 and/or the article 100 along an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

The anti-reflection coating 300 may have at least one layer having a hardness (as measured on the surface of such layer of about 5 GPa or greater, 8 GPa or greater, 10 GPa or greater, 12 GPa or greater, about 13 GPa or greater, about 14 GPa or greater, about 15 GPa or greater, about 16 GPa or greater, about 17 GPa or greater, about 18 GPa or greater, about 19 GPa or greater, about 20 GPa or greater, about 22 GPa or greater, about 23 GPa or greater, about 24 GPa or greater, about 25 GPa or greater, about 26 GPa or greater, or about 27 GPa or greater (up to about 50 GPa), as measured by the Berkovich Indenter Hardness Test. The hardness of such layer may be in the range from about 18 GPa to about 21 GPa, as measured by the Berkovich Indenter Hardness Test. In some embodiments, the anti-reflection coating includes a hard material having an average hardness of greater than about 5 GPa (e.g., about 10 GPa or greater, about 15 GPa or greater, or about 20 GPa or greater), as measured by a Berkovich Indenter Hardness Test, as defined herein. The hard material may be present in all the layers of the anti-reflection coating or in one or more specific layers of the anti-reflection coating. In some instances, the anti-reflection coating may include a layer having a thickness of about 1 μm or greater, or about 2 μm or greater that includes the hard material. Such measured hardness values may be exhibited by the at least one layer along an indentation depth of about 50 nm or greater or 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the article exhibits a hardness that is greater than the hardness of the substrate (which can be measured on the opposite surface from the coated surface).

In one or more embodiments, the anti-reflection coating 300 or individual layers within the anti-reflection coating may exhibit an elastic modulus of about 75 GPa or greater, about 80 GPa or greater or about 85 GPa or greater, as measured on the coated surface 320, by indenting that surface with a Berkovitch indenter. These modulus values may represent a modulus measured very close to the coated surface 101, e.g. at indentation depths of 0-50 nm, or it may represent a modulus measured at deeper indentation depths, e.g. from about 50-1000 nm.

The anti-reflection coating may include a refractive index gradient along at least a portion of its thickness, as described in U.S. patent application Ser. No. 14/262,224, filed on Apr. 25, 2014, entitled "Scratch-Resistant Articles with a Gradient Layer", the contents of which are incorporated herein by reference. Specifically, the anti-reflection coating may include a refractive index that increases from a first surface (adjacent to the substrate surface 220) to the second surface (i.e., the coated surface). The refractive index may increase along the refractive index gradient at an average rate in the range from about 0.2/μm to about 0.5/μm and may be in the range from about 1.5 to about 2.0. The anti-reflection coating may include a compositional gradient that includes at least two of Si, Al, N, and O.

In other embodiments, the anti-reflective coating may include one more layers that have different and optionally alternating refractive indices, as described in U.S. patent application Ser. No. 14/262,066, filed on Apr. 25, 2014, entitled "Low-Color Scratch-Resistant Articles with a Multilayer Optical Film," the contents of which are incorporated herein by reference. Specifically, the anti-reflection coating may include a first low refractive index (RI) sub-layer and a second high RI sub-layer. An optional third sub-layer may also be included. In one or more embodiments, the anti-reflection coating may include a plurality of sub-layer sets. A single sub-layer set may include a first low RI sub-layer, a second high RI sub-layer and optionally, a third sub-layer. In some embodiments, the anti-reflection coating may include a plurality of sub-layer sets such that the first low RI sub-layer (designated for illustration as "L") and the second high RI sub-layer (designated for illustration as "H") may be provide the following sequence of sub-layers: L/H/L/H or H/L/H/L, such that the first low RI sub-layer and the second high RI sub-layer appear to alternate along the physical thickness of the optical interference layer. In some examples, the anti-reflection coating may have three sub-layer sets or up to 10 sub-layer sets. For example, the anti-reflection coating may include from about 2 to about 12 sub-layer sets, from about 3 to about 8 sub-layer sets, from about 3 to about 6 sub-layer sets. The third sub-layer(s) used in some examples may have a low RI, a high RI or a medium RI. In some embodiments, the third sub-layer(s) may have the same RI as the first low RI sub-layer or the second high RI sub-layer. In other embodiments, the third sub-layer(s) may have a medium RI that is between the RI of the first low RI sub-layer and the RI of the second high RI sub-layer. The third sub-layer(s) may be disposed between the plurality of sub-layer sets and a functional coating (as will be described herein) (not shown) or between the substrate and the plurality of sub-layer sets (not shown). Alternatively, the third sub-layer may be included in the plurality of sub-layer sets (not shown). The third sub-layer may be provided in the anti-reflection coating in the following exemplary configurations: $L_{third\ sub-layer}$/H/L/H/L; $H_{third\ sub-layer}$/L/H/L/H; L/H/L/H/L$_{third\ sub-layer}$; H/L/H/L/H$_{third\ sub-layer}$; $L_{third\ sub-layer}$/H/L/H/L/H$_{third\ sub-layer}$; $H_{third\ sub-layer}$/L/H/L/H/L$_{third\ sub-layer}$; $L_{third\ sub-layer}$/H/L/H/L; H$_{third\ sub-layer}$/L/H/L/H; H/L/H/L/L$_{third\ sub-layer}$; L/H/L/H/H$_{third\ sub-layer}$; $L_{third\ sub-layer}$/L/H/L/H/H$_{third\ sub-layer}$; $H_{third\ sub-layer}$/H/L/H/L/L$_{third\ sub-layer}$; L/M/H/L/M/H; H/M/L/H/M/L; M/L/H/L/M; and other combinations. In these configurations, "L" without any subscript refers to the first low RI sub-layer and "H" without any subscript refers to the second high RI sub-layer. Reference to "$L_{third\ sub-layer}$" refers to a third sub-layer having a low RI, "$H_{third\ sub-layer}$" refers to a third sub-layer having a high RI and "M" refers to a third sub-layer having a medium RI.

As used herein, the terms "low RI", "high RI" and "medium RI" refer to the relative values for the RI to another (e.g., low RI<medium RI<high RI). In one or more embodiments, the term "low RI" when used with the first low RI sub-layer or with the third sub-layer, includes a range from about 1.3 to about 1.7. In one or more embodiments, the term "high RI" when used with the second high RI sub-layer or with the third sub-layer, includes a range from about 1.6 to about 2.5. In some embodiments, the term "medium RI" when used with the third sub-layer, includes a range from about 1.55 to about 1.8. In some instances, the ranges for low RI, high RI and medium RI may overlap; however, in most instances, the sub-layers of the optical interference layer have the general relationship regarding RI of: low RI<medium RI<high RI.

Exemplary materials suitable for use in the anti-reflection coating include: $SiO_2$, $Al_2O_3$, $GeO_2$, SiO, $AlO_xN_y$, AlN, $Si_3N_4$, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in a scratch-resistant layer, and other materials known in the art. Some examples of suitable materials for use in the first low RI sub-layer include $SiO_2$, $Al_2O_3$, $GeO_2$, SiO, $AlO_xN_y$, $SiO_xN_y$, $Si_uAl_vO_xN_y$, MgO, $MgF_2$, $BaF_2$, $CaF_2$, $DyF_3$, $YbF_3$, $YF_3$, and $CeF_3$. Some examples of suitable materials for use in the second high RI sub-layer include $Si_uAl_vO_xN_y$, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, and $MoO_3$.

In one or more embodiments at least one of the sub-layer(s) may include a specific optical thickness range. As used herein, the term "optical thickness" is determined by (n*d), where "n" refers to the RI of the sub-layer and "d" refers to the physical thickness of the sub-layer. In one or more embodiments, at least one of the sub-layers of the anti-reflection coating may include an optical thickness in the range from about 2 nm to about 200 nm, from about 10 nm to about 100 nm, or from about 15 nm to about 100 nm. In some embodiments, all of the sub-layers in the anti-reflection coating may each have an optical thickness in the range from about 2 nm to about 200 nm, from about 10 nm to about 100 nm or from about 15 nm to about 100 nm. In some cases, at least one sub-layer of the anti-reflection coating has an optical thickness of about 50 nm or greater. In some cases, each of the first low RI sub-layers have an optical thickness in the range from about 2 nm to about 200 nm, from about 10 nm to about 100 nm, or from about 15 nm to about 100 nm. In other cases, each of the second high RI sub-layers have an optical thickness in the range from about 2 nm to about 200 nm, from about 10 nm to about 100 nm, or from about 15 nm to about 100 nm. In yet other cases, each of the third sub-layers have an optical thickness in the range from about 2 nm to about 200 nm, from about 10 nm to about 100 nm, or from about 15 nm to about 100 nm.

In one or more embodiments, the anti-reflection coating has a physical thickness of about 800 nm or less. The anti-reflection coating may have a physical thickness in the range from about 10 nm to about 800 nm, from about 50 nm to about 800 nm, from about 100 nm to about 800 nm, from about 150 nm to about 800 nm, from about 200 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 50 to about 300, and all ranges and sub-ranges therebetween The substrate 200 may include an amorphous substrate, a crystalline substrate or a combination thereof. The substrate 200 may be formed from man-made materials and/or naturally occurring materials. In some specific embodiments, the substrate 200 may specifically exclude plastic and/or metal substrates. In one or more embodiments, the substrate exhibits a refractive index in the range from about 1.45 to about 1.55. In specific embodiments, the substrate 200 may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the substrate 200 may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater. Suitable substrates 110 may exhibit an elastic modulus (or Young's modulus) in the range from about 30 GPa to about 120 GPa.

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 200 may include crystalline substrates such as glass ceramic substrates (which may be strengthened or non-strengthened) or may include a single crystal structure, such as sapphire. In one or more specific embodiments, the substrate 200 includes an amorphous base (e.g., glass) and a crystalline cladding (e.g., sapphire layer, a polycrystalline alumina layer and/or or a spinel ($MgAl_2O_4$) layer).

The substrate 200 may be substantially planar or sheet-like, although other embodiments may utilize a curved or otherwise shaped or sculpted substrate. The substrate 200 may be substantially optically clear, transparent and free from light scattering. In such embodiments, the substrate may exhibit an average transmittance over the optical wavelength regime of about 85% or greater, about 86% or greater, about 87% or greater, about 88% or greater, about 89% or greater, about 90% or greater, about 91% or greater or about 92% or greater.

Additionally or alternatively, the physical thickness of the substrate 200 may vary along one or more of its dimensions for aesthetic and/or functional reasons. For example, the edges of the substrate 200 may be thicker as compared to more central regions of the substrate 200. The length, width and physical thickness dimensions of the substrate 200 may also vary according to the application or use of the article 100.

The substrate 200 may be provided using a variety of different processes. For instance, where the substrate 200 includes an amorphous substrate such as glass, various forming methods can include float glass processes and down-draw processes such as fusion draw and slot draw.

Once formed, a substrate 200 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), surface CS, and depth of layer (DOL). Surface CS may be measured near the surface or within the strengthened glass at various depths. A maximum CS value may include the measured CS at the surface ($CS_s$) of the strengthened substrate. The CT, which is computed for the inner region adjacent the compressive stress layer within a glass substrate, can be calculated from the CS, the physical thickness t, and the DOL. CS and DOL are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring CS and DOL are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass substrate. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. The relationship between CS and CT is given by the expression (1):

$$CT=(CS \cdot DOL)/(t-2DOL) \qquad (1),$$

wherein t is the physical thickness (μm) of the glass article. In various sections of the disclosure, CT and CS are expressed herein in megaPascals (MPa), physical thickness t is expressed in either micrometers (μm) or millimeters (mm) and DOL is expressed in micrometers (μm).

In one embodiment, a strengthened substrate 200 can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOL of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOL greater than 15 μm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass composition includes at least 6 wt. % aluminum oxide. In a further embodiment, the substrate includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for the substrate comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO>10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In an alternative embodiment, the substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 200 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 200 may include a glass ceramic substrate, which may be strengthened or non-strengthened. Examples of suitable glass ceramics may include $Li_2O$—$Al_2O_3$—$SiO_2$ system (i.e. LAS-System) glass ceramics, MgO—$Al_2O_3$—$SiO_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 200 according to one or more embodiments can have a physical thickness ranging from about 100 μm to about 5 mm. Example substrate 200 physical thicknesses range from about 100 μm to about 500 μm (e.g., 100, 200, 300, 400 or 500 μm). Further example substrate 200 physical thicknesses range from about 500 μm to about 1000 μm (e.g., 500, 600, 700, 800, 900 or 1000 μm). The substrate 200 may have a physical thickness greater than about 1 mm (e.g., about 2, 3, 4, or 5 mm). In one or more specific embodiments, the substrate 200 may have a physical thickness of 2 mm or less or less than 1 mm. The substrate 200 may be acid polished or otherwise treated to remove or reduce the effect of surface flaws.

The articles described herein may incorporate other coatings with the anti-reflection coating. For example, one or more scratch-resistant coatings, anti-fingerprint coatings, anti-microbial coatings and other such functional coatings, may be incorporated into the article. In other examples, more than one anti-reflection coating may be used in combination with the functional coating(s). For example, the anti-reflection coating may be present on top of a function coating such that the anti-reflection coating forms the top coating of the article. In another example, an anti-reflection coating may be present underneath the functional coating and another anti-reflection coating may be present on top of the functional coating.

The anti-reflection coating and/or other coatings may be formed using various deposition methods such as vacuum deposition techniques, for example, chemical vapor deposition (e.g., plasma enhanced chemical vapor deposition, low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. One or more layers of the anti-reflection coating may include nano-pores or mixed-materials to provide specific refractive index ranges or values.

EXAMPLES

Various embodiments will be further clarified by the following examples.

Examples 1-10 used modeling to understand the reflectance spectra of articles in which the anti-reflection coating is pristine and includes a surface defect. The modeling was based on collected refractive index data from formed layers of various materials that may be used in the anti-reflection coatings and a substrate of either strengthened aluminoborosilicate ("ABS") glass or sapphire. The layers of the anti-reflection coating were formed by DC reactive sputtering, reactive DC and radio frequency (RF) sputtering, and e-beam evaporation onto silicon wafers. Some of the formed layers included $SiO_2$, $Nb_2O_5$, or $Al_2O_3$ and were deposited onto silicon wafers by DC reactive sputtering from a silicon, niobium or aluminum target (respectively) at a temperature of about 50° C. using ion assist. Layers formed in this manner are designated with the indicator "RS". Layers of $Si_uAl_vO_xN_y$ were deposited onto silicon wafers by DC reactive sputtering combined with RF superimposed DC sputtering, with ion assist using a sputter deposition tool supplied by MA-Industries. The wafer was heated to 200° C. during deposition and silicon targets having a 3 inch diameter and an aluminum targets having a 3 inch diameter were used. Reactive gases used included nitrogen and oxygen and argon was used as the inert gas. The RF power was supplied to the silicon target at 13.56 Mhz and DC power was supplied to the aluminum target. The resulting $Si_uAl_vO_xN_y$ layers had a refractive index at 550 nm of about 1.95 and a measured hardness of greater than about 15 GPa, using a Berkovitch indenter on the surface of the $Si_uAl_vO_xN_y$ layer being tested, as described herein. $Si_uAl_vO_xN_y$ and $AlO_xN_y$ materials were deposited and had very similar hardness and refractive index profiles. Accordingly, $Si_uAl_vO_xN_y$ and $AlO_xN_y$ materials may be readily interchanged for one another.

The refractive indices (as a function of wavelength) of the formed layers of the optical film and the substrates were measured using spectroscopic ellipsometry. Tables 1-6 include the refractive indices and dispersion curves measured. The refractive indices thus measured were then used to calculate reflectance spectra for modeled Examples 1-10.

TABLE 1

Refractive indices and dispersion curve for a RS-$SiO_2$ layer vs. wavelength.

| Material | Reactive sputtered $SiO_2$ | |
|---|---|---|
| Wavelength (nm) | Refractive Index (n) | Extinction Coefficient (k) |
| 246.5 | 1.52857 | 0.0 |
| 275.2 | 1.51357 | 0.0 |
| 300.8 | 1.50335 | 0.0 |
| 324.7 | 1.49571 | 0.0 |
| 350.2 | 1.48911 | 0.0 |
| 375.8 | 1.48374 | 0.0 |
| 399.7 | 1.47956 | 0.0 |
| 425.2 | 1.47583 | 0.0 |
| 450.7 | 1.47269 | 0.0 |
| 476.3 | 1.47002 | 0.0 |
| 500.2 | 1.46788 | 0.0 |
| 525.7 | 1.46589 | 0.0 |
| 549.5 | 1.46427 | 0.0 |
| 575.0 | 1.46276 | 0.0 |
| 600.5 | 1.46143 | 0.0 |
| 625.9 | 1.46026 | 0.0 |
| 649.7 | 1.45928 | 0.0 |
| 675.1 | 1.45835 | 0.0 |
| 700.5 | 1.45751 | 0.0 |
| 725.9 | 1.45676 | 0.0 |
| 751.3 | 1.45609 | 0.0 |
| 775.0 | 1.45551 | 0.0 |
| 800.4 | 1.45496 | 0.0 |
| 850.9 | 1.45399 | 0.0 |
| 899.8 | 1.45320 | 0.0 |
| 950.2 | 1.45252 | 0.0 |
| 999.0 | 1.45195 | 0.0 |
| 1100.0 | 1.45100 | 0.0 |
| 1199.6 | 1.45028 | 0.0 |
| 1302.0 | 1.44971 | 0.0 |
| 1400.8 | 1.44928 | 0.0 |
| 1499.7 | 1.44892 | 0.0 |
| 1599.0 | 1.44863 | 0.0 |
| 1688.4 | 1.44841 | 0.0 |

TABLE 2

Refractive indices and dispersion curve for a $Si_uAl_vO_xN_y$ layer vs. wavelength.

| Material | Reactive sputtered $Si_uAl_vO_xN_y$ or $AlO_xN_y$ | |
|---|---|---|
| Wavelength (nm) | Refractive Index (n) | Extinction Coefficient (k) |
| 206.6 | 2.37659 | 0.21495 |
| 225.4 | 2.28524 | 0.11270 |
| 251.0 | 2.18818 | 0.04322 |
| 275.5 | 2.12017 | 0.01310 |
| 300.9 | 2.06916 | 0.00128 |
| 324.6 | 2.03698 | 0.0 |
| 350.2 | 2.01423 | 0.0 |
| 360.4 | 2.00718 | 0.0 |
| 371.2 | 2.00059 | 0.0 |
| 380.3 | 1.99562 | 0.0 |
| 389.9 | 1.99090 | 0.0 |
| 400.0 | 1.98640 | 0.0 |
| 410.5 | 1.98213 | 0.0 |
| 421.7 | 1.97806 | 0.0 |
| 430.5 | 1.97513 | 0.0 |
| 439.7 | 1.97230 | 0.0 |
| 449.2 | 1.96958 | 0.0 |
| 459.2 | 1.96695 | 0.0 |
| 469.6 | 1.96441 | 0.0 |
| 480.6 | 1.96197 | 0.0 |

TABLE 2-continued

Refractive indices and dispersion curve for a $Si_uAl_vO_xN_y$ layer vs. wavelength.

| Material | Reactive sputtered $Si_uAl_vO_xN_y$ or $AlO_xN_y$ | |
|---|---|---|
| Wavelength (nm) | Refractive Index (n) | Extinction Coefficient (k) |
| 492.0 | 1.95961 | 0.0 |
| 499.9 | 1.95808 | 0.0 |
| 512.3 | 1.95586 | 0.0 |
| 520.9 | 1.95442 | 0.0 |
| 529.9 | 1.95301 | 0.0 |
| 539.1 | 1.95165 | 0.0 |
| 548.6 | 1.95031 | 0.0 |
| 558.5 | 1.94900 | 0.0 |
| 568.7 | 1.94773 | 0.0 |
| 579.4 | 1.94649 | 0.0 |
| 590.4 | 1.94528 | 0.0 |
| 601.9 | 1.94410 | 0.0 |
| 613.8 | 1.94295 | 0.0 |
| 619.9 | 1.94239 | 0.0 |
| 632.6 | 1.94128 | 0.0 |
| 639.1 | 1.94074 | 0.0 |
| 652.6 | 1.93968 | 0.0 |
| 666.6 | 1.93864 | 0.0 |
| 681.2 | 1.93763 | 0.0 |
| 696.5 | 1.93665 | 0.0 |
| 712.6 | 1.93569 | 0.0 |
| 729.3 | 1.93477 | 0.0 |
| 746.9 | 1.93386 | 0.0 |
| 765.3 | 1.93299 | 0.0 |
| 784.7 | 1.93214 | 0.0 |
| 805.1 | 1.93131 | 0.0 |
| 826.6 | 1.93051 | 0.0 |
| 849.2 | 1.92973 | 0.0 |
| 873.1 | 1.92898 | 0.0 |
| 898.4 | 1.92825 | 0.0 |
| 925.3 | 1.92754 | 0.0 |
| 953.7 | 1.92686 | 0.0 |
| 999.9 | 1.92587 | 0.0 |
| 1050.7 | 1.92494 | 0.0 |

TABLE 3

Refractive indices and dispersion curve for ABS glass substrate vs. wavelength.

| Material Wavelength (nm) | Refractive Index (n) | Extinction Coefficient (k) |
|---|---|---|
| Aluminosilicate glass | | |
| 350.6 | 1.53119 | 0.0 |
| 360.7 | 1.52834 | 0.0 |
| 370.8 | 1.52633 | 0.0 |
| 380.8 | 1.52438 | 0.0 |
| 390.9 | 1.52267 | 0.0 |
| 400.9 | 1.52135 | 0.0 |
| 411.0 | 1.52034 | 0.0 |
| 421.0 | 1.51910 | 0.0 |
| 431.1 | 1.51781 | 0.0 |
| 441.1 | 1.51686 | 0.0 |
| 451.2 | 1.51600 | 0.0 |
| 461.2 | 1.51515 | 0.0 |
| 471.2 | 1.51431 | 0.0 |
| 481.3 | 1.51380 | 0.0 |
| 491.3 | 1.51327 | 0.0 |
| 501.3 | 1.51259 | 0.0 |
| 511.4 | 1.51175 | 0.0 |
| 521.4 | 1.51124 | 0.0 |
| 531.4 | 1.51082 | 0.0 |
| 541.5 | 1.51040 | 0.0 |
| 551.5 | 1.50999 | 0.0 |
| ABS glass | | |
| 561.5 | 1.50959 | 0.0 |
| 571.5 | 1.50918 | 0.0 |
| 581.6 | 1.50876 | 0.0 |
| 591.6 | 1.50844 | 0.0 |
| 601.6 | 1.50828 | 0.0 |
| 611.6 | 1.50789 | 0.0 |
| 621.7 | 1.50747 | 0.0 |
| 631.7 | 1.50707 | 0.0 |
| 641.7 | 1.50667 | 0.0 |
| 651.7 | 1.50629 | 0.0 |
| 661.7 | 1.50591 | 0.0 |
| 671.8 | 1.50555 | 0.0 |
| 681.8 | 1.50519 | 0.0 |
| 691.8 | 1.50482 | 0.0 |
| 701.8 | 1.50445 | 0.0 |
| 709.8 | 1.50449 | 0.0 |
| 719.8 | 1.50456 | 0.0 |
| 729.9 | 1.50470 | 0.0 |
| 739.9 | 1.50484 | 0.0 |
| 749.9 | 1.50491 | 0.0 |

TABLE 4

Refractive indices and dispersion curve for sapphire substrate vs. wavelength.

| Material Wavelength (nm) | Sapphire | |
|---|---|---|
| | Refractive Index (n) | Extinction Coefficient (k) |
| 206.6 | 1.83400 | 0.0 |
| 210.1 | 1.83366 | 0.0 |
| 213.8 | 1.83355 | 0.0 |
| 217.5 | 1.83361 | 0.0 |
| 221.4 | 1.83378 | 0.0 |
| 225.4 | 1.83400 | 0.0 |
| 229.6 | 1.83422 | 0.0 |
| 233.9 | 1.83439 | 0.0 |
| 238.4 | 1.83445 | 0.0 |
| 243.1 | 1.83434 | 0.0 |
| 248.0 | 1.83400 | 0.0 |
| 253.0 | 1.83326 | 0.0 |
| 258.3 | 1.83221 | 0.0 |
| 263.8 | 1.83083 | 0.0 |
| 269.5 | 1.82910 | 0.0 |
| 275.5 | 1.82700 | 0.0 |
| 281.8 | 1.82398 | 0.0 |
| 288.3 | 1.82067 | 0.0 |
| 295.2 | 1.81717 | 0.0 |
| 302.4 | 1.81358 | 0.0 |
| 310.0 | 1.81000 | 0.0 |
| 317.9 | 1.80699 | 0.0 |
| 326.3 | 1.80410 | 0.0 |
| 335.1 | 1.80130 | 0.0 |
| 344.4 | 1.79861 | 0.0 |
| 354.2 | 1.79600 | 0.0 |
| 364.7 | 1.79341 | 0.0 |
| 375.7 | 1.79090 | 0.0 |
| 387.5 | 1.78850 | 0.0 |
| 400.0 | 1.78619 | 0.0 |
| 413.3 | 1.78400 | 0.0 |
| 427.5 | 1.78202 | 0.0 |
| 442.8 | 1.78015 | 0.0 |
| 459.2 | 1.77837 | 0.0 |
| 476.9 | 1.77666 | 0.0 |
| 495.9 | 1.77500 | 0.0 |
| 516.6 | 1.77335 | 0.0 |
| 539.1 | 1.77174 | 0.0 |
| 563.6 | 1.77014 | 0.0 |
| 590.4 | 1.76857 | 0.0 |
| 619.9 | 1.76700 | 0.0 |
| 652.6 | 1.76540 | 0.0 |
| 688.8 | 1.76380 | 0.0 |

TABLE 4-continued

Refractive indices and dispersion curve for sapphire substrate vs. wavelength.

| Material | Sapphire | |
|---|---|---|
| Wavelength (nm) | Refractive Index (n) | Extinction Coefficient (k) |
| 729.3 | 1.76220 | 0.0 |
| 774.9 | 1.76060 | 0.0 |
| 826.6 | 1.75900 | 0.0 |
| 885.6 | 1.75740 | 0.0 |
| 953.7 | 1.75580 | 0.0 |
| 1033.2 | 1.75420 | 0.0 |
| 1127.1 | 1.75260 | 0.0 |
| 1239.9 | 1.75100 | 0.0 |
| 1377.6 | 1.74900 | 0.0 |
| 1549.8 | 1.74600 | 0.0 |
| 1771.2 | 1.74200 | 0.0 |

TABLE 5

Refractive indices and dispersion curve for $Nb_2O_5$-RS vs. wavelength.

| Material | Reactive sputtered $Nb_2O_5$ | |
|---|---|---|
| Wavelength (nm) | Refractive Index (n) | Extinction Coefficient (k) |
| 206.6 | 2.04389 | 0.66079 |
| 250.0 | 2.32991 | 1.05691 |
| 300.2 | 3.14998 | 0.45732 |
| 325.0 | 2.94490 | 0.12012 |
| 350.2 | 2.74715 | 0.02027 |
| 375.1 | 2.62064 | 0.00048 |
| 400.6 | 2.53696 | 0.0 |
| 425.3 | 2.48169 | 0.0 |
| 450.0 | 2.44210 | 0.0 |
| 475.0 | 2.41223 | 0.0 |
| 500.9 | 2.38851 | 0.0 |
| 525.4 | 2.37086 | 0.0 |
| 549.8 | 2.35647 | 0.0 |
| 575.3 | 2.34409 | 0.0 |
| 600.4 | 2.33392 | 0.0 |
| 624.6 | 2.32557 | 0.0 |
| 650.8 | 2.31779 | 0.0 |
| 675.7 | 2.31142 | 0.0 |
| 700.5 | 2.30583 | 0.0 |
| 725.1 | 2.30093 | 0.0 |
| 749.1 | 2.29665 | 0.0 |
| 774.9 | 2.29255 | 0.0 |
| 799.9 | 2.28898 | 0.0 |
| 849.2 | 2.28288 | 0.0 |
| 901.7 | 2.27749 | 0.0 |
| 999.9 | 2.26958 | 0.0 |
| 1102.1 | 2.26342 | 0.0 |
| 1203.7 | 2.25867 | 0.0 |
| 1298.3 | 2.25513 | 0.0 |
| 1400.9 | 2.25198 | 0.0 |
| 1502.8 | 2.24939 | 0.0 |
| 1599.8 | 2.24730 | 0.0 |
| 1698.4 | 2.24547 | 0.0 |
| 1796.9 | 2.24389 | 0.0 |
| 1892.9 | 2.24254 | 0.0 |
| 1999.7 | 2.24122 | 0.0 |
| 2066.4 | 2.24047 | 0.0 |

TABLE 6

Refractive indices and dispersion curve for $Al_2O_3$-RS vs. wavelength.

| Material | Reactive sputtered $Al_2O_3$ | |
|---|---|---|
| Wavelength (nm) | Refractive Index (n) | Extinction Coefficient (k) |
| 251.3 | 1.76256 | 0.0 |
| 275.2 | 1.74075 | 0.0 |
| 300.8 | 1.72358 | 0.0 |
| 324.7 | 1.71136 | 0.0 |
| 350.2 | 1.70121 | 0.0 |
| 375.8 | 1.69321 | 0.0 |
| 401.3 | 1.68679 | 0.0 |
| 425.2 | 1.68185 | 0.0 |
| 450.7 | 1.67747 | 0.0 |
| 474.7 | 1.67402 | 0.0 |
| 500.2 | 1.67089 | 0.0 |
| 525.7 | 1.66823 | 0.0 |
| 549.5 | 1.66608 | 0.0 |
| 575.0 | 1.66408 | 0.0 |
| 600.5 | 1.66234 | 0.0 |
| 625.9 | 1.66082 | 0.0 |
| 649.7 | 1.65955 | 0.0 |
| 675.1 | 1.65835 | 0.0 |
| 700.5 | 1.65728 | 0.0 |
| 725.9 | 1.65633 | 0.0 |
| 749.7 | 1.65552 | 0.0 |
| 775.0 | 1.65474 | 0.0 |
| 800.4 | 1.65404 | 0.0 |
| 850.9 | 1.65282 | 0.0 |
| 899.8 | 1.65184 | 0.0 |
| 950.2 | 1.65098 | 0.0 |
| 999.0 | 1.65027 | 0.0 |
| 1100.0 | 1.64909 | 0.0 |
| 1199.6 | 1.64821 | 0.0 |
| 1302.0 | 1.64751 | 0.0 |
| 1400.8 | 1.64698 | 0.0 |
| 1499.7 | 1.64654 | 0.0 |
| 1599.0 | 1.64619 | 0.0 |
| 1688.4 | 1.64592 | 0.0 |

Anti-reflection coatings according to known designs and to embodiments described herein, low contrast structures were designed using the refractive index values thus obtained. As will be illustrated by the Examples, low-contrast anti-reflection coatings exhibit: 1) low contrast ratios across a broad range of wavelength widths or across the visible spectrum and for various surface defects, 2) low absolute reflectance $R_2$ at areas with surface defects, and 3) low color shift at areas with surface defects, at different incident illumination angles under different illuminants, when compared to known anti-reflection coatings. In the Examples, color shifts were calculated relative to absolute white (0,0), using a D65 illuminant. The reflectance of the designs was modeled in an immersed state. As used herein, the phrase "immersed state" includes the measurement of the average reflectance by subtracting or otherwise removing reflections created by the article at interfaces other than those involving the anti-reflection coating. Surface defect conditions used in the Examples are as follows: Condition "A"=surface thickness removal of 25 nm; Condition "B"=surface thickness removal of 50 nm; Condition "C"=surface thickness removal of 75 nm; Condition "D"=addition of contaminant having a thickness of 100 nm; Condition "E"=addition of contaminant having a thickness of 500 nm; and Condition "F"=addition of contaminant having a thickness of 2000 nm.

Modeled Comparative Examples 1 and 2

Modeled Examples 1 and 2 is an article having the same structure as shown in Tables 7 and 8. Modeled Example 1 includes a chemically strengthened alkali aluminoborosilicate glass substrate and an anti-reflection coating disposed on the substrate. Modeled Example 2 includes a sapphire substrate and an anti-reflection coating disposed on the substrate. The anti-reflection coating materials and thicknesses of each layer of material, in the order arranged in the anti-reflection coating, are provided in Tables 7 and 8.

TABLE 7

Structure of Modeled Comparative Example 1, in pristine condition.

| Material | Thickness (nm) |
| --- | --- |
| Air | Immersed |
| $SiO_2$ | 88.25 |
| $Nb_2O_5$ | 114.16 |
| $SiO_2$ | 35.24 |
| $Nb_2O_5$ | 12.41 |
| ABS glass | Immersed |

TABLE 8

Structure of Modeled Comparative Example 2, in pristine condition.

| Material | Thickness (nm) |
| --- | --- |
| Air | Immersed |
| $SiO_2$ | 86 |
| $Nb_2O_5$ | 117.37 |
| $SiO_2$ | 24.89 |
| $Nb_2O_5$ | 15.41 |
| Sapphire | Immersed |

Figure 5A:
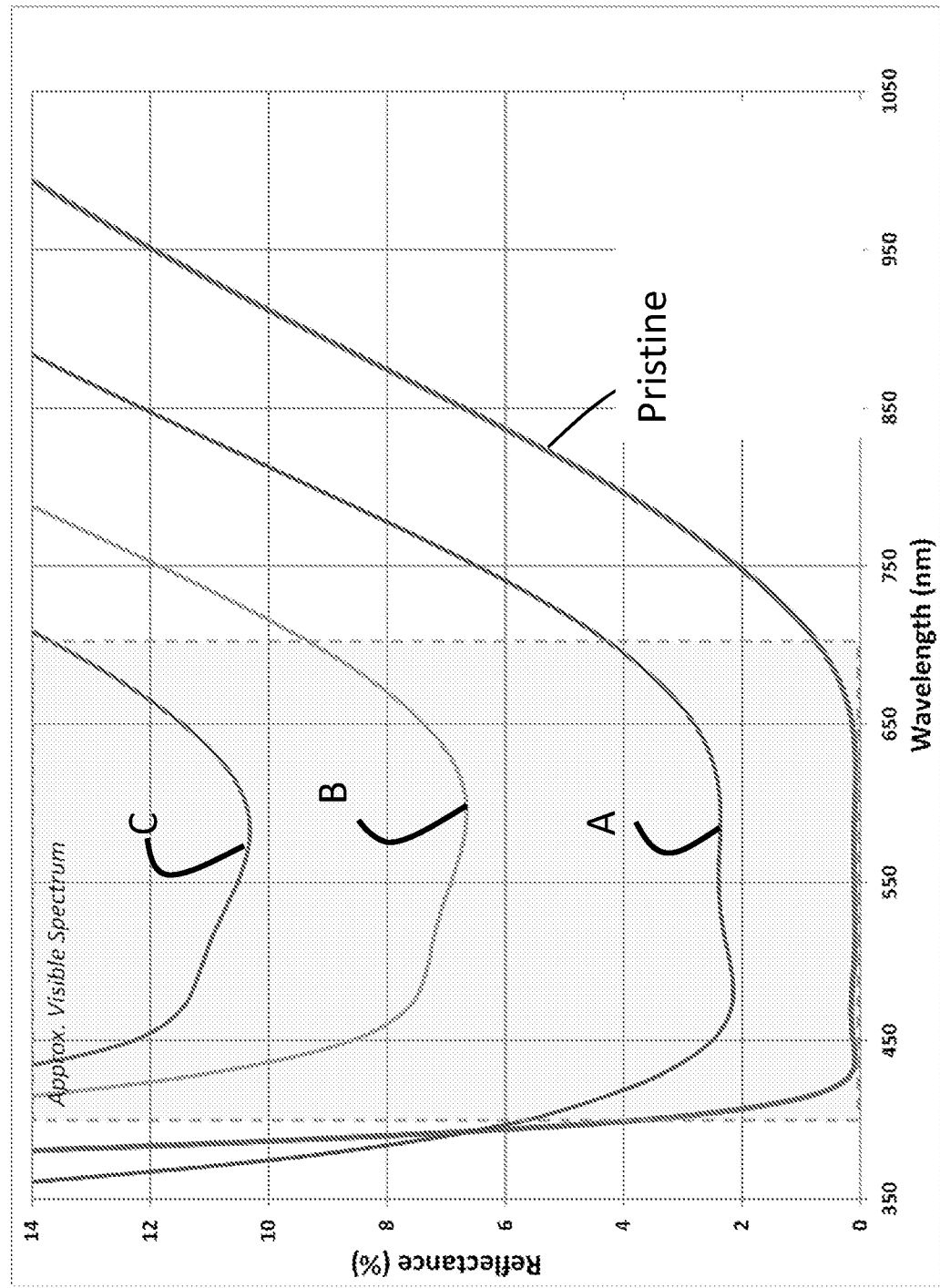
FIG. 5A is graph of reflectance spectra of the article of Modeled Comparative Example 1, after removal of different surface thicknesses.
Figure 5B:
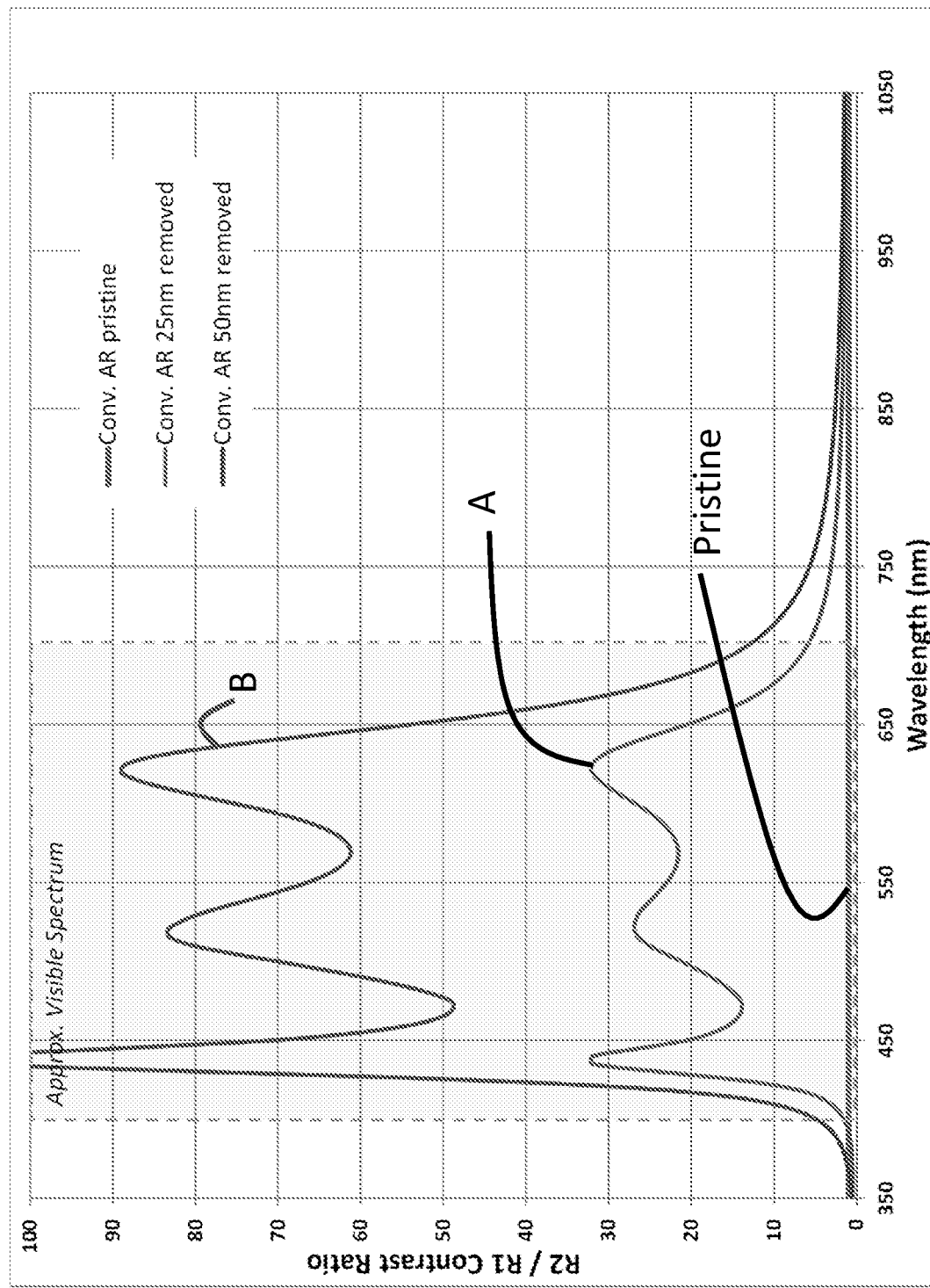
FIG. 5B is a graph showing the contrast ratio of the article shown in FIG. 5A, after removal of different surface thicknesses.
Figure 5C:
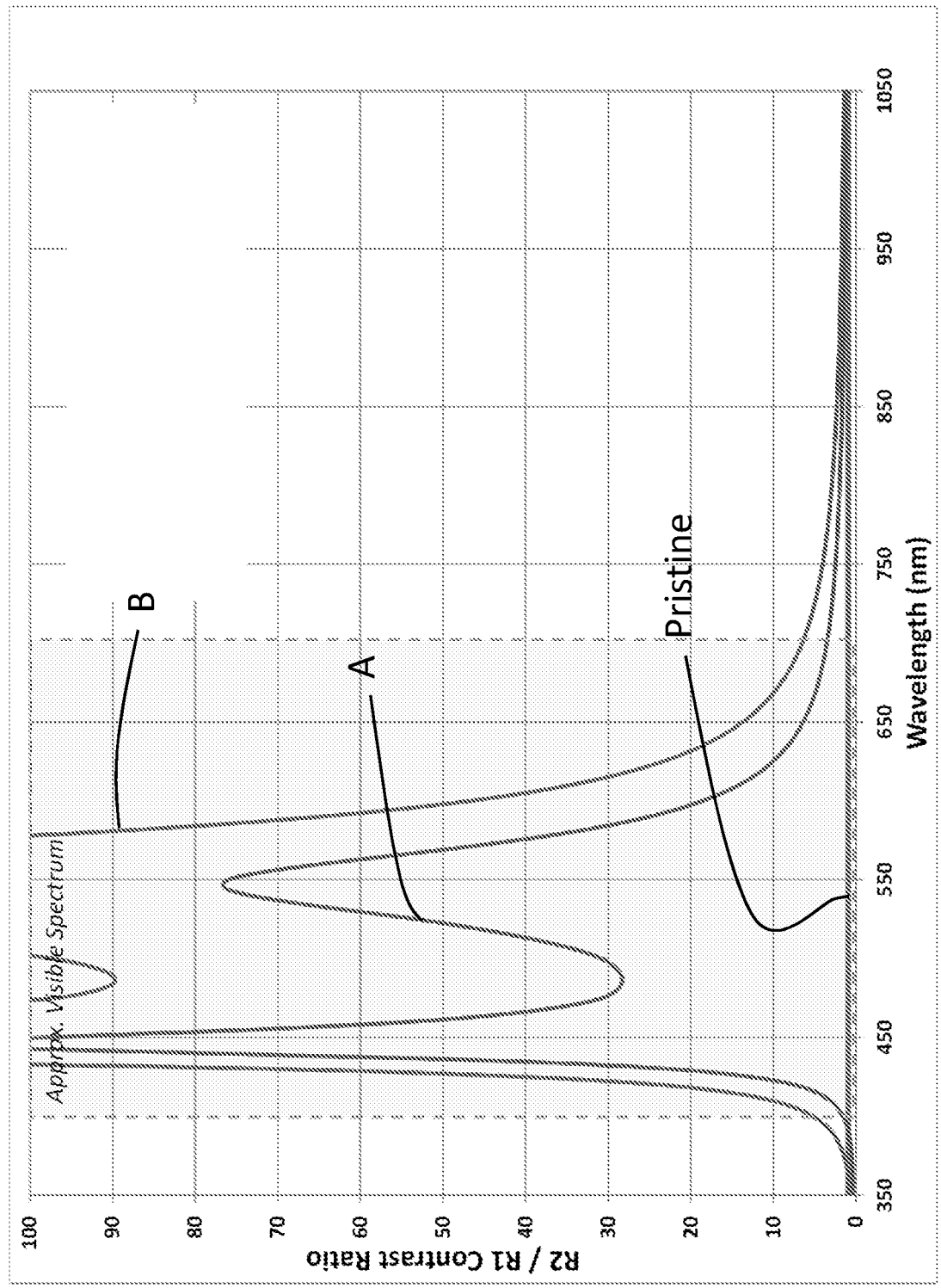
FIG. 5C is a graph showing the contrast ratio of Modeled Comparative Example 2, after removal of different surface thicknesses.

FIGS. 5A-5C illustrate the change in modeled reflectance, at normal incidence, of the coated surface of Modeled Comparative Examples 1 and 2 in pristine condition and the coated surface of Modeled Comparative Examples 1 and 2 with surface defect Conditions A, B and C. As shown in FIG. 5A, the reflectance of the coated surface of Modeled Comparative Example 1 increases as the surface thickness removal increases. Specifically, the reflectance in the pristine condition is less than about 0.5% within the visible spectrum in the range from about 425 nm to about 650 nm and the reflectance after surface defect Condition C is greater than about 10.5% with 100 nm surface thickness removal within the same visible spectrum range, which is an increase of about 10% absolute reflectance. Thus, the visibility of the surface defect increases, when compared to the rest of the anti-reflective coating, which is free of surface defects. FIG. 5B illustrates the contrast ratio of Modeled Comparative Example 1, after removal of different surface thicknesses. The contrast ratios increase from significantly as larger surface thicknesses is removed and contrast ratio values of greater than about 15 and greater than about 45 are observed, over the visible spectrum in the range from about 400 nm to about 700 nm. FIG. 5C illustrates the contrast ratio of Modeled Comparative Example 2 and shows the surface defect visibility is even more pronounced (even at low surface thicknesses) when sapphire substrates are used.

Figure 5D:
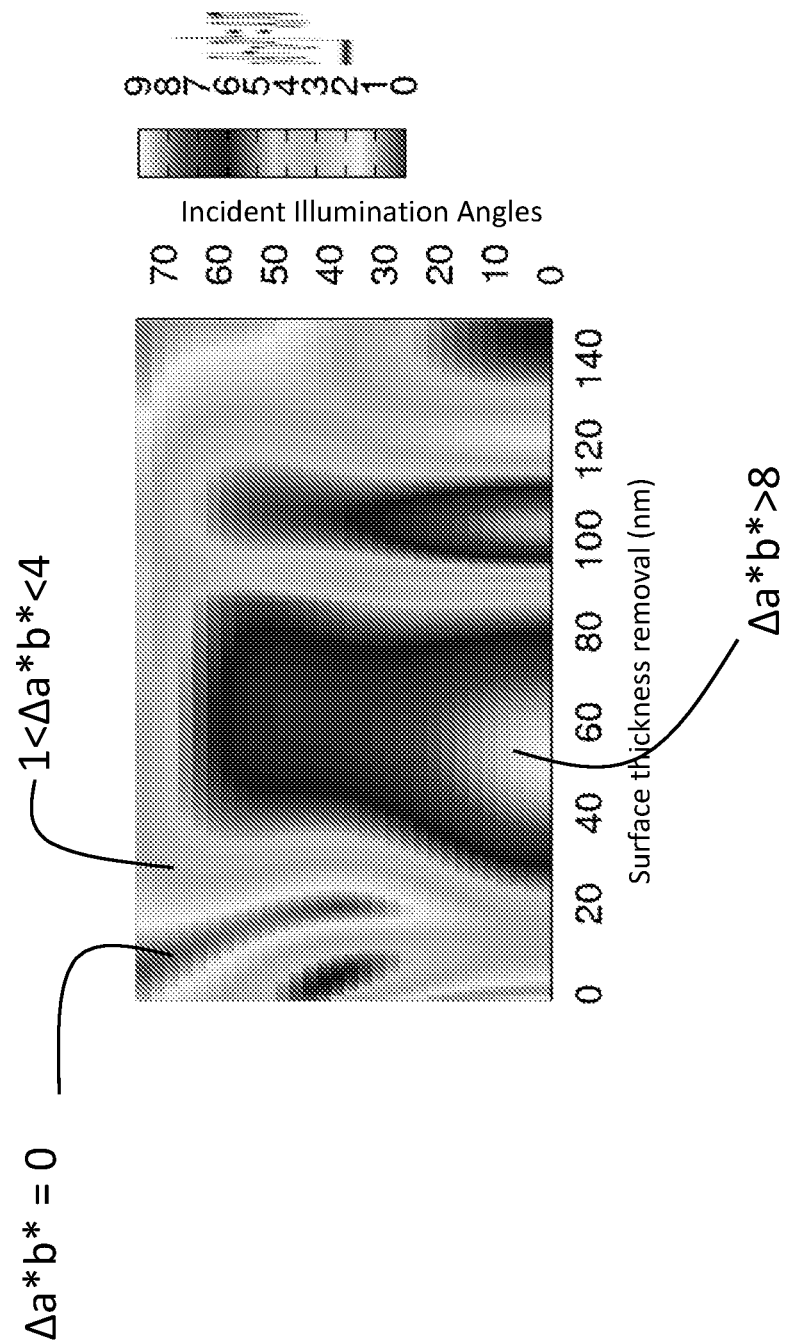
FIG. 5D is a graph showing $\Delta a*b*$ of the article shown in FIG. 5A, as a function of surface thickness removal and incident illumination angle.

FIG. 5D shows the modeled change in color in terms of Δa*b* for different surface thickness removals and changing incident illumination angle. At surface thickness removals in the range from about 30 nm to about 70 nm, and from about 100 nm to 110 nm, Δa*b* values exceed 6 at incidence illumination angles up to about 60 degrees and can reach as high as 9, at incidence illumination angles of up to about 20 degrees.

Modeled Example 3

Modeled Example 3 is an article having a structure as shown in Table 9 and includes a chemically strengthened ABS glass substrate and an anti-reflection coating disposed on the substrate. The anti-reflection coating materials and thicknesses of each layer of material, in the order arranged in the anti-reflection coating, are provided in Table 9.

TABLE 9

Structure of Modeled Example 3, in pristine condition.

| Material | Thickness (nm) |
| --- | --- |
| Air | Immersed |
| $SiO_2$ | 108 |
| $AlO_xN_y$ | 35 |
| $SiO_2$ | 38.8 |
| $AlO_xN_y$ | 34 |
| $SiO_2$ | 50.1 |
| $AlO_xN_y$ | 11.5 |
| ABS glass | immersed |

Figure 6A:
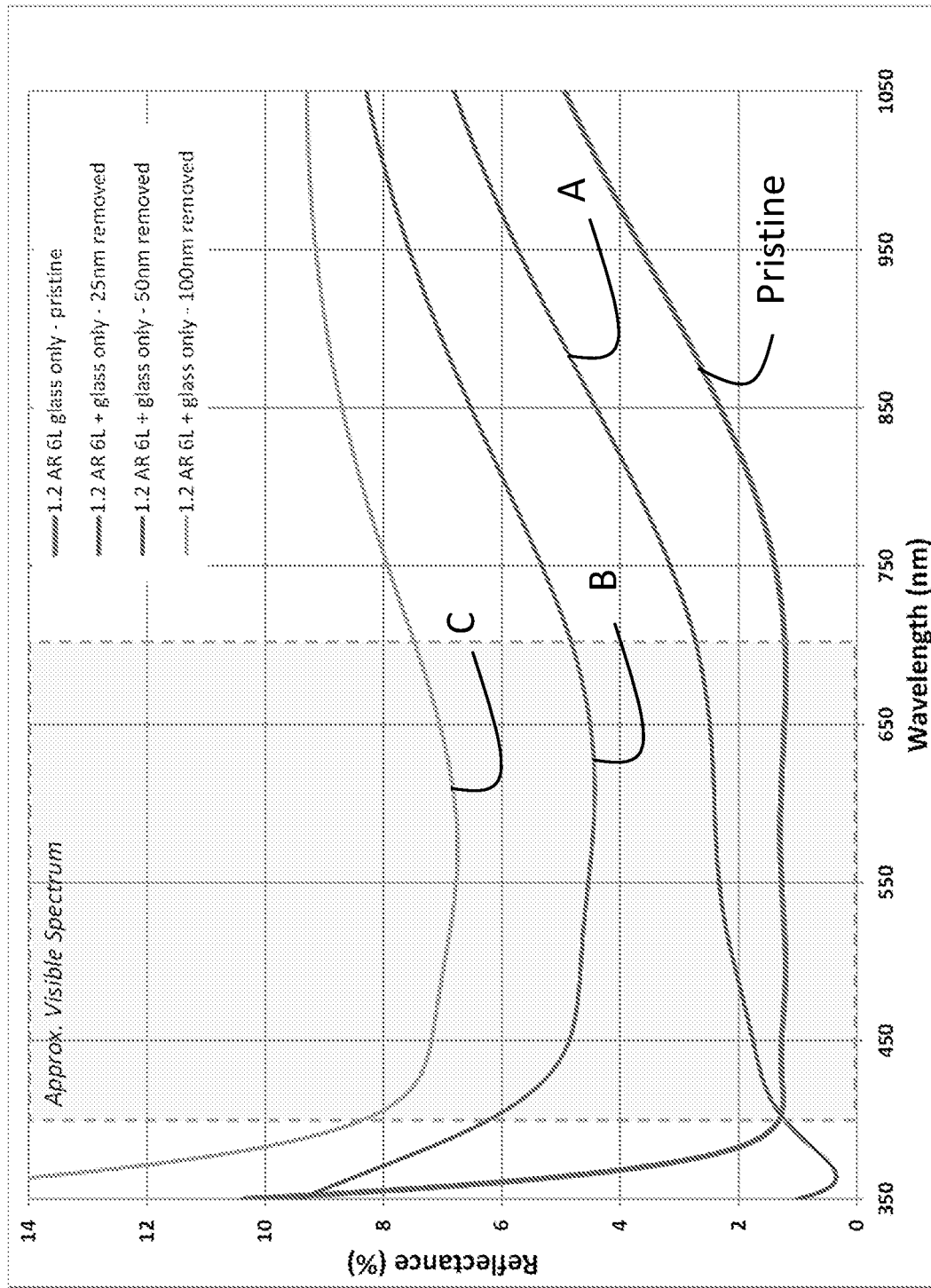
FIG. 6A is a graph of reflectance spectra of Modeled Example 3, after removal of different surface thicknesses.
Figure 6B:
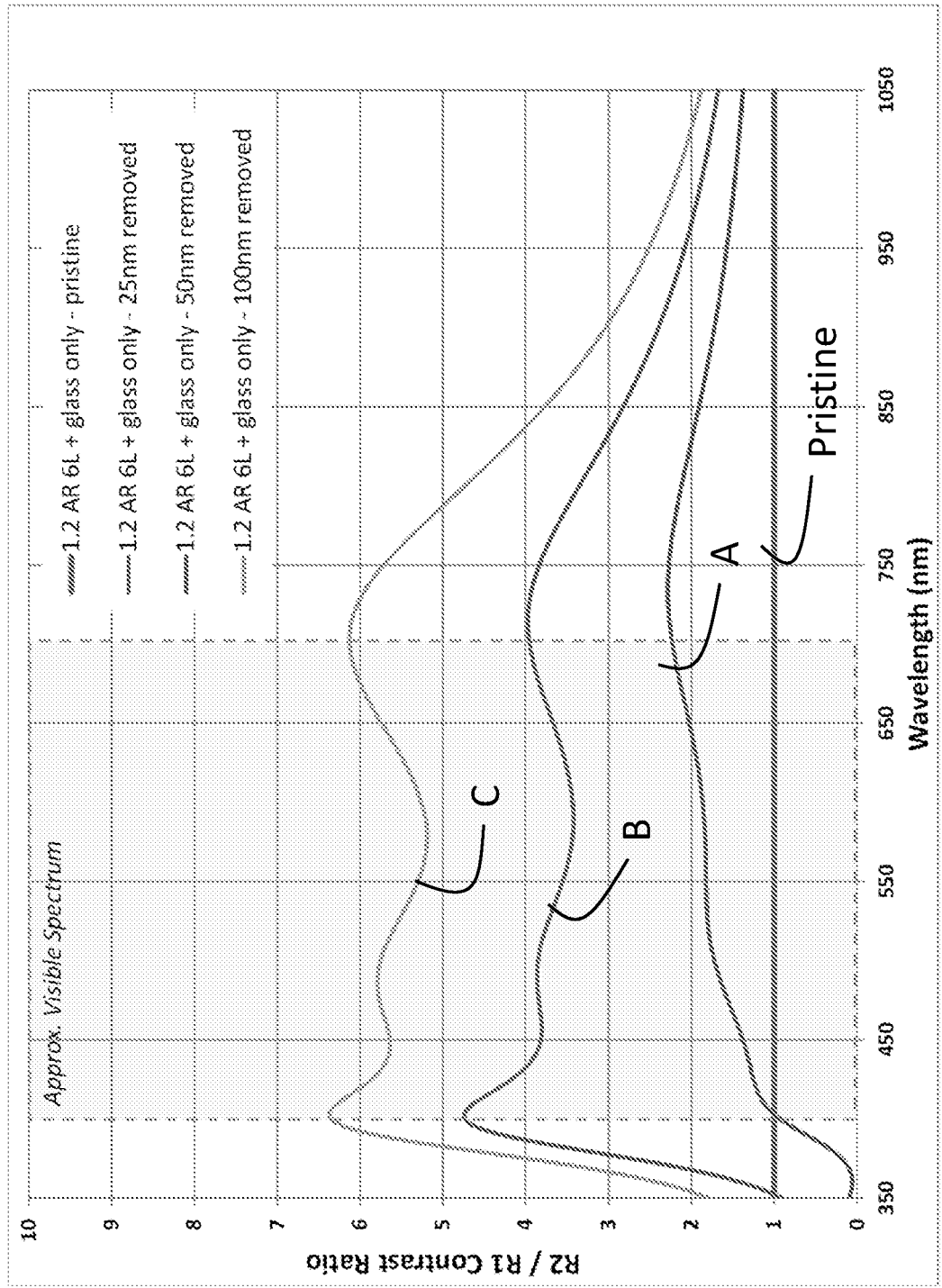
FIG. 6B is a graph showing the contrast ratio of the article shown in FIG. 6A, after removal of different surface thicknesses.

FIG. 6A illustrates the change in modeled reflectance at normal incidence of the coated surface of Modeled Example 3 in pristine condition and with surface defect Conditions A, B and C. As shown in in FIG. 6A, the reflectance increases as the surface thickness removal increases; however the increase in reflectance reduced, when compared to Modeled Comparative Examples 1 and 2. In the pristine condition, the reflectance is about 1.2% within the visible spectrum in the range from about 400 nm to about 700 nm. The reflectance increases after surface defect Condition C (i.e., 100 nm surface thickness removal) to less than about 8% in the same visible spectrum range, which is an increase of 6.8% absolute reflectance over the pristine condition. When compared to Modeled Comparative Examples 1 and 2, the visibility of the surface defect including up to 100 nm surface thickness removal would be significantly reduced. FIG. 6B illustrates the contrast ratio of the Modeled Example 3, after removal of different surface thicknesses. Contrast ratio values of less than 6 are observed over the visible spectrum in the range from about 400 nm to about 700 nm, even when up to 100 nm of surface thickness was removed, which are significantly less than the contrast ratios observed with Modeled Comparative Examples 1 and 2.

Figure 6C:
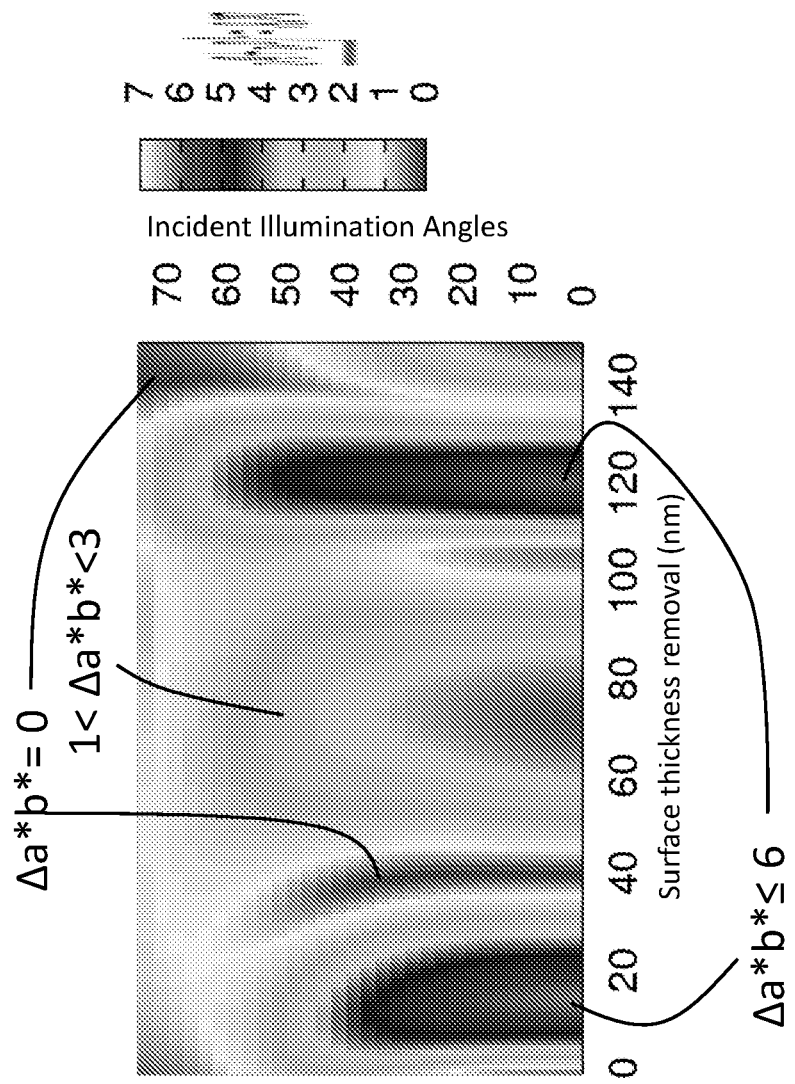
FIG. 6C is a graph showing $\Delta a*b*$ of the article shown in FIG. 6A, as a function of surface thickness removal and incident illumination angle.

FIG. 6C shows the modeled change in color in terms of Δa*b* of the coated surface of Modeled Example 3, after different surface thickness removals and changing incident illumination angle. The greatest change in color (or the highest values of Δa*b*) were observed at surface thickness removals in the range from about 10 nm to about 20 m and from about 110 nm to about 130 nm, at which Δa*b* values are in the range from about 4 to about 6, at incidence illumination angles of up to about 60 degrees. At all other incident illumination angles and surface thicknesses, the Δa*b* values are less than 4.

Modeled Example 4

Modeled Example 4 is an article having a structure as shown in Table 10 and includes a sapphire substrate and an anti-reflection coating disposed on the substrate. The anti-reflection coating materials and thicknesses of each layer of material, in the order arranged in the anti-reflection coating, are provided in Table 10.

TABLE 10

Structure of Modeled Example 4, in pristine condition.

| Material | Thickness (nm) |
|---|---|
| Air | Immersed |
| $SiO_2$ | 120.6 |
| $AlO_xN_y$ | 21.5 |
| $SiO_2$ | 42.8 |
| $AlO_xN_y$ | 29.6 |
| $SiO_2$ | 19.3 |
| $AlO_xN_y$ | 6.2 |
| Sapphire | immersed |

TABLE 11

Structure of Modeled Example 5, in pristine condition.

| Material | Thickness (nm) |
|---|---|
| Air | Immersed |
| $SiO_2$ | 99.18 |
| $AlO_xN_y$ | 44.11 |
| $SiO_2$ | 8.26 |
| $AlO_xN_y$ | 86.41 |
| $SiO_2$ | 26.05 |
| $AlO_xN_y$ | 26.64 |
| $SiO_2$ | 47.34 |
| $AlO_xN_y$ | 7.26 |
| ABS glass | immersed |

Figure 7A:
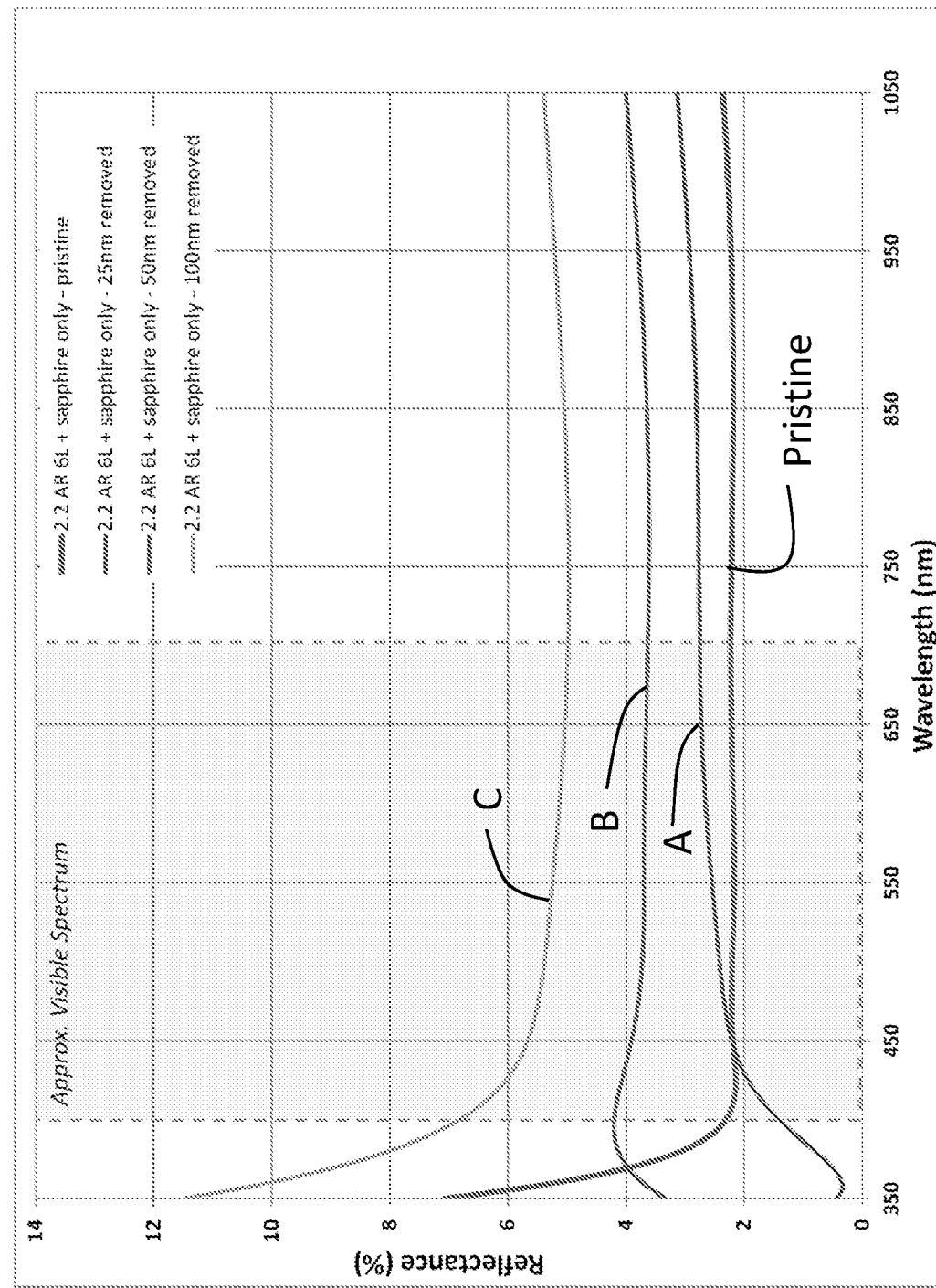
FIG. 7A is a graph of reflectance spectra of Modeled Example 4, after removal of different surface thicknesses.
Figure 7B:
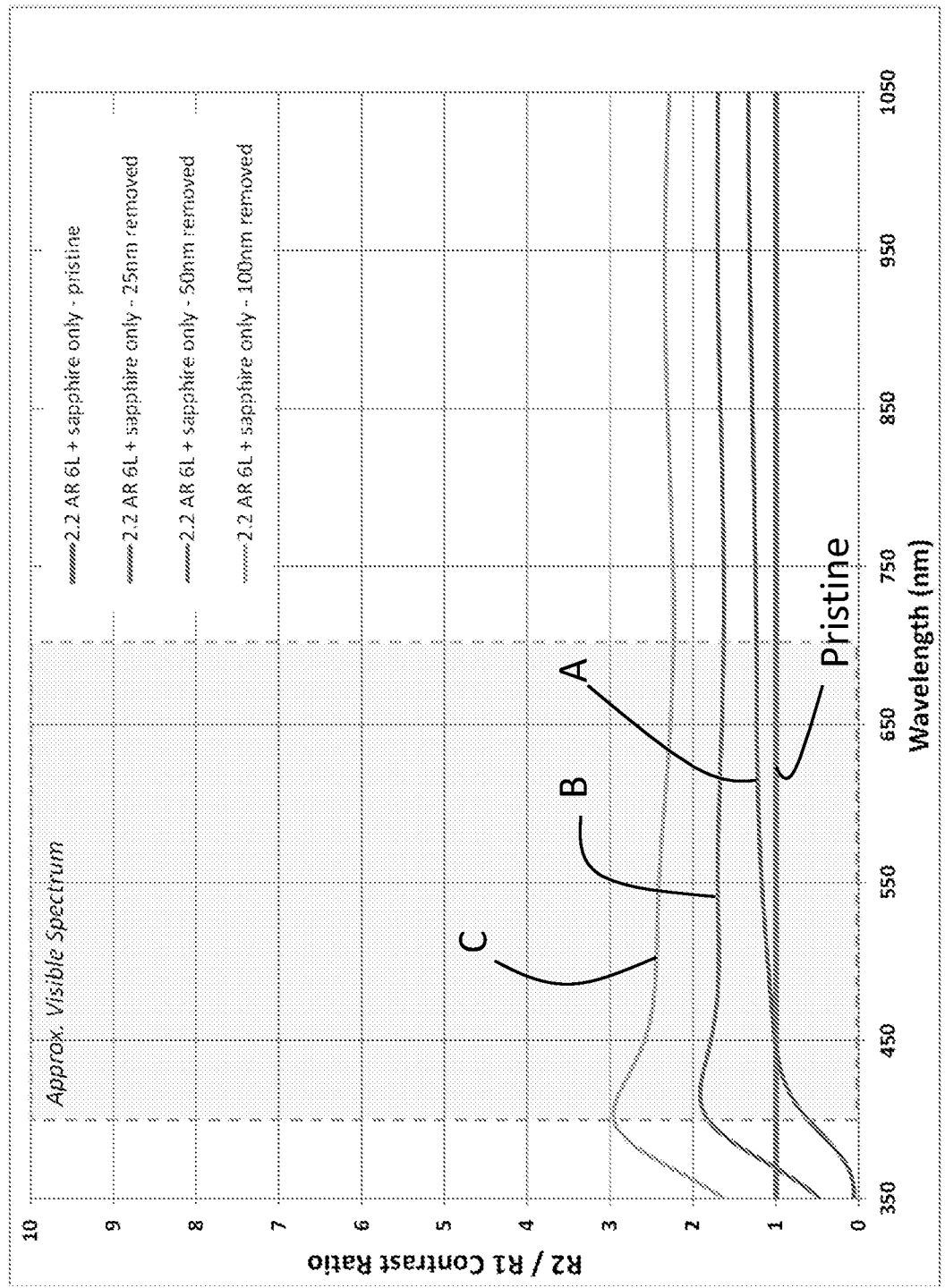
FIG. 7B is a graph showing the contrast ratio of the article shown in FIG. 7A, after removal of different surface thicknesses.

FIG. 7A illustrates the change in modeled reflectance at normal incidence of the coated surface of Modeled Example 4 in pristine condition and with surface defect Conditions A, B and C. As shown in in FIG. 7A, the reflectance increases as the surface thickness removal increases; however the increase in reflectance is reduced, when compared to Modeled Comparative Examples 1 and 2. In the pristine condition, the reflectance was about 2.2% within the visible spectrum in the range from about 400 nm to about 700 nm. After surface defect Condition C (i.e., removal of 100 nm of surface thickness), the reflectance increases to less than about 7% within the visible spectrum in the range from about 400 nm to about 700 and to less than about 6% within the visible spectrum in the range from about 420 nm to about 700 nm; and to less than about 5.5% within the visible spectrum in the range from about 450 nm to about 700 nm. The increase in reflectance is less than about 4.8% absolute reflectance and, within some slightly narrower visible spectrum ranges, less than about 3.3% absolute reflectance. When compared to Modeled Comparative Examples 1 and 2, the visibility of a surface defect including up to 100 nm surface thickness removal would be significantly reduced. FIG. 7B illustrates the contrast ratio of the Modeled Example 4, after removal of different surface thicknesses. Contrast ratio values of less than 3 are observed over the visible spectrum in the range from about 400 nm to about 700 nm even when up to 100 nm of surface thickness was removed, which are significantly less than the contrast ratios observed with Modeled Comparative Examples 1 and 2.

Figure 7C:
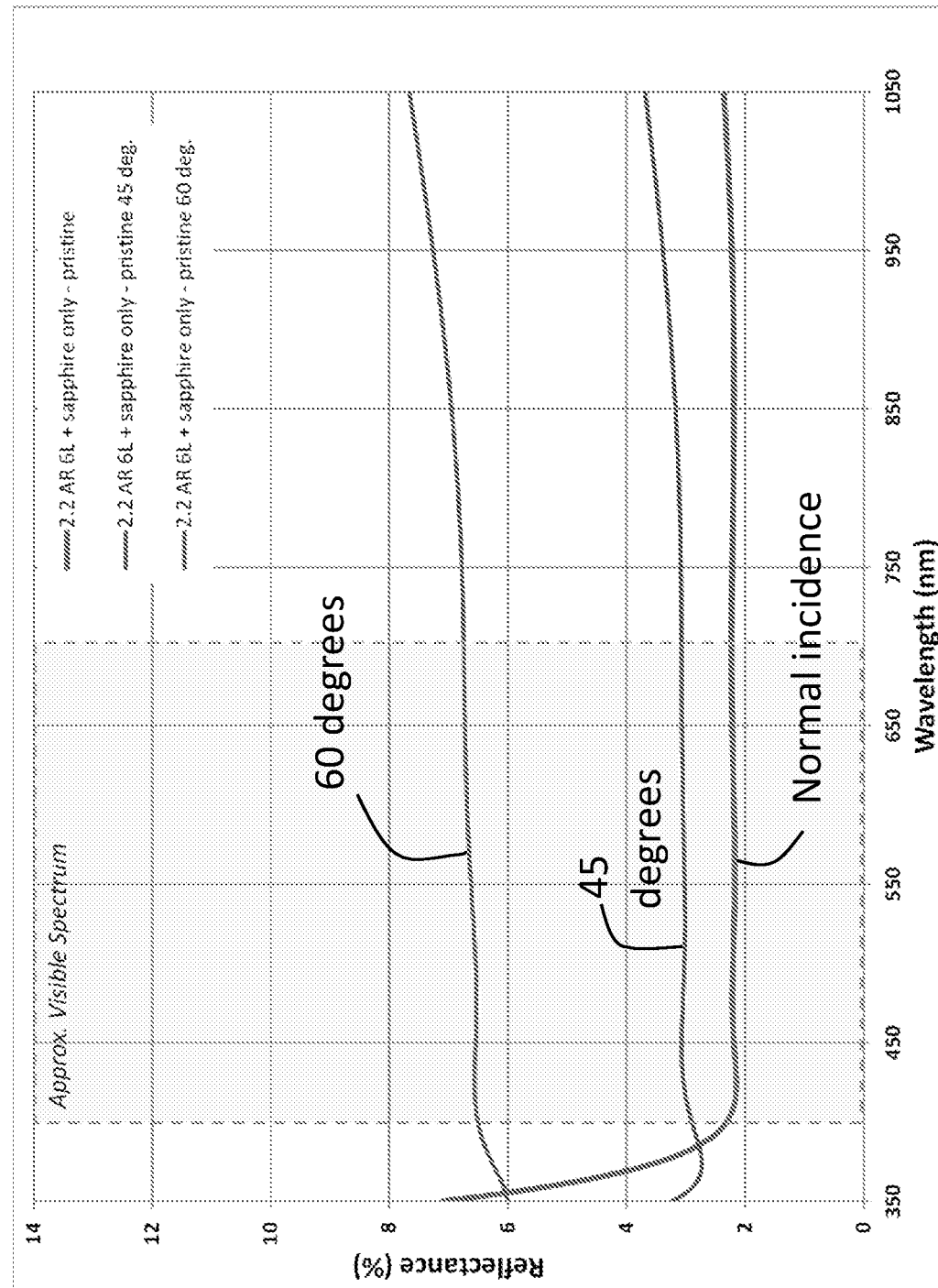
FIG. 7C is a graph of reflectance spectra of Modeled Example 4 in the pristine condition at different incident viewing angles.
Figure 7D:
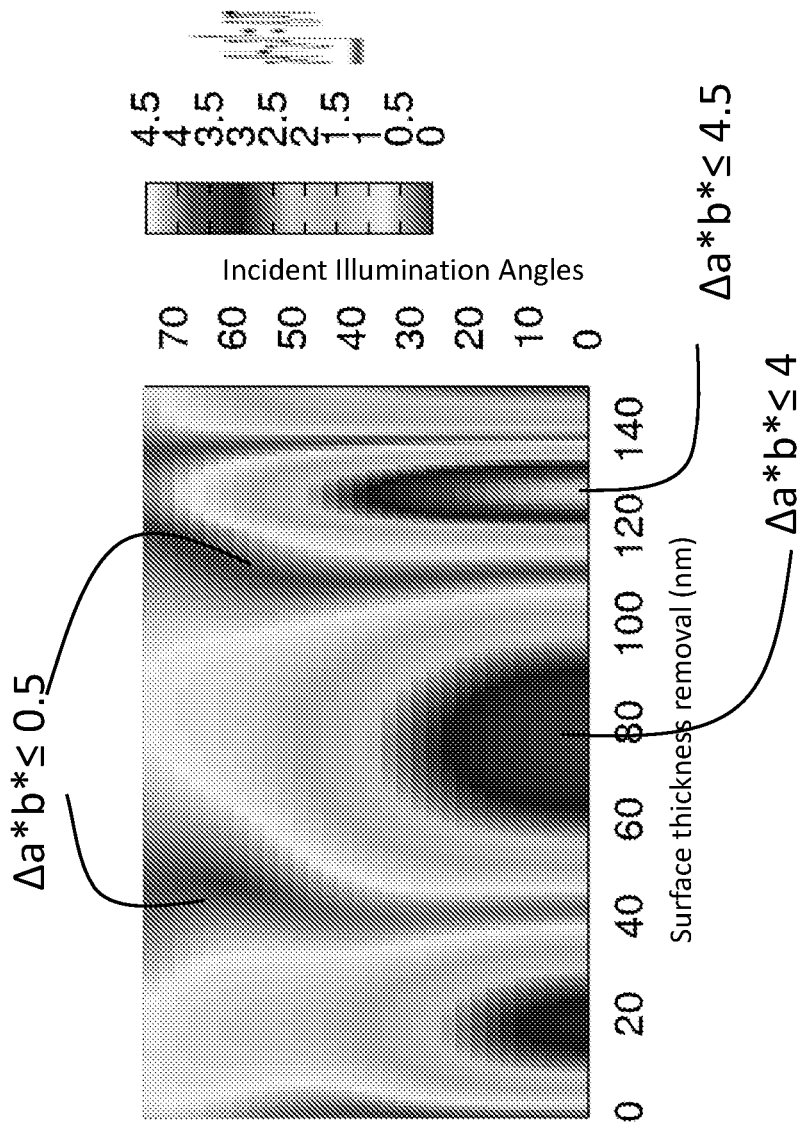
FIG. 7D is a graph showing $\Delta a*b*$ of the article shown in FIG. 7A, as a function of surface thickness removal and incident illumination angle.

FIG. 7C illustrates the modeled change in reflectance of the coated surface of Modeled Example 4 in pristine condition, at different incident illumination angles. FIG. 7D shows the modeled change in color in terms of $\Delta a^*b^*$ for the coated surface of Modeled Example 4, after different surface thickness removals and changing incident illumination angle. The greatest change in color (or the highest values of $\Delta a^*b^*$) are observed at surface thickness removals in the range from about 10 nm to 30 m, from about 60 nm to 130 nm and from about 120 nm to 135 nm, at which $\Delta a^*b^*$ values are in the range from about 2.5 to about 4.5, at incident illumination angles of up to about 40 degrees. At all other incident illumination angles and surface thicknesses, the $\Delta a^*b^*$ values are less than 2.5.

Modeled Example 5

Modeled Example 5 is an article having a structure as shown in Table 11 and includes a chemically strengthened ABS glass substrate and an anti-reflection coating disposed on the substrate. The anti-reflection coating materials and thicknesses of each layer of material, in the order arranged in the anti-reflection coating, are provided in Table 11.

Figure 8A:
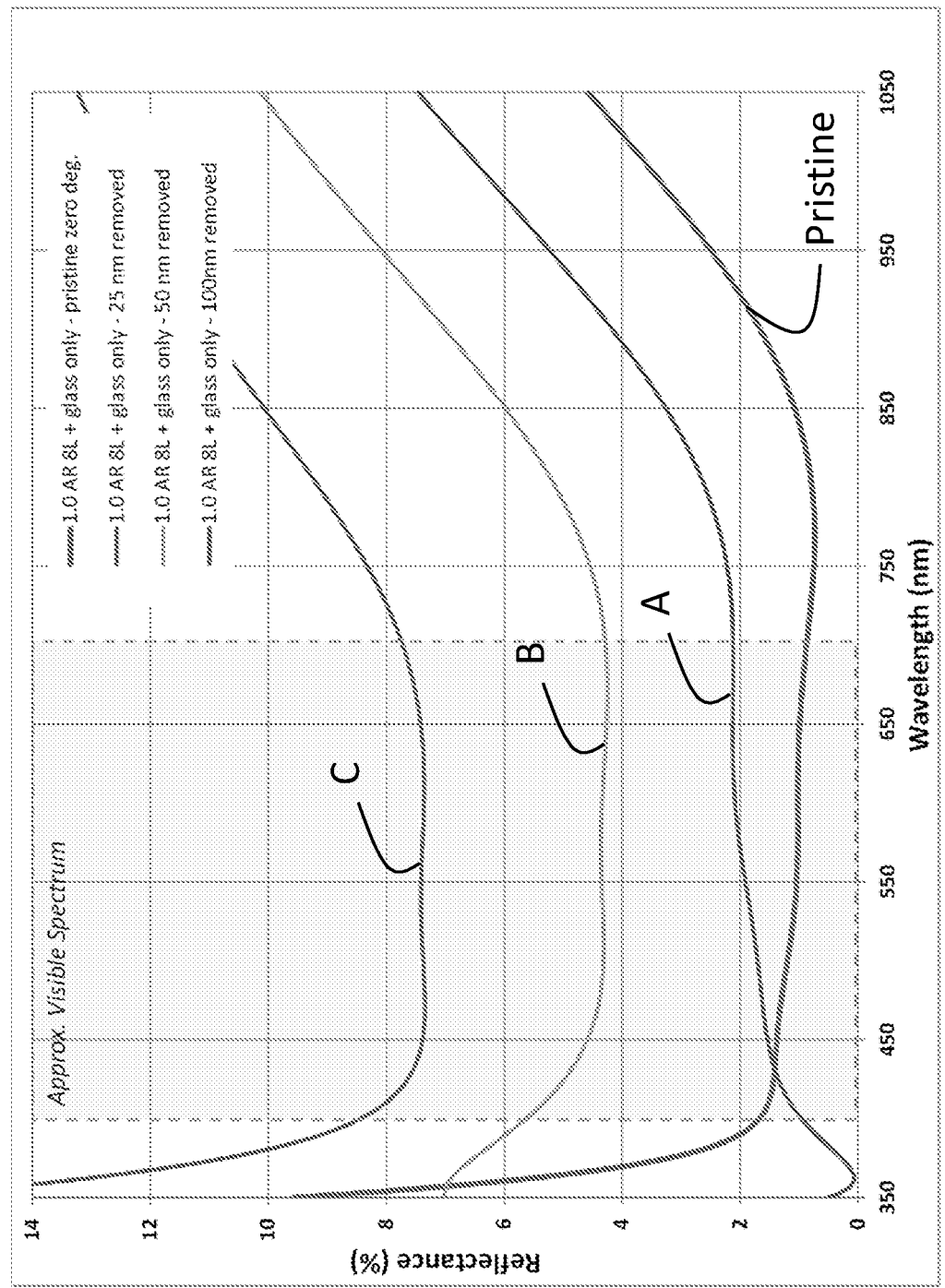
FIG. 8A is a graph of reflectance spectra of Modeled Example 5, after removal of different surface thicknesses.

FIG. 8A illustrates the change in modeled reflectance at normal incidence of the coated surface of Modeled Example 5 in pristine condition and with surface defect Conditions A, B and C. As shown in in FIG. 8A, the reflectance increases as the surface thickness removal increases; however the increase in reflectance is reduced, when compared to Modeled Comparative Examples 1 and 2. In the pristine condition, the reflectance is about 1% within the visible spectrum in the range from about 450 nm to about 700 nm. After surface defect Condition C (i.e., removal of 100 nm of surface thickness), the reflectance increases to less than about 8.5% within the visible spectrum in the range from about 400 nm to about 700 and to less than about 7.5% within the visible spectrum in the range from about 420 nm to about 700 nm. The increase in reflectance is less than about 7.5% absolute reflectance and in some slightly narrower visible spectrum ranges, less than about 6.5% absolute reflectance. When compared to Modeled Comparative Examples 1 and 2, the visibility of the surface defect including up to 100 nm surface thickness removal would be significantly reduced. FIG. 8B illustrates the modeled contrast ratio of the Modeled Example 5, after removal of different surface thicknesses. Contrast ratio values of less than 9 are observed over the visible spectrum in the range from about 400 nm to about 700 nm, even when up to 100 nm of surface thickness is removed, which are significantly less than the contrast ratios observed with Modeled Comparative Examples 1 and 2.

Figure 8C:
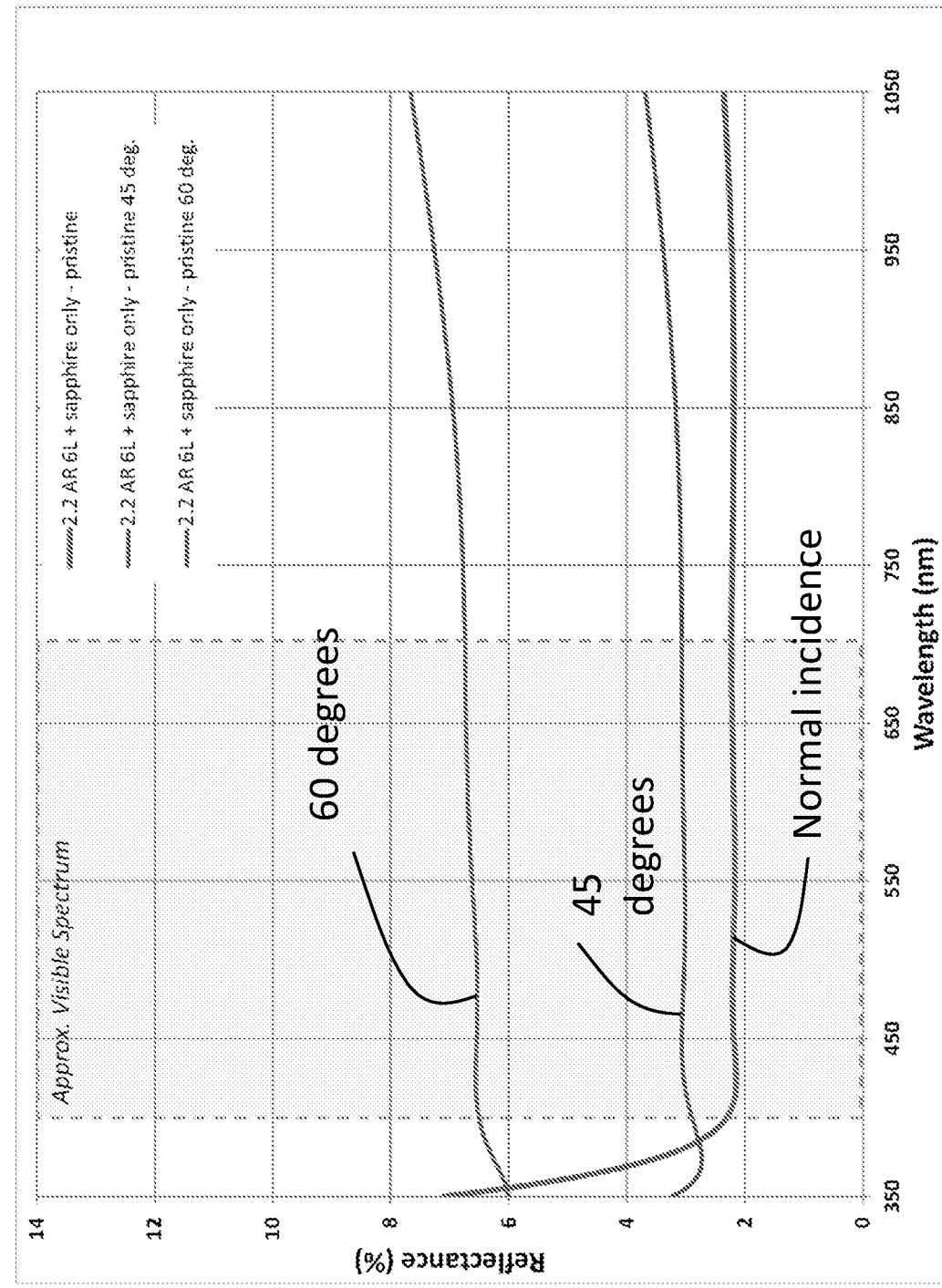
FIG. 8C is a graph of reflectance spectra of Modeled Example 5 in the pristine condition at different incident viewing angles.
Figure 8D:
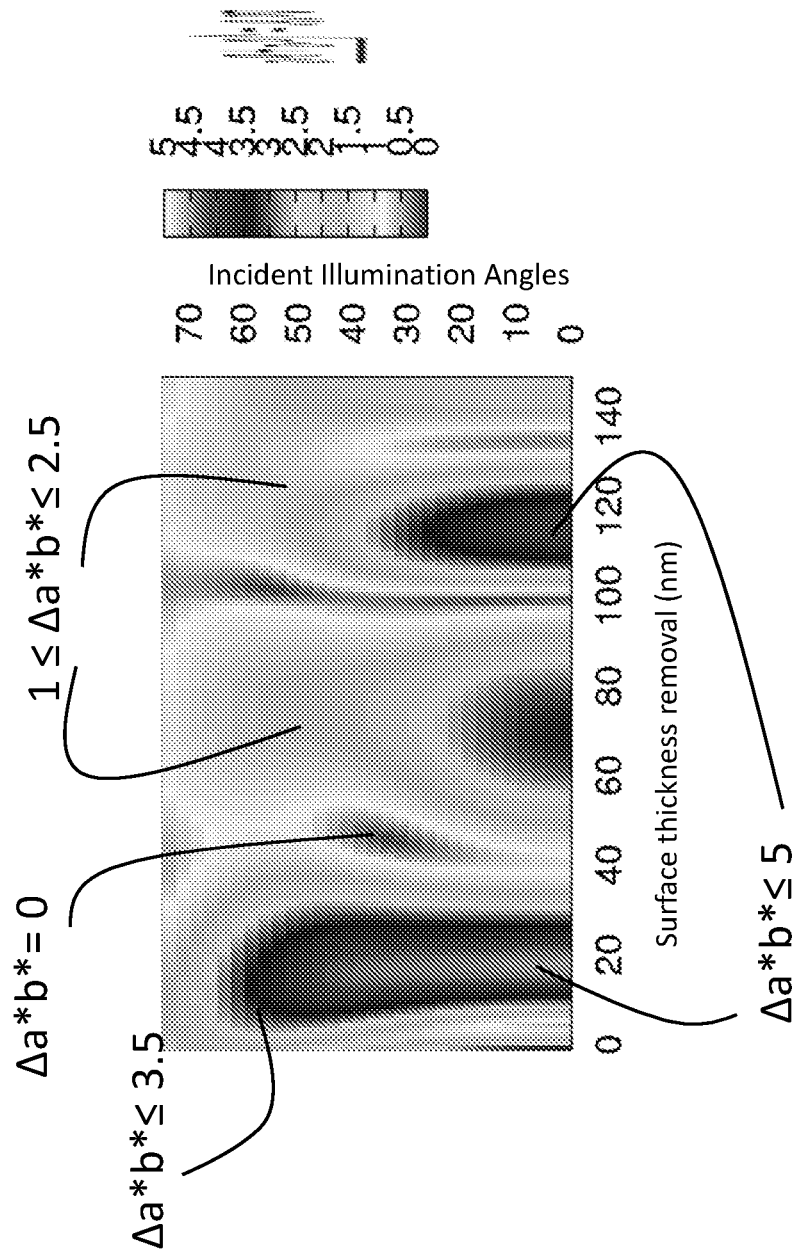
FIG. 8D is a graph showing $\Delta a*b*$ of the article shown in FIG. 8A, as a function of surface thickness removal and incident illumination angle.

FIG. 8C illustrates the modeled change in reflectance of the coated surface of Modeled Example 5 in pristine condition, at different incident illumination angles. FIG. 8D shows the modeled change in color in terms of $\Delta a^*b^*$ for the coated surface of Modeled Example 5, after different surface thickness removals and changing incident illumination angle. The greatest change in color (or the highest values of $\Delta a^*b^*$) is observed at surface thickness removals in the range from about 10 nm to about 30 m, from about 60 nm to about 80 nm and from about 110 nm to about 120 nm, at which $\Delta a^*b^*$ values are in the range from about 3 to about 4.5, at incident illumination angles of up to about 60 degrees. At all other incident illumination angles and surface thicknesses, the $\Delta a^*b^*$ values are less than 3.

Without being bound by theory, the thickness of one or more layers of the anti-reflection coating can be adjusted to impart a certain color or intentional deviation from flatness of the reflectance spectra. For example, Modeled Example 5 includes an intentional deviation from flatness for the reflectance spectrum at normal incidence, which will impart a slight blue coloration to the anti-reflection coating when viewed in reflection at normal incidence. This can be a benefit in some applications, for example, enabling 1) less variation in reflected color created by manufacturing variations in layer thickness; and 2) a relatively flat reflectance spectrum at off angle-viewing, such as at 60 degrees, as shown in FIGS. 8C and 8D.

In one or more embodiments, optical performance at greater incident illumination angles (e.g. greater than about 60 degrees) may be improved in some cases by adding additional layers to the anti-reflection coating, which enables the low-oscillation wavelength band to extend into the near-IR wavelengths, such as to 800 nm, 900 nm, or even 1000 nm, as shown in Modeled Example 5. This leads to lower oscillations and lower color at high incident illumination angles, because generally the entire reflectance spectrum of the article shifts to shorter wavelengths at higher incident illumination angles.

Modeled Example 6

Modeled Example 6 is an article having a structure as shown in Table 12 and includes a chemically strengthened ABS glass substrate and two anti-reflection coatings. One anti-reflection coating includes a scratch-resistant layer (i.e., a 2000 nm-thick layer of $AlO_xN_y$) and is disposed on the substrate. The second anti-reflection coating is disposed on the first anti-reflection coating. The materials used for both anti-reflection coatings and thicknesses of each layer of material, in the order arranged in the article, are provided in Table 12.

TABLE 12

Structure of Modeled Example 6, in pristine condition.

| | Material | Thickness (nm) |
|---|---|---|
| | Air | Immersed |
| 1$^{st}$ Anti-reflection Coating | $SiO_2$ | 104 |
| | $AlO_xN_y$ | 31.27 |
| | $SiO_2$ | 19.64 |
| | $AlO_xN_y$ | 56.25 |
| | $SiO_2$ | 3.2 |
| 2$^{nd}$ Anti-reflection Coating | $AlO_xN_y$ | 2000 |
| | $SiO_2$ | 8.22 |
| | $AlO_xN_y$ | 46.39 |
| | $SiO_2$ | 29 |
| | $AlO_xN_y$ | 27.87 |
| | $SiO_2$ | 49.63 |
| | $AlO_xN_y$ | 9.34 |
| ABS glass | | immersed |

Figure 9A:
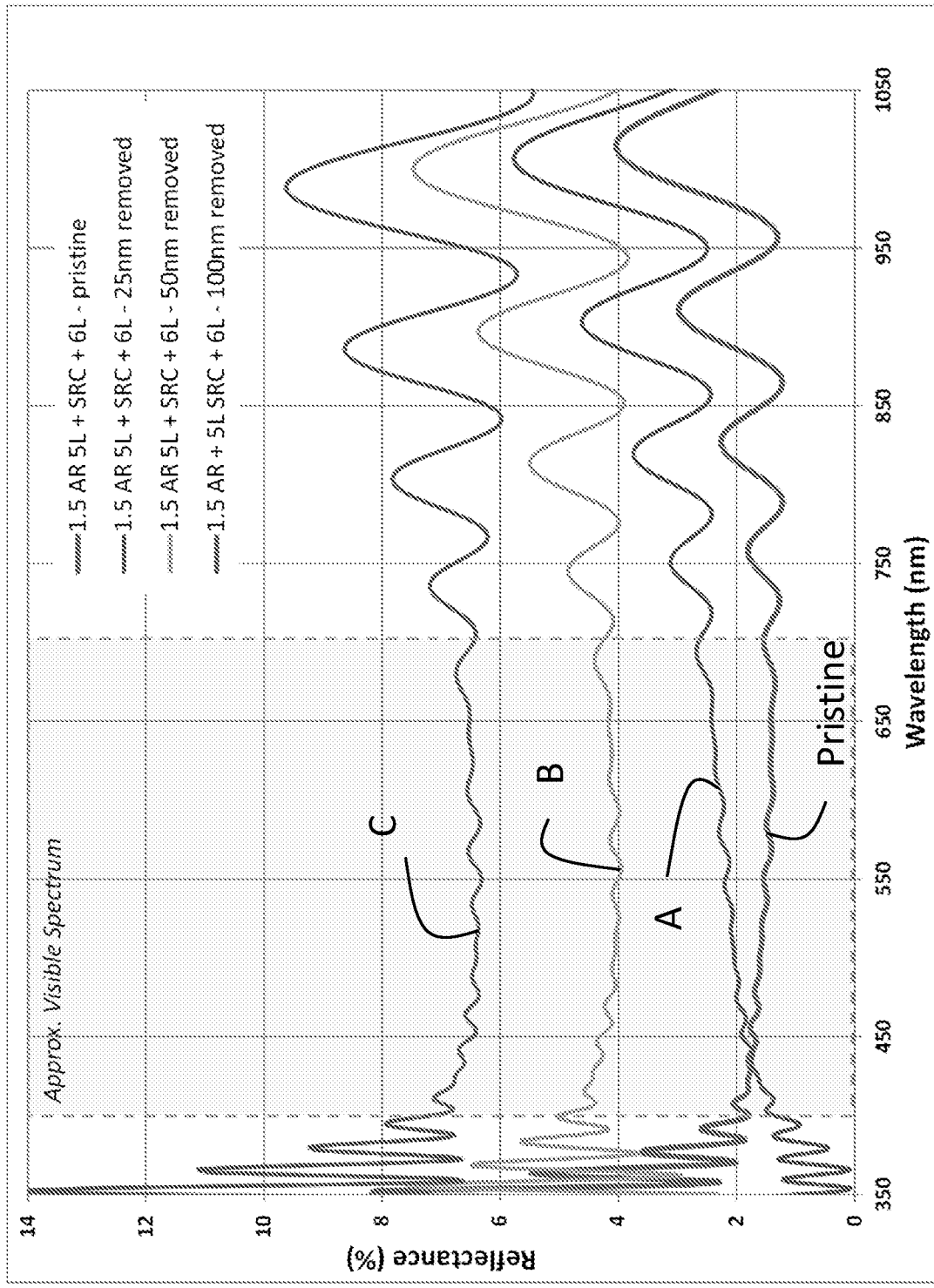
FIG. 9A is a graph of reflectance spectra of Modeled Example 6, after removal of different surface thicknesses.
Figure 9B:
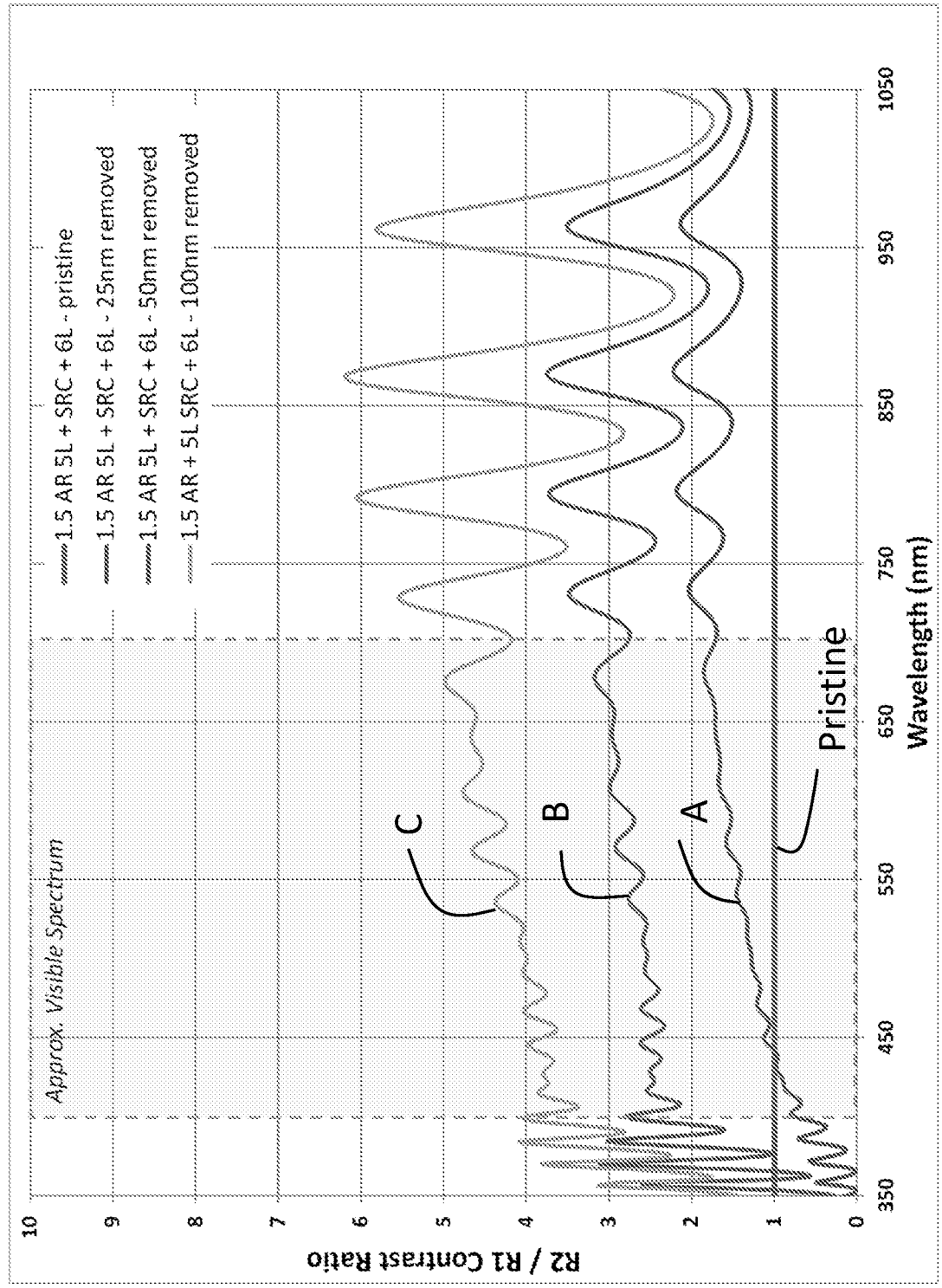
FIG. 9B is a graph showing the contrast ratio of the article shown in FIG. 9A, after removal of different surface thicknesses.

FIG. 9A illustrates the change in modeled reflectance at normal incidence of the coated surface of Modeled Example 6 in pristine condition and with surface defect Conditions A, B and C. As shown in in FIG. 9A, the reflectance increases as the surface thickness removal increases; however the increase in reflectance is reduced, when compared to Modeled Comparative Examples 1 and 2. In the pristine condition, the reflectance is in the range from about 1.5% to 2% within the visible spectrum in the range from about 400 nm to about 700 nm. After surface defect Condition C (i.e., removal of 100 nm of surface thickness), the reflectance increases to less than about 7% within the same visible spectrum range. The increase in reflectance is less than about 5.5% absolute reflectance. When compared to Modeled Comparative Examples 1 and 2, the visibility of the surface defect including up to 100 nm surface thickness removal would be significantly reduced. FIG. 9B illustrates the contrast ratio of the Modeled Example 6, after removal of different surface thicknesses. Contrast ratio values of less than 5 are observed over the visible spectrum in the range from about 400 nm to about 700 nm, even when up to 100 nm of surface thickness is removed, which are significantly less than the contrast ratios observed with Modeled Comparative Examples 1 and 2.

Figure 9D:
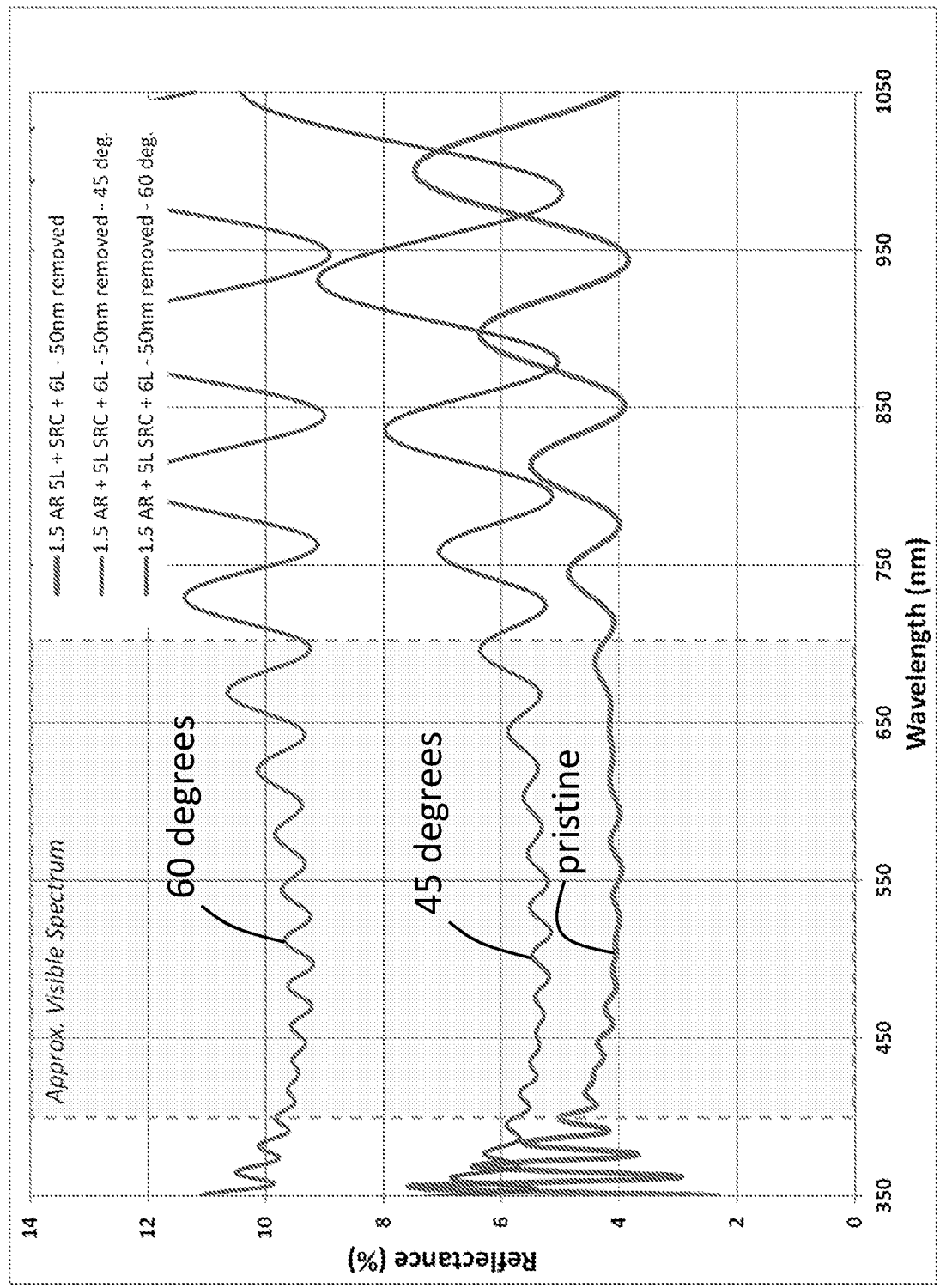
FIG. 9D is a graph showing the change in reflectance of Modeled Example 6, after removal of 50 nm of surface thickness, at different incident illumination angles.
Figure 9E:
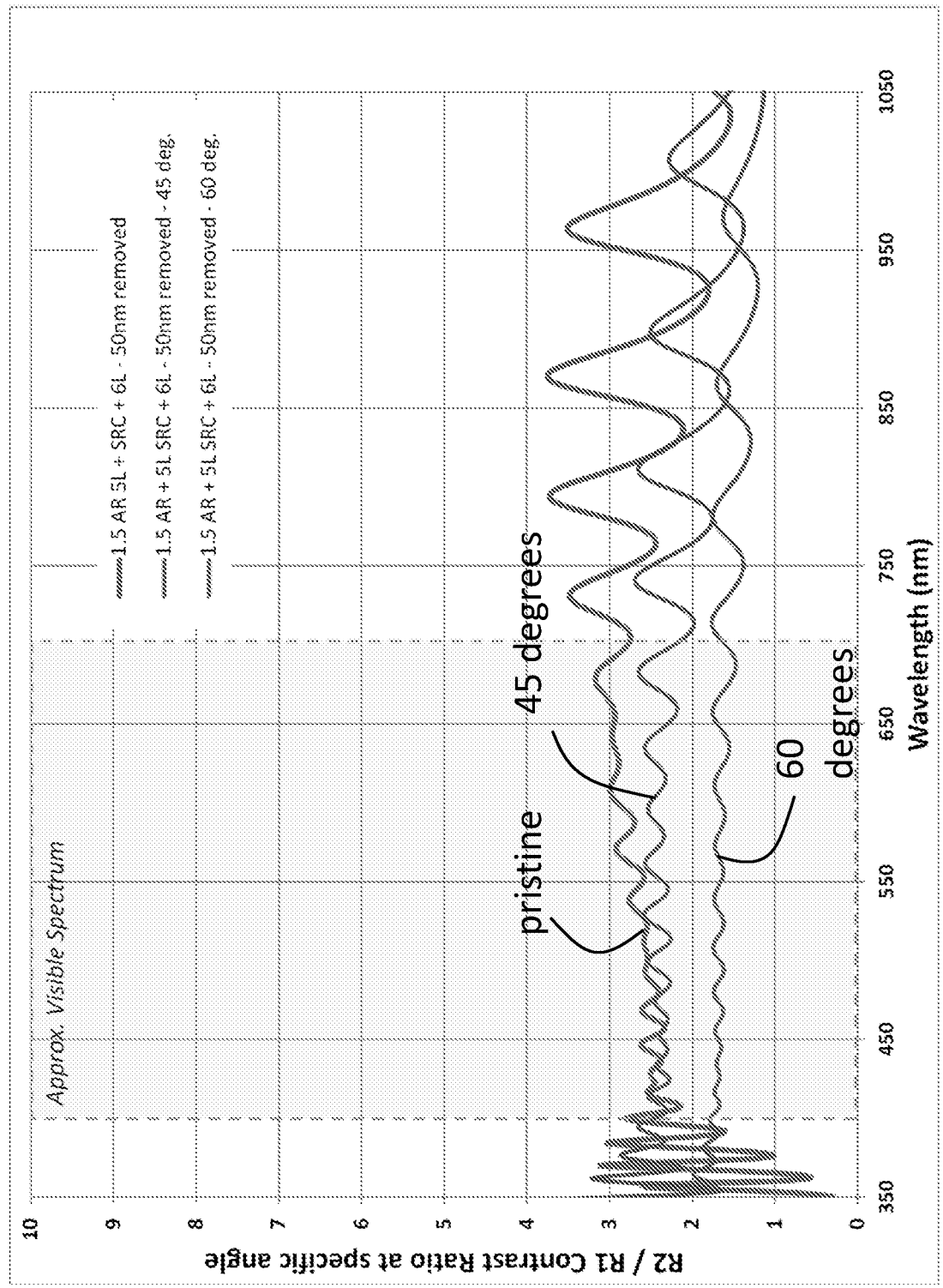
FIG. 9E is a graph showing the contrast ratio of the coated surface shown in FIG. 9D.
Figure 9F:
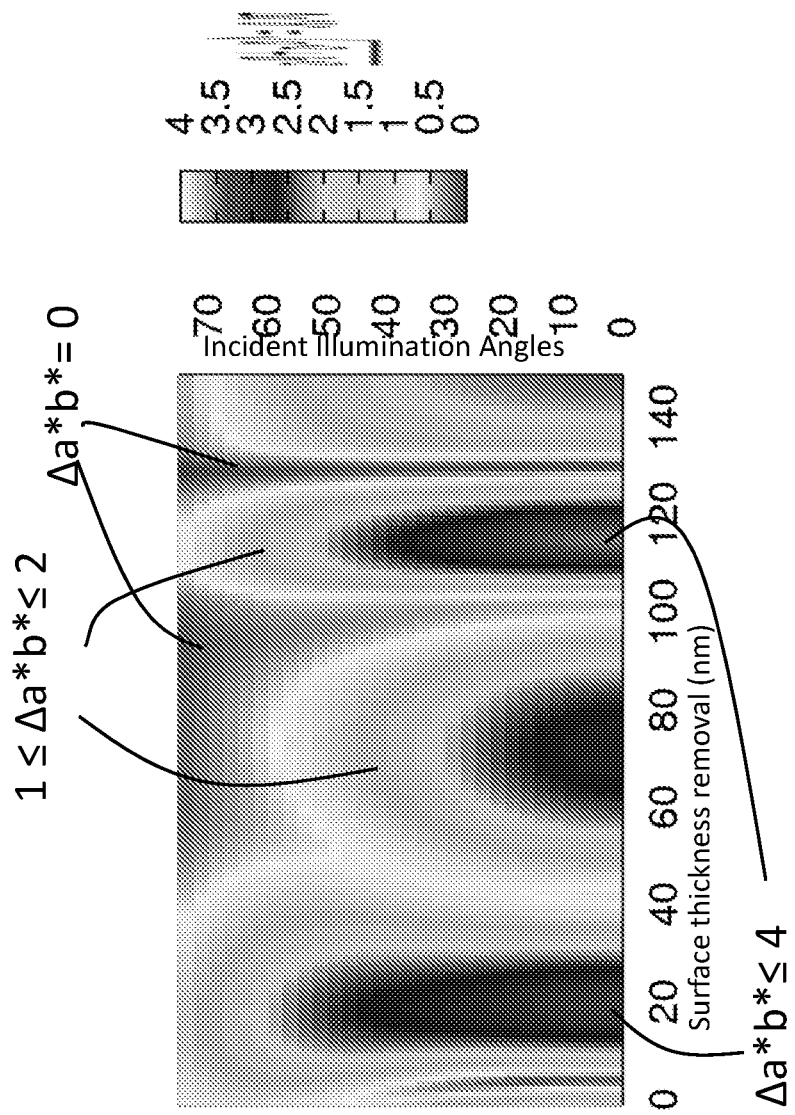
FIG. 9F is a graph showing $\Delta a*b*$ of the article shown in FIG. 9A, as a function of surface thickness removal and incident illumination angle.

FIG. 9C illustrates the modeled change in reflectance of the coated surface of Modeled Example 6 in pristine condition, at different incident illumination angles. FIG. 9D illustrates the change in reflectance of the coated surface of Modeled Example 6 after surface defect Condition B, at different incident illumination angles. FIG. 9E shows the contrast ratio of the coated surface shown in FIG. 9D. FIG. 9F shows the change in color in terms of Δa*b* for different surface thickness removals and changing incident illumination angle. The greatest change in color (or the highest values of Δa*b*) is observed at surface thickness removals in the range from about 10 nm to about 30 m, from about 60 nm to about 80 nm and from about 110 nm to about 120 nm, at which Δa*b* values are in the range from about 2.5 to about 3.5, at incident illumination angles of up to about 60 degrees. At all other incident illumination angles and surface thicknesses, the Δa*b* values are less than 2.5.

Modeled Comparative Example 7

Figure 10A:
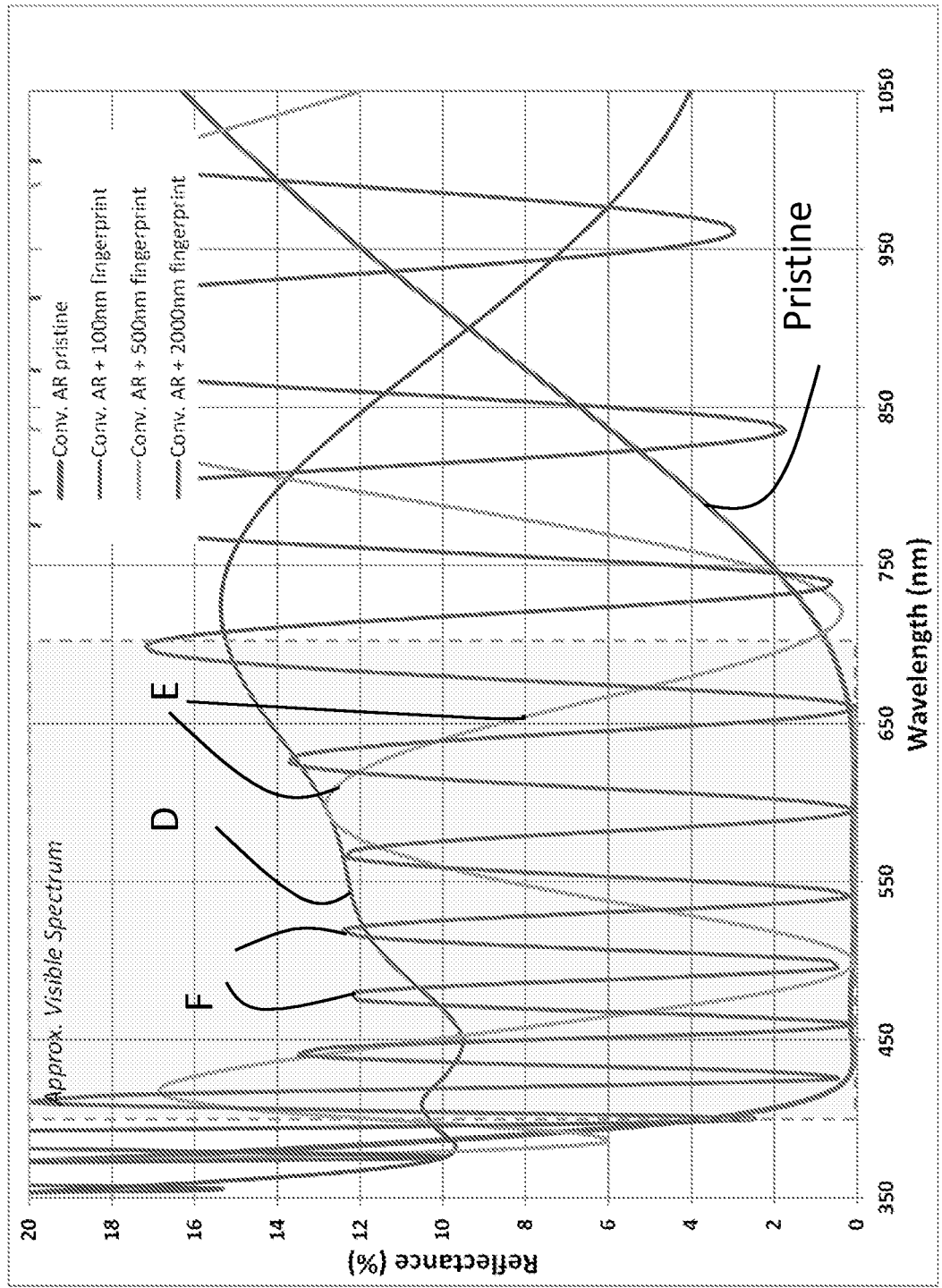
FIG. 10A is a graph of reflectance spectra of Comparative Modeled Example 7 with a surface defect that includes the addition of a contaminant having different thicknesses.
Figure 10B:
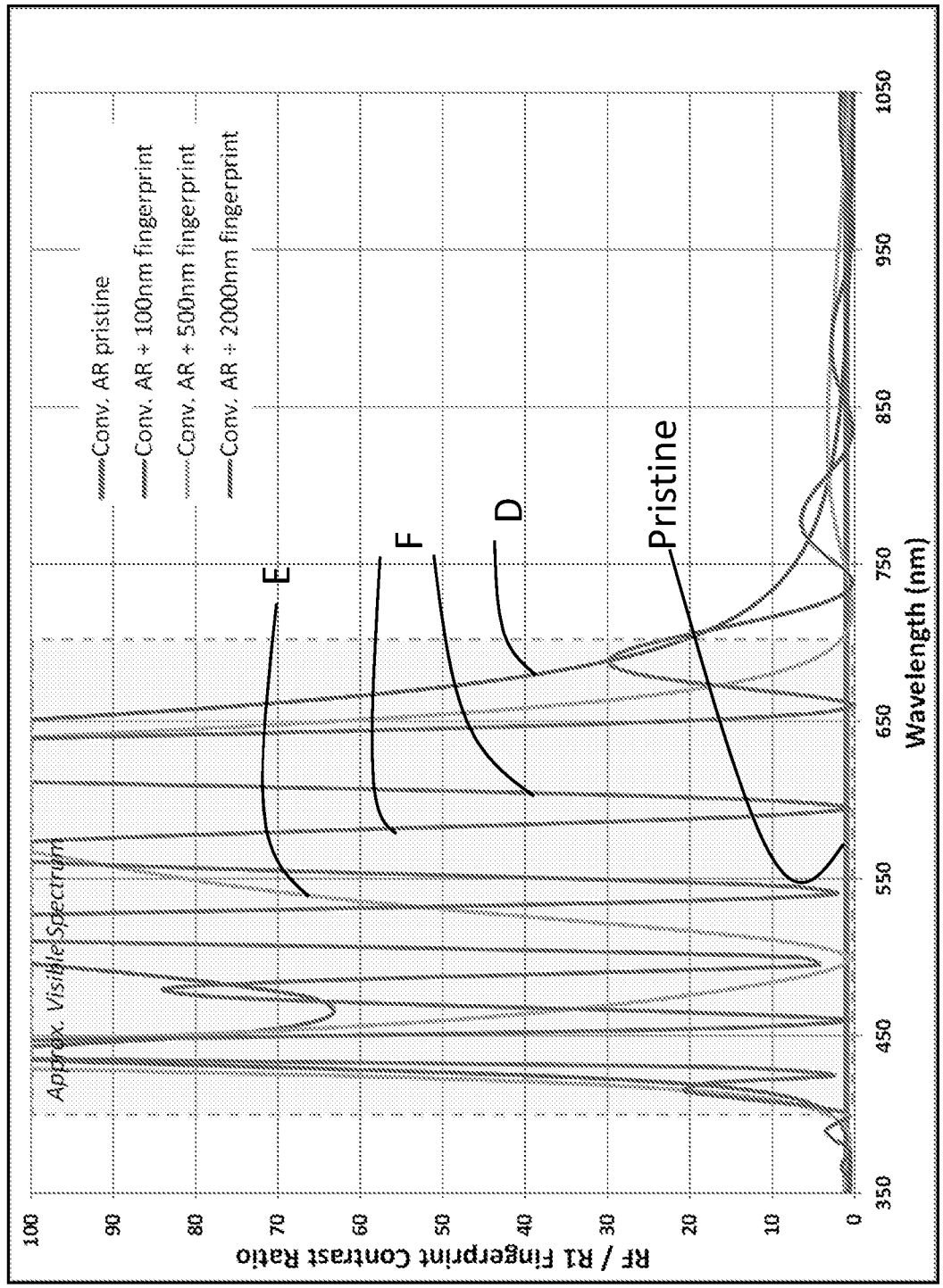
FIG. 10B is a graph showing the contrast ratio of the article shown in FIG. 10A, after the addition of a contaminant having different thicknesses.

Modeled Comparative Example 7 is an article having the structure as Modeled Comparative Example 1. FIGS. 10A-10B illustrate the change in modeled reflectance of a coated surface of Modeled Comparative Example 7 in pristine condition and with a surface defect including Conditions D, E and F, with the contaminant being a fingerprint simulating medium. FIG. 10A shows the reflectance of the coated surface of Modeled Comparative Example 7 in pristine condition and after the different surface defect Conditions. The reflectance increases as the thickness of the contaminant increases. Specifically, the reflectance in the pristine condition is less than about 0.5% within the visible spectrum in the range from about 425 nm to about 650 nm. The reflectance after surface defect Condition D is greater than about 9% within the same visible spectrum range, and the reflectance after surface defect Conditions E and F includes oscillations with amplitudes as great as about 12% absolute reflectance, with reflectance maximums of greater than about 12%, over narrower ranges of the visible spectrum. The increase in reflectance between the pristine condition and surface defects D-F was modeled as about 11.5% or greater absolute reflectance. Thus, the visibility of the surface defect increases significantly, when compared to the remainder of the anti-reflective coating, which is free of surface defects. FIG. 10B illustrates the contrast ratio of the modeled structure shown in FIG. 10A, for each of surface defect Conditions D-F. The contrast ratio spectra oscillate significantly and exceed 100 for Conditions D and E, over the visible spectrum in the range from about 400 nm to about 700 nm.

Modeled Example 8

Modeled Example 8 included an article having the same structure as Modeled Example 3.

Figure 11A:
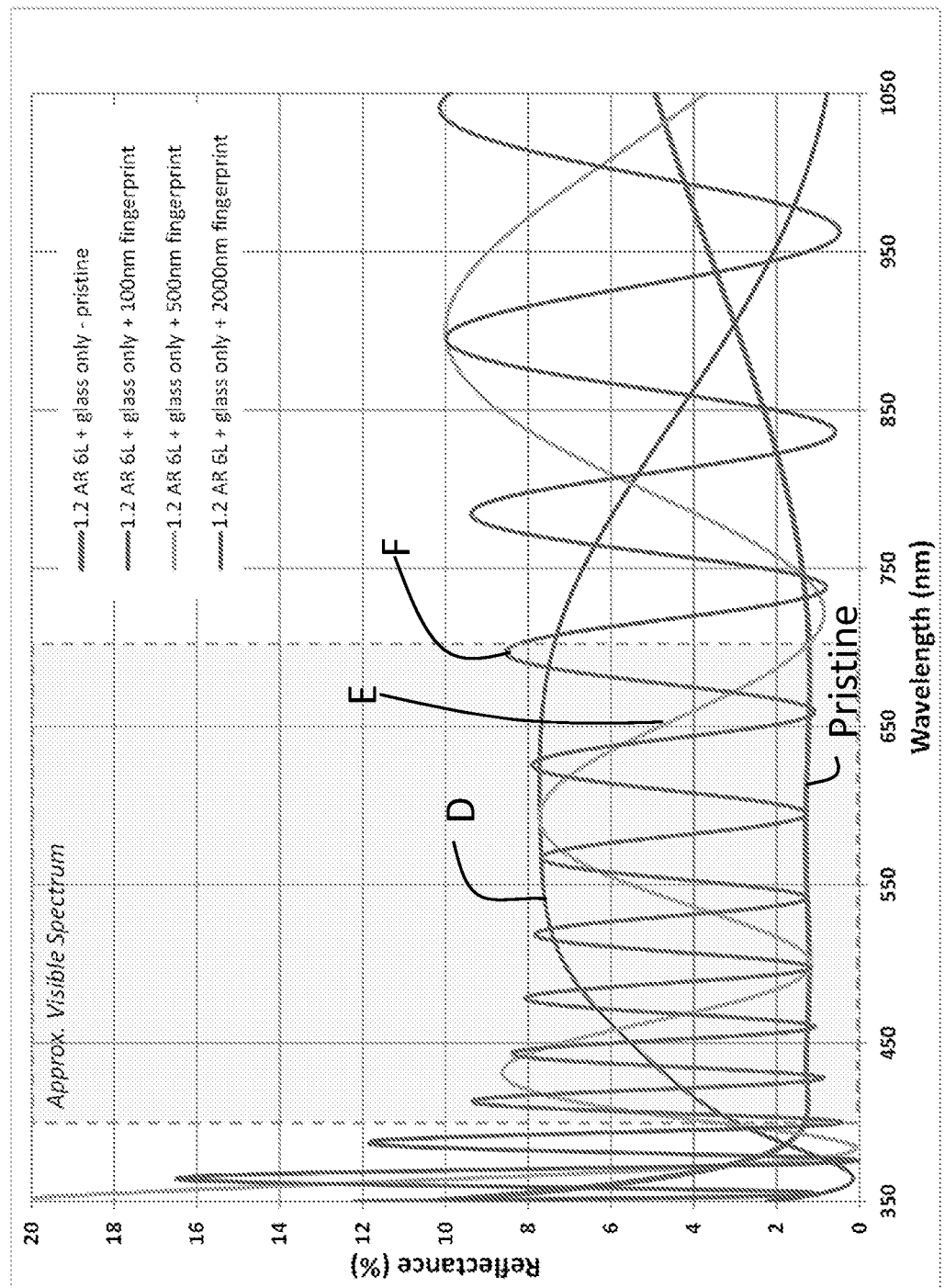
FIG. 11A is a graph of reflectance spectra of Modeled Example 8 with a surface defect that includes the addition of a contaminant having different thicknesses.
Figure 11B:
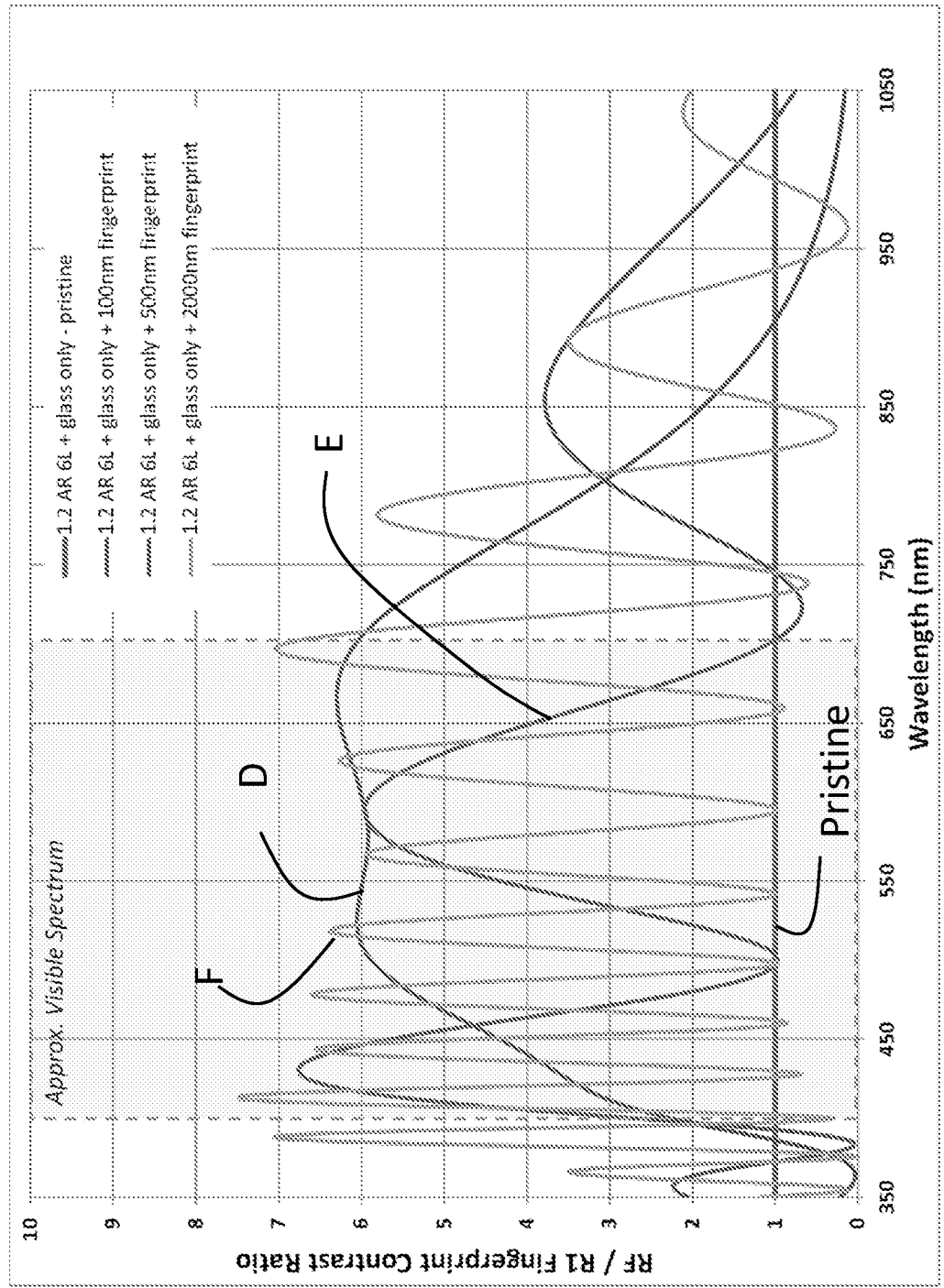
FIG. 11B is a graph showing the contrast ratio of the article shown in FIG. 11A, after the addition of a contaminant having different thicknesses.

FIG. 11A illustrates the change in modeled reflectance at normal incidence of the coated surface of Modeled Example 8 in pristine condition and with surface defect Conditions D, E and F. As shown in FIG. 11A, the reflectance increases as the surface thickness removal increases; however the increase in reflectance is reduced, when compared to Modeled Comparative Example 7. In pristine condition, the reflectance is about 1.2% within the visible spectrum in the range from about 400 nm to about 700 nm. After surface defect Condition D, the reflectance increases to less than about 8% within the visible spectrum range from about 400 nm to about 700 nm. After surface defect Condition E, the reflectance increases to less than about 8% within the visible spectrum range from about 450 nm to about 700 nm. After surface defect Condition F, the reflectance increases to less than about 8.5% within the visible spectrum range from about 425 nm to about 675 nm. The increase in reflectance is less than about 7.3% absolute reflectance. When compared to Modeled Comparative Example 7, the visibility of surface defects including the addition of up to 2000 nm of fingerprint simulating medium would be significantly reduced. FIG. 11B illustrates the contrast ratio of the Modeled Example 8, after the addition of different thicknesses of fingerprint simulating medium. Contrast ratio values of less than 7.5 are observed over the visible spectrum in the range from about 400 nm to about 700 nm, even when fingerprint simulating medium having a thickness up to 2000 nm is present on the coated surface, which are significantly less than the contrast ratios observed with Modeled Comparative Example 7.

Modeled Example 9

Modeled Example 9 included an article having the same structure as Modeled Example 4.

Figure 12A:
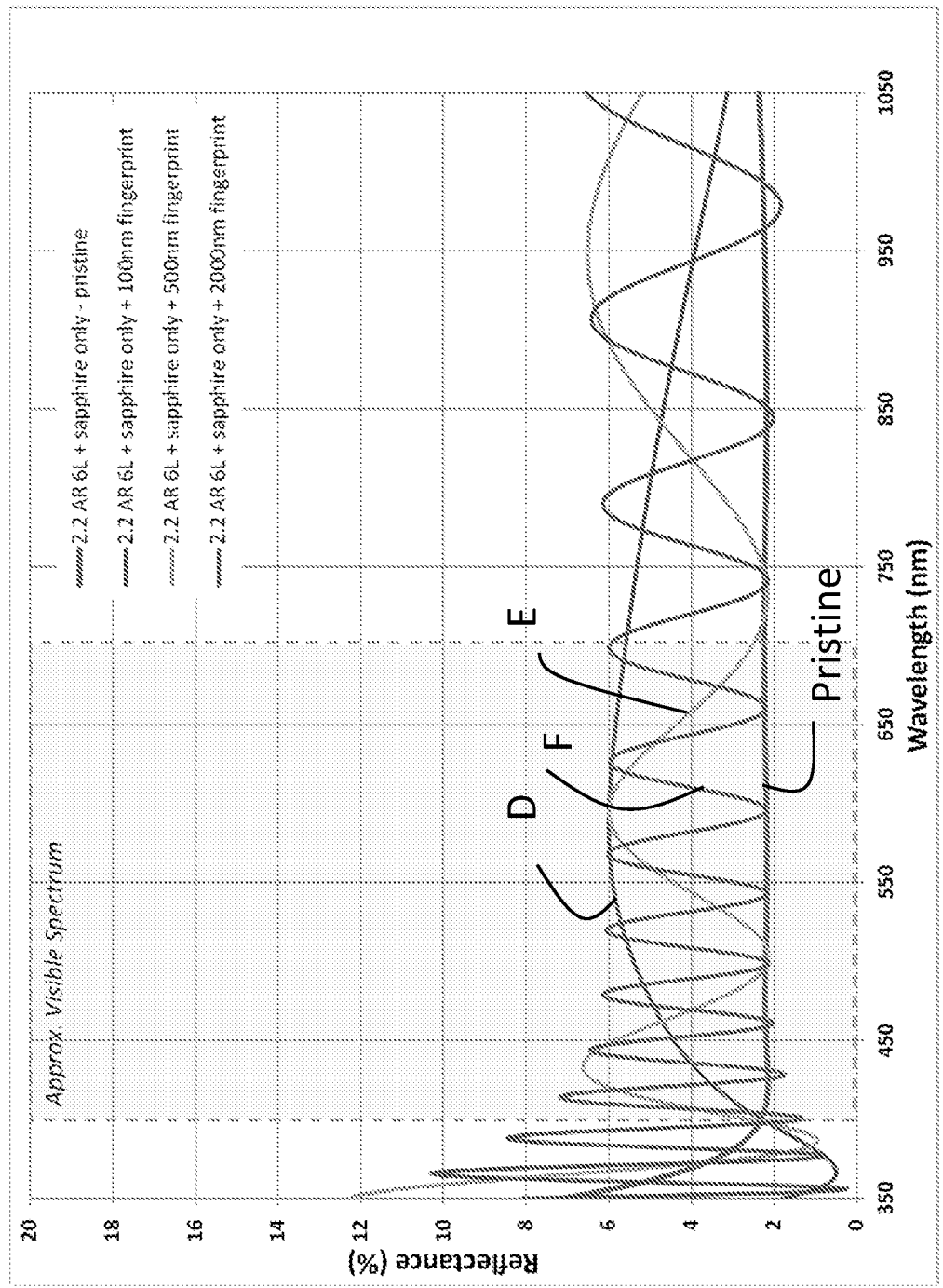
FIG. 12A is a graph of reflectance spectra of Modeled Example 9 with a surface defect that includes the addition of a contaminant having different thicknesses.
Figure 12B:
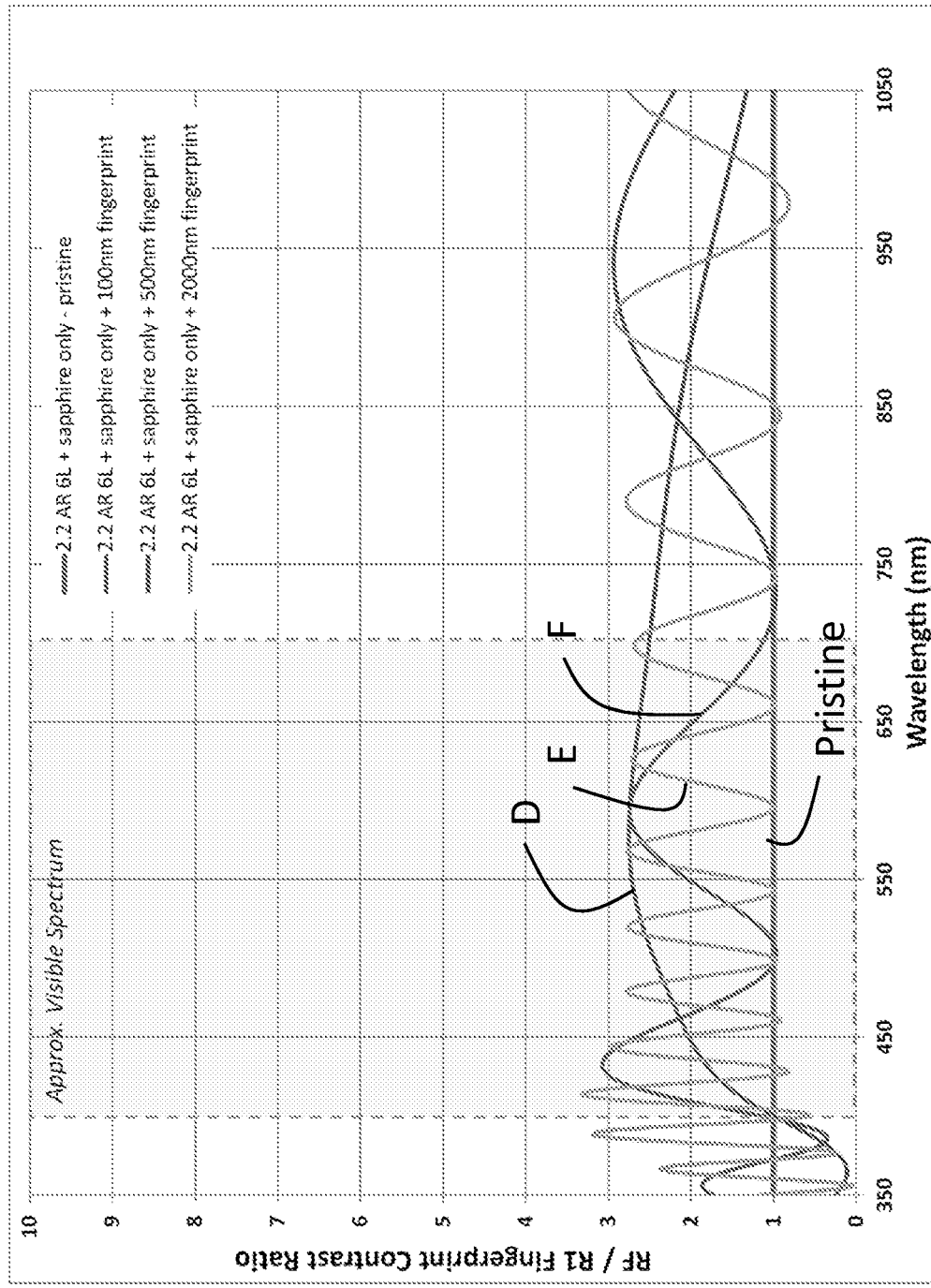
FIG. 12B is a graph showing the contrast ratio of the article shown in FIG. 12A, after the addition of a contaminant having different thicknesses.

FIG. 12A illustrates the change in modeled reflectance at normal incidence of the coated surface of Modeled Example 9 in pristine condition and with surface defect Conditions D, E and F, at normal incidence. As shown in FIG. 12A, the reflectance increases as the surface thickness removal increases; however the increase in reflectance was reduced, when compared to Modeled Comparative Example 7. In the pristine condition, the reflectance is about 2.2% within the visible spectrum in the range from about 400 nm to about 700 nm. After surface defect Condition D, the reflectance increases to less than about 6% within the visible spectrum range from about 400 nm to about 700 nm. After surface defect Condition E, the reflectance increases to less than about 6% within the visible spectrum range from about 450 nm to about 700 nm. After surface defect Condition F, the reflectance increases to less than about 6% within the visible spectrum range from about 450 nm to about 700 nm. The increase in reflectance is less than about 3.8% absolute reflectance. When compared to Modeled Comparative Example 7, the visibility of surface defects including the addition of up to 2000 nm of fingerprint simulating medium would be significantly reduced. FIG. 12B illustrates the contrast ratio of the Modeled Example 9, after the addition of different thicknesses of the fingerprint simulating medium. Contrast ratio values of less than 3.3 are observed over the visible spectrum in the range from about 400 nm to about 700 nm, even when fingerprint simulating medium having a thickness up to 2000 nm is present on the coated surface, which are significantly less than the contrast ratios observed with Modeled Comparative Example 7.

Modeled Example 10

Figure 13A:
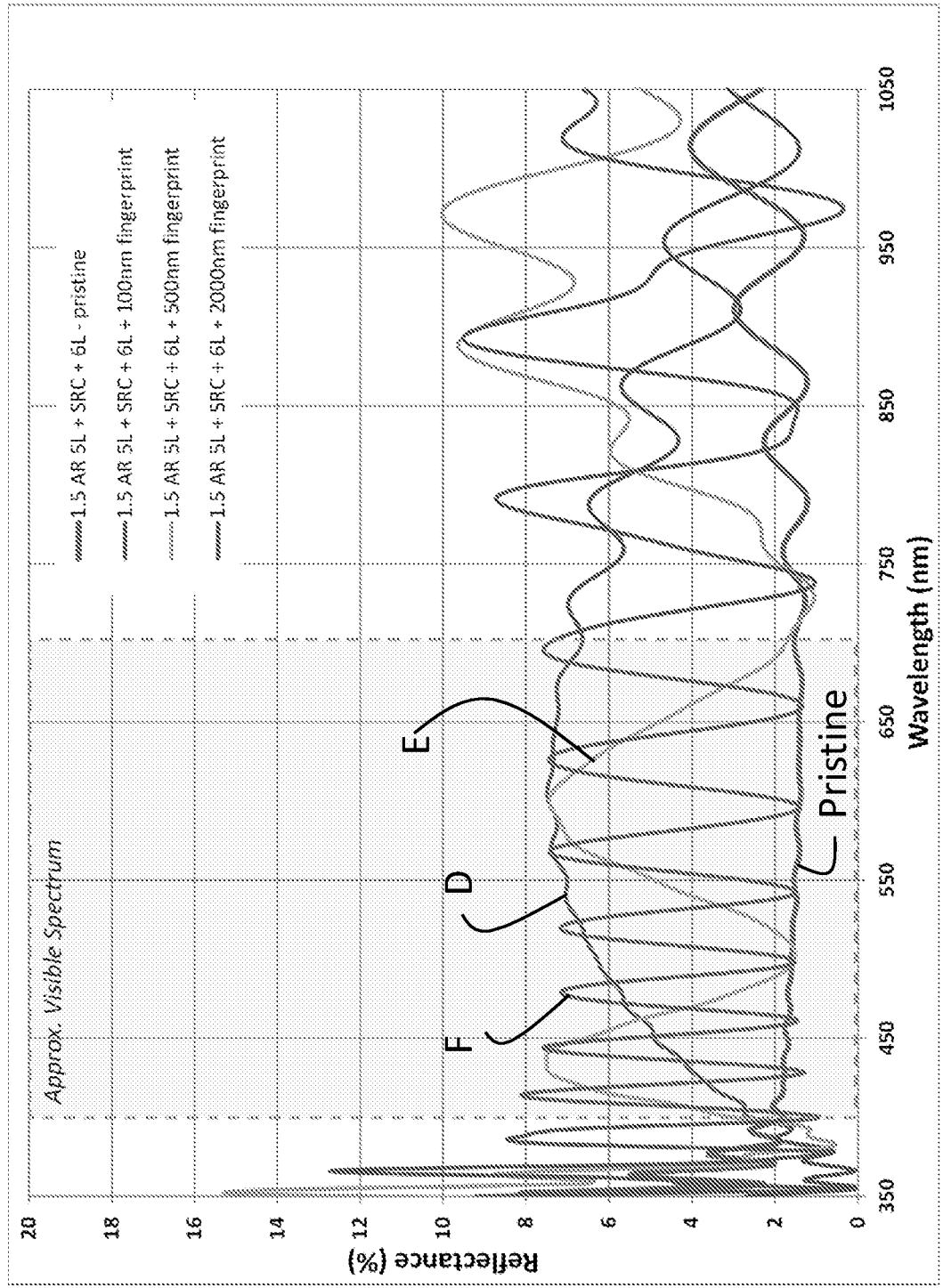
FIG. 13A is a graph of reflectance spectra of Modeled Example 10 with a surface defect that includes the addition of a contaminant having different thicknesses.
Figure 13B:
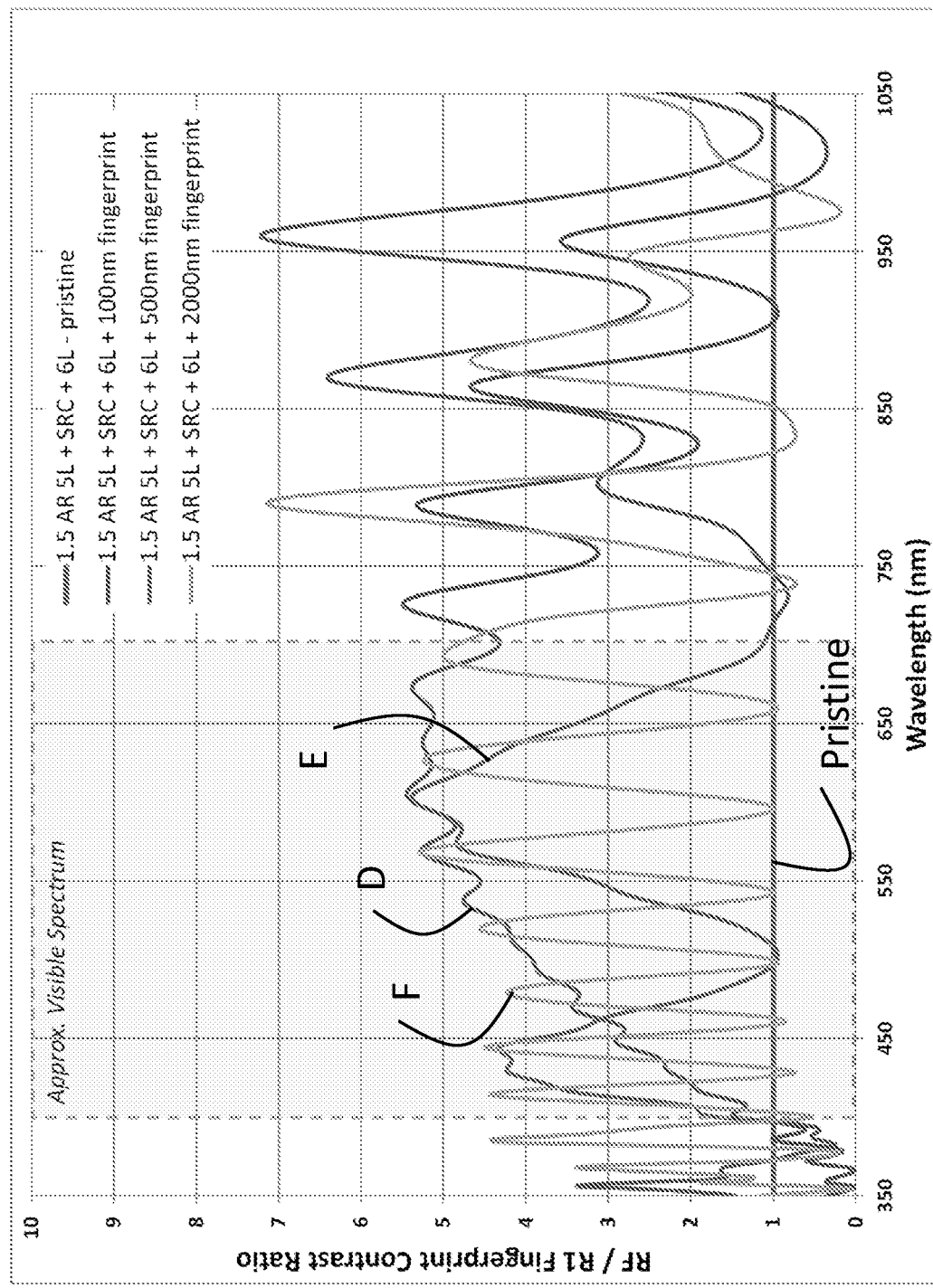
FIG. 13B is a graph showing the contrast ratio of the article shown in FIG. 13A, after the addition of a contaminant having different thicknesses.

Modeled Example 10 includes an article having the same structure as Modeled Example 6. FIG. 13A illustrates the change in modeled reflectance at normal incidence of the coated surface of Modeled Example 10 in pristine condition and with surface defect Conditions D, E and F. As shown in in FIG. 13A, the reflectance increases as the thickness of the contaminant increases; however the increase in reflectance was reduced, when compared to Modeled Comparative Example 7. In the pristine condition, the reflectance is in the range from about 1.5% to 2% within the visible spectrum in the range from about 400 nm to about 700 nm. After surface defect Condition D and E, the reflectance increases to less than about 7.5% within the same visible spectrum range. After surface defect Condition F, the reflectance increases to less than about 8% within the same visible spectrum range. The increase in reflectance is less than about 6.5% absolute reflectance. When compared to Modeled Comparative Example 7 1 and 2, the visibility of the surface defect including a fingerprint simulating medium contaminant having a thickness up to about 200 nm would be significantly reduced. FIG. 13B illustrates the contrast ratio of the Modeled Example 10, after removal of different surface thicknesses. Contrast ratio values of less than 5.5 are observed over the visible spectrum in the range from about 400 nm to about 700 nm, even when fingerprint simulating medium having a thickness up to 2000 nm is present on the coated surface, which are significantly less than the contrast ratios observed with Modeled Comparative Example 7.

Modeled Examples 11 and 12

Examples 11-12 used modeling to understand the reflectance spectra of articles in which the anti-reflection coating is pristine and includes a surface defect. The modeling was based on collected refractive index data from formed layers of various materials that may be used in the anti-reflection coatings and a substrate of ABS glass. The layers of the anti-reflection coating were formed by vacuum deposition. Some of the formed layers included $SiO_2$, and AlOxNy formed at different thicknesses (e.g. 100 nm and 2000 nm). The refractive indices (as a function of wavelength) of the formed layers of the optical film and the substrates were measured using spectroscopic ellipsometry. Tables 13-15 include the refractive indices and dispersion curves measured. The refractive indices thus measured were then used to calculate reflectance spectra for the Modeled Examples 11 and 12.

TABLE 13

Refractive indices and dispersion curve for a $SiO_2$ layer vs. wavelength.

| Wavelength | Refractive Index | Extinction Coefficient |
|---|---|---|
| 350 | 1.49325 | 0.00006 |
| 351 | 1.49311 | 0.00006 |
| 352 | 1.49297 | 0.00006 |
| 353 | 1.49283 | 0.00006 |
| 354 | 1.4927 | 0.00006 |
| 355 | 1.49256 | 0.00007 |
| 356 | 1.49243 | 0.00007 |
| 357 | 1.49229 | 0.00007 |
| 358 | 1.49216 | 0.00007 |
| 359 | 1.49202 | 0.00007 |
| 360 | 1.49189 | 0.00007 |
| 361 | 1.49176 | 0.00007 |
| 362 | 1.49163 | 0.00007 |
| 363 | 1.4915 | 0.00007 |
| 364 | 1.49137 | 0.00007 |
| 365 | 1.49124 | 0.00007 |
| 366 | 1.49112 | 0.00007 |
| 367 | 1.49099 | 0.00007 |
| 368 | 1.49086 | 0.00007 |
| 369 | 1.49074 | 0.00007 |
| 370 | 1.49061 | 0.00007 |
| 371 | 1.49049 | 0.00007 |
| 372 | 1.49037 | 0.00007 |
| 373 | 1.49024 | 0.00007 |
| 374 | 1.49012 | 0.00007 |

TABLE 13-continued

Refractive indices and dispersion curve for a SiO$_2$ layer vs. wavelength.

| Wavelength | Refractive Index | Extinction Coefficient |
|---|---|---|
| 375 | 1.49 | 0.00007 |
| 376 | 1.48988 | 0.00007 |
| 377 | 1.48976 | 0.00007 |
| 378 | 1.48964 | 0.00007 |
| 379 | 1.48952 | 0.00007 |
| 380 | 1.48941 | 0.00007 |
| 381 | 1.48929 | 0.00007 |
| 382 | 1.48917 | 0.00007 |
| 383 | 1.48906 | 0.00007 |
| 384 | 1.48894 | 0.00007 |
| 385 | 1.48883 | 0.00007 |
| 386 | 1.48872 | 0.00007 |
| 387 | 1.4886 | 0.00007 |
| 388 | 1.48849 | 0.00007 |
| 389 | 1.48838 | 0.00007 |
| 390 | 1.48827 | 0.00007 |
| 391 | 1.48816 | 0.00007 |
| 392 | 1.48805 | 0.00007 |
| 393 | 1.48794 | 0.00007 |
| 394 | 1.48783 | 0.00007 |
| 395 | 1.48772 | 0.00007 |
| 396 | 1.48762 | 0.00007 |
| 397 | 1.48751 | 0.00007 |
| 398 | 1.4874 | 0.00007 |
| 399 | 1.4873 | 0.00007 |
| 400 | 1.48719 | 0.00007 |
| 401 | 1.48709 | 0.00007 |
| 402 | 1.48698 | 0.00007 |
| 403 | 1.48688 | 0.00007 |
| 404 | 1.48678 | 0.00007 |
| 405 | 1.48668 | 0.00007 |
| 406 | 1.48658 | 0.00007 |
| 407 | 1.48647 | 0.00007 |
| 408 | 1.48637 | 0.00007 |
| 409 | 1.48627 | 0.00007 |
| 410 | 1.48618 | 0.00007 |
| 411 | 1.48608 | 0.00007 |
| 412 | 1.48598 | 0.00007 |
| 413 | 1.48588 | 0.00007 |
| 414 | 1.48578 | 0.00007 |
| 415 | 1.48569 | 0.00007 |
| 416 | 1.48559 | 0.00007 |
| 417 | 1.4855 | 0.00007 |
| 418 | 1.4854 | 0.00007 |
| 419 | 1.48531 | 0.00007 |
| 420 | 1.48521 | 0.00007 |
| 421 | 1.48512 | 0.00007 |
| 422 | 1.48503 | 0.00007 |
| 423 | 1.48494 | 0.00007 |
| 424 | 1.48484 | 0.00007 |
| 425 | 1.48475 | 0.00007 |
| 426 | 1.48466 | 0.00007 |
| 427 | 1.48457 | 0.00007 |
| 428 | 1.48448 | 0.00007 |
| 429 | 1.48439 | 0.00007 |
| 430 | 1.4843 | 0.00007 |
| 431 | 1.48422 | 0.00007 |
| 432 | 1.48413 | 0.00007 |
| 433 | 1.48404 | 0.00007 |
| 434 | 1.48395 | 0.00007 |
| 435 | 1.48387 | 0.00007 |
| 436 | 1.48378 | 0.00007 |
| 437 | 1.4837 | 0.00007 |
| 438 | 1.48361 | 0.00007 |
| 439 | 1.48353 | 0.00007 |
| 440 | 1.48344 | 0.00007 |
| 441 | 1.48336 | 0.00007 |
| 442 | 1.48328 | 0.00007 |
| 443 | 1.48319 | 0.00007 |
| 444 | 1.48311 | 0.00007 |
| 445 | 1.48303 | 0.00007 |
| 446 | 1.48295 | 0.00007 |
| 447 | 1.48287 | 0.00007 |
| 448 | 1.48279 | 0.00007 |
| 449 | 1.48271 | 0.00007 |
| 450 | 1.48263 | 0.00007 |
| 451 | 1.48255 | 0.00007 |
| 452 | 1.48247 | 0.00007 |
| 453 | 1.48239 | 0.00007 |
| 454 | 1.48231 | 0.00007 |
| 455 | 1.48223 | 0.00007 |
| 456 | 1.48216 | 0.00007 |
| 457 | 1.48208 | 0.00007 |
| 458 | 1.482 | 0.00007 |
| 459 | 1.48193 | 0.00007 |
| 460 | 1.48185 | 0.00007 |
| 461 | 1.48178 | 0.00007 |
| 462 | 1.4817 | 0.00007 |
| 463 | 1.48163 | 0.00007 |
| 464 | 1.48155 | 0.00007 |
| 465 | 1.48148 | 0.00007 |
| 466 | 1.48141 | 0.00007 |
| 467 | 1.48133 | 0.00007 |
| 468 | 1.48126 | 0.00007 |
| 469 | 1.48119 | 0.00007 |
| 470 | 1.48112 | 0.00007 |
| 471 | 1.48104 | 0.00007 |
| 472 | 1.48097 | 0.00007 |
| 473 | 1.4809 | 0.00007 |
| 474 | 1.48083 | 0.00007 |
| 475 | 1.48076 | 0.00007 |
| 476 | 1.48069 | 0.00007 |
| 477 | 1.48062 | 0.00007 |
| 478 | 1.48056 | 0.00006 |
| 479 | 1.48049 | 0.00006 |
| 480 | 1.48042 | 0.00006 |
| 481 | 1.48035 | 0.00006 |
| 482 | 1.48028 | 0.00006 |
| 483 | 1.48022 | 0.00006 |
| 484 | 1.48015 | 0.00006 |
| 485 | 1.48008 | 0.00006 |
| 486 | 1.48002 | 0.00006 |
| 487 | 1.47995 | 0.00006 |
| 488 | 1.47989 | 0.00006 |
| 489 | 1.47982 | 0.00006 |
| 490 | 1.47976 | 0.00006 |
| 491 | 1.47969 | 0.00006 |
| 492 | 1.47963 | 0.00006 |
| 493 | 1.47956 | 0.00006 |
| 494 | 1.4795 | 0.00006 |
| 495 | 1.47944 | 0.00006 |
| 496 | 1.47937 | 0.00006 |
| 497 | 1.47931 | 0.00006 |
| 498 | 1.47925 | 0.00006 |
| 499 | 1.47919 | 0.00006 |
| 500 | 1.47913 | 0.00006 |
| 501 | 1.47906 | 0.00006 |
| 502 | 1.479 | 0.00006 |
| 503 | 1.47894 | 0.00006 |
| 504 | 1.47888 | 0.00006 |
| 505 | 1.47882 | 0.00006 |
| 506 | 1.47876 | 0.00006 |
| 507 | 1.4787 | 0.00006 |
| 508 | 1.47864 | 0.00006 |
| 509 | 1.47858 | 0.00006 |
| 510 | 1.47853 | 0.00006 |
| 511 | 1.47847 | 0.00006 |
| 512 | 1.47841 | 0.00006 |
| 513 | 1.47835 | 0.00006 |
| 514 | 1.47829 | 0.00006 |
| 515 | 1.47824 | 0.00006 |
| 516 | 1.47818 | 0.00005 |
| 517 | 1.47812 | 0.00005 |
| 518 | 1.47807 | 0.00005 |
| 519 | 1.47801 | 0.00005 |
| 520 | 1.47795 | 0.00005 |
| 521 | 1.4779 | 0.00005 |
| 522 | 1.47784 | 0.00005 |
| 523 | 1.47779 | 0.00005 |
| 524 | 1.47773 | 0.00005 |

TABLE 13-continued

Refractive indices and dispersion curve for a SiO₂ layer vs. wavelength.

| Wavelength | Refractive Index | Extinction Coefficient |
|---|---|---|
| 525 | 1.47768 | 0.00005 |
| 526 | 1.47763 | 0.00005 |
| 527 | 1.47757 | 0.00005 |
| 528 | 1.47752 | 0.00005 |
| 529 | 1.47746 | 0.00005 |
| 530 | 1.47741 | 0.00005 |
| 531 | 1.47736 | 0.00005 |
| 532 | 1.47731 | 0.00005 |
| 533 | 1.47725 | 0.00005 |
| 534 | 1.4772 | 0.00005 |
| 535 | 1.47715 | 0.00005 |
| 536 | 1.4771 | 0.00005 |
| 537 | 1.47705 | 0.00005 |
| 538 | 1.47699 | 0.00005 |
| 539 | 1.47694 | 0.00005 |
| 540 | 1.47689 | 0.00005 |
| 541 | 1.47684 | 0.00005 |
| 542 | 1.47679 | 0.00005 |
| 543 | 1.47674 | 0.00005 |
| 544 | 1.47669 | 0.00005 |
| 545 | 1.47664 | 0.00005 |
| 546 | 1.47659 | 0.00005 |
| 547 | 1.47654 | 0.00005 |
| 548 | 1.47649 | 0.00005 |
| 549 | 1.47645 | 0.00005 |
| 550 | 1.4764 | 0.00005 |
| 551 | 1.47635 | 0.00005 |
| 552 | 1.4763 | 0.00004 |
| 553 | 1.47625 | 0.00004 |
| 554 | 1.47621 | 0.00004 |
| 555 | 1.47616 | 0.00004 |
| 556 | 1.47611 | 0.00004 |
| 557 | 1.47607 | 0.00004 |
| 558 | 1.47602 | 0.00004 |
| 559 | 1.47597 | 0.00004 |
| 560 | 1.47593 | 0.00004 |
| 561 | 1.47588 | 0.00004 |
| 562 | 1.47583 | 0.00004 |
| 563 | 1.47579 | 0.00004 |
| 564 | 1.47574 | 0.00004 |
| 565 | 1.4757 | 0.00004 |
| 566 | 1.47565 | 0.00004 |
| 567 | 1.47561 | 0.00004 |
| 568 | 1.47556 | 0.00004 |
| 569 | 1.47552 | 0.00004 |
| 570 | 1.47548 | 0.00004 |
| 571 | 1.47543 | 0.00004 |
| 572 | 1.47539 | 0.00004 |
| 573 | 1.47534 | 0.00004 |
| 574 | 1.4753 | 0.00004 |
| 575 | 1.47526 | 0.00004 |
| 576 | 1.47521 | 0.00004 |
| 577 | 1.47517 | 0.00004 |
| 578 | 1.47513 | 0.00004 |
| 579 | 1.47509 | 0.00004 |
| 580 | 1.47504 | 0.00004 |
| 581 | 1.475 | 0.00004 |
| 582 | 1.47496 | 0.00004 |
| 583 | 1.47492 | 0.00004 |
| 584 | 1.47488 | 0.00004 |
| 585 | 1.47484 | 0.00004 |
| 586 | 1.4748 | 0.00004 |
| 587 | 1.47475 | 0.00004 |
| 588 | 1.47471 | 0.00004 |
| 589 | 1.47467 | 0.00003 |
| 590 | 1.47463 | 0.00003 |
| 591 | 1.47459 | 0.00003 |
| 592 | 1.47455 | 0.00003 |
| 593 | 1.47451 | 0.00003 |
| 594 | 1.47447 | 0.00003 |
| 595 | 1.47443 | 0.00003 |
| 596 | 1.47439 | 0.00003 |
| 597 | 1.47436 | 0.00003 |
| 598 | 1.47432 | 0.00003 |
| 599 | 1.47428 | 0.00003 |
| 600 | 1.47424 | 0.00003 |
| 601 | 1.4742 | 0.00003 |
| 602 | 1.47416 | 0.00003 |
| 603 | 1.47412 | 0.00003 |
| 604 | 1.47409 | 0.00003 |
| 605 | 1.47405 | 0.00003 |
| 606 | 1.47401 | 0.00003 |
| 607 | 1.47397 | 0.00003 |
| 608 | 1.47394 | 0.00003 |
| 609 | 1.4739 | 0.00003 |
| 610 | 1.47386 | 0.00003 |
| 611 | 1.47383 | 0.00003 |
| 612 | 1.47379 | 0.00003 |
| 613 | 1.47375 | 0.00003 |
| 614 | 1.47372 | 0.00003 |
| 615 | 1.47368 | 0.00003 |
| 616 | 1.47364 | 0.00003 |
| 617 | 1.47361 | 0.00003 |
| 618 | 1.47357 | 0.00003 |
| 619 | 1.47354 | 0.00003 |
| 620 | 1.4735 | 0.00003 |
| 621 | 1.47347 | 0.00003 |
| 622 | 1.47343 | 0.00003 |
| 623 | 1.4734 | 0.00003 |
| 624 | 1.47336 | 0.00003 |
| 625 | 1.47333 | 0.00003 |
| 626 | 1.47329 | 0.00003 |
| 627 | 1.47326 | 0.00003 |
| 628 | 1.47322 | 0.00003 |
| 629 | 1.47319 | 0.00003 |
| 630 | 1.47316 | 0.00003 |
| 631 | 1.47312 | 0.00003 |
| 632 | 1.47309 | 0.00003 |
| 633 | 1.47305 | 0.00002 |
| 634 | 1.47302 | 0.00002 |
| 635 | 1.47299 | 0.00002 |
| 636 | 1.47296 | 0.00002 |
| 637 | 1.47292 | 0.00002 |
| 638 | 1.47289 | 0.00002 |
| 639 | 1.47286 | 0.00002 |
| 640 | 1.47282 | 0.00002 |
| 641 | 1.47279 | 0.00002 |
| 642 | 1.47276 | 0.00002 |
| 643 | 1.47273 | 0.00002 |
| 644 | 1.4727 | 0.00002 |
| 645 | 1.47266 | 0.00002 |
| 646 | 1.47263 | 0.00002 |
| 647 | 1.4726 | 0.00002 |
| 648 | 1.47257 | 0.00002 |
| 649 | 1.47254 | 0.00002 |
| 650 | 1.47251 | 0.00002 |
| 651 | 1.47248 | 0.00002 |
| 652 | 1.47244 | 0.00002 |
| 653 | 1.47241 | 0.00002 |
| 654 | 1.47238 | 0.00002 |
| 655 | 1.47235 | 0.00002 |
| 656 | 1.47232 | 0.00002 |
| 657 | 1.47229 | 0.00002 |
| 658 | 1.47226 | 0.00002 |
| 659 | 1.47223 | 0.00002 |
| 660 | 1.4722 | 0.00002 |
| 661 | 1.47217 | 0.00002 |
| 662 | 1.47214 | 0.00002 |
| 663 | 1.47211 | 0.00002 |
| 664 | 1.47208 | 0.00002 |
| 665 | 1.47205 | 0.00002 |
| 666 | 1.47202 | 0.00002 |
| 667 | 1.472 | 0.00002 |
| 668 | 1.47197 | 0.00002 |
| 669 | 1.47194 | 0.00002 |
| 670 | 1.47191 | 0.00002 |
| 671 | 1.47188 | 0.00002 |
| 672 | 1.47185 | 0.00002 |
| 673 | 1.47182 | 0.00002 |
| 674 | 1.47179 | 0.00002 |

TABLE 13-continued

Refractive indices and dispersion curve for a SiO₂ layer vs. wavelength.

| Wavelength | Refractive Index | Extinction Coefficient |
|---|---|---|
| 675 | 1.47177 | 0.00002 |
| 676 | 1.47174 | 0.00002 |
| 677 | 1.47171 | 0.00002 |
| 678 | 1.47168 | 0.00002 |
| 679 | 1.47166 | 0.00002 |
| 680 | 1.47163 | 0.00002 |
| 681 | 1.4716 | 0.00002 |
| 682 | 1.47157 | 0.00002 |
| 683 | 1.47155 | 0.00002 |
| 684 | 1.47152 | 0.00002 |
| 685 | 1.47149 | 0.00002 |
| 686 | 1.47146 | 0.00002 |
| 687 | 1.47144 | 0.00002 |
| 688 | 1.47141 | 0.00002 |
| 689 | 1.47138 | 0.00002 |
| 690 | 1.47136 | 0.00002 |
| 691 | 1.47133 | 0.00002 |
| 692 | 1.4713 | 0.00002 |
| 693 | 1.47128 | 0.00001 |
| 694 | 1.47125 | 0.00001 |
| 695 | 1.47123 | 0.00001 |
| 696 | 1.4712 | 0.00001 |
| 697 | 1.47117 | 0.00001 |
| 698 | 1.47115 | 0.00001 |
| 699 | 1.47112 | 0.00001 |
| 700 | 1.4711 | 0.00001 |
| 701 | 1.47107 | 0.00001 |
| 702 | 1.47105 | 0.00001 |
| 703 | 1.47102 | 0.00001 |
| 704 | 1.471 | 0.00001 |
| 705 | 1.47097 | 0.00001 |
| 706 | 1.47095 | 0.00001 |
| 707 | 1.47092 | 0.00001 |
| 708 | 1.4709 | 0.00001 |
| 709 | 1.47087 | 0.00001 |
| 710 | 1.47085 | 0.00001 |
| 711 | 1.47082 | 0.00001 |
| 712 | 1.4708 | 0.00001 |
| 713 | 1.47077 | 0.00001 |
| 714 | 1.47075 | 0.00001 |
| 715 | 1.47073 | 0.00001 |
| 716 | 1.4707 | 0.00001 |
| 717 | 1.47068 | 0.00001 |
| 718 | 1.47065 | 0.00001 |
| 719 | 1.47063 | 0.00001 |
| 720 | 1.47061 | 0.00001 |
| 721 | 1.47058 | 0.00001 |
| 722 | 1.47056 | 0.00001 |
| 723 | 1.47054 | 0.00001 |
| 724 | 1.47051 | 0.00001 |
| 725 | 1.47049 | 0.00001 |
| 726 | 1.47047 | 0.00001 |
| 727 | 1.47044 | 0.00001 |
| 728 | 1.47042 | 0.00001 |
| 729 | 1.4704 | 0.00001 |
| 730 | 1.47038 | 0.00001 |
| 731 | 1.47035 | 0.00001 |
| 732 | 1.47033 | 0.00001 |
| 733 | 1.47031 | 0.00001 |
| 734 | 1.47029 | 0.00001 |
| 735 | 1.47026 | 0.00001 |
| 736 | 1.47024 | 0.00001 |
| 737 | 1.47022 | 0.00001 |
| 738 | 1.4702 | 0.00001 |
| 739 | 1.47017 | 0.00001 |
| 740 | 1.47015 | 0.00001 |
| 741 | 1.47013 | 0.00001 |
| 742 | 1.47011 | 0.00001 |
| 743 | 1.47009 | 0.00001 |
| 744 | 1.47007 | 0.00001 |
| 745 | 1.47004 | 0.00001 |
| 746 | 1.47002 | 0.00001 |
| 747 | 1.47 | 0.00001 |
| 748 | 1.46998 | 0.00001 |
| 749 | 1.46996 | 0.00001 |
| 750 | 1.46994 | 0.00001 |
| 751 | 1.46992 | 0.00001 |
| 752 | 1.4699 | 0.00001 |
| 753 | 1.46987 | 0.00001 |
| 754 | 1.46985 | 0.00001 |
| 755 | 1.46983 | 0.00001 |
| 756 | 1.46981 | 0.00001 |
| 757 | 1.46979 | 0.00001 |
| 758 | 1.46977 | 0.00001 |
| 759 | 1.46975 | 0.00001 |
| 760 | 1.46973 | 0.00001 |
| 761 | 1.46971 | 0.00001 |
| 762 | 1.46969 | 0.00001 |
| 763 | 1.46967 | 0.00001 |
| 764 | 1.46965 | 0.00001 |
| 765 | 1.46963 | 0.00001 |
| 766 | 1.46961 | 0.00001 |
| 767 | 1.46959 | 0.00001 |
| 768 | 1.46957 | 0.00001 |
| 769 | 1.46955 | 0.00001 |
| 770 | 1.46953 | 0.00001 |
| 771 | 1.46951 | 0.00001 |
| 772 | 1.46949 | 0.00001 |
| 773 | 1.46947 | 0.00001 |
| 774 | 1.46945 | 0.00001 |
| 775 | 1.46943 | 0.00001 |
| 776 | 1.46941 | 0.00001 |
| 777 | 1.46939 | 0.00001 |
| 778 | 1.46938 | 0.00001 |
| 779 | 1.46936 | 0.00001 |
| 780 | 1.46934 | 0.00001 |
| 781 | 1.46932 | 0.00001 |
| 782 | 1.4693 | 0.00001 |
| 783 | 1.46928 | 0.00001 |
| 784 | 1.46926 | 0.00001 |
| 785 | 1.46924 | 0.00001 |
| 786 | 1.46923 | 0.00001 |
| 787 | 1.46921 | 0.00001 |
| 788 | 1.46919 | 0.00001 |
| 789 | 1.46917 | 0.00001 |
| 790 | 1.46915 | 0.00001 |
| 791 | 1.46913 | 0.00001 |
| 792 | 1.46912 | 0.00001 |
| 793 | 1.4691 | 0.00001 |
| 794 | 1.46908 | 0.00001 |
| 795 | 1.46906 | 0.00001 |
| 796 | 1.46904 | 0.00001 |
| 797 | 1.46903 | 0.00001 |
| 798 | 1.46901 | 0.00001 |

TABLE 14

Refractive indices and dispersion curve for a AlOxNy layer having a thickness of 100 nm vs. wavelength.

| Wavelength | Refractive Index | Extinction Coefficient |
|---|---|---|
| 350 | 2.05658 | 0 |
| 351 | 2.05585 | 0 |
| 352 | 2.05512 | 0 |
| 353 | 2.0544 | 0 |
| 354 | 2.05369 | 0 |
| 355 | 2.05299 | 0 |
| 356 | 2.05229 | 0 |
| 357 | 2.0516 | 0 |
| 358 | 2.05091 | 0 |
| 359 | 2.05023 | 0 |
| 360 | 2.04955 | 0 |
| 361 | 2.04888 | 0 |
| 362 | 2.04822 | 0 |
| 363 | 2.04756 | 0 |
| 364 | 2.04691 | 0 |

TABLE 14-continued

Refractive indices and dispersion curve for a AlOxNy layer having a thickness of 100 nm vs. wavelength.

| Wavelength | Refractive Index | Extinction Coefficient |
|---|---|---|
| 365 | 2.04626 | 0 |
| 366 | 2.04562 | 0 |
| 367 | 2.04498 | 0 |
| 368 | 2.04435 | 0 |
| 369 | 2.04372 | 0 |
| 370 | 2.0431 | 0 |
| 371 | 2.04249 | 0 |
| 372 | 2.04188 | 0 |
| 373 | 2.04127 | 0 |
| 374 | 2.04067 | 0 |
| 375 | 2.04007 | 0 |
| 376 | 2.03948 | 0 |
| 377 | 2.0389 | 0 |
| 378 | 2.03832 | 0 |
| 379 | 2.03774 | 0 |
| 380 | 2.03717 | 0 |
| 381 | 2.0366 | 0 |
| 382 | 2.03604 | 0 |
| 383 | 2.03548 | 0 |
| 384 | 2.03492 | 0 |
| 385 | 2.03437 | 0 |
| 386 | 2.03383 | 0 |
| 387 | 2.03329 | 0 |
| 388 | 2.03275 | 0 |
| 389 | 2.03222 | 0 |
| 390 | 2.03169 | 0 |
| 391 | 2.03117 | 0 |
| 392 | 2.03065 | 0 |
| 393 | 2.03013 | 0 |
| 394 | 2.02962 | 0 |
| 395 | 2.02911 | 0 |
| 396 | 2.02861 | 0 |
| 397 | 2.02811 | 0 |
| 398 | 2.02761 | 0 |
| 399 | 2.02712 | 0 |
| 400 | 2.02663 | 0 |
| 401 | 2.02614 | 0 |
| 402 | 2.02566 | 0 |
| 403 | 2.02518 | 0 |
| 404 | 2.02471 | 0 |
| 405 | 2.02424 | 0 |
| 406 | 2.02377 | 0 |
| 407 | 2.02331 | 0 |
| 408 | 2.02285 | 0 |
| 409 | 2.02239 | 0 |
| 410 | 2.02194 | 0 |
| 411 | 2.02149 | 0 |
| 412 | 2.02104 | 0 |
| 413 | 2.0206 | 0 |
| 414 | 2.02016 | 0 |
| 415 | 2.01972 | 0 |
| 416 | 2.01929 | 0 |
| 417 | 2.01886 | 0 |
| 418 | 2.01843 | 0 |
| 419 | 2.01801 | 0 |
| 420 | 2.01759 | 0 |
| 421 | 2.01717 | 0 |
| 422 | 2.01675 | 0 |
| 423 | 2.01634 | 0 |
| 424 | 2.01593 | 0 |
| 425 | 2.01553 | 0 |
| 426 | 2.01512 | 0 |
| 427 | 2.01472 | 0 |
| 428 | 2.01433 | 0 |
| 429 | 2.01393 | 0 |
| 430 | 2.01354 | 0 |
| 431 | 2.01315 | 0 |
| 432 | 2.01276 | 0 |
| 433 | 2.01238 | 0 |
| 434 | 2.012 | 0 |
| 435 | 2.01162 | 0 |
| 436 | 2.01125 | 0 |
| 437 | 2.01087 | 0 |
| 438 | 2.0105 | 0 |
| 439 | 2.01014 | 0 |
| 440 | 2.00977 | 0 |
| 441 | 2.00941 | 0 |
| 442 | 2.00905 | 0 |
| 443 | 2.00869 | 0 |
| 444 | 2.00833 | 0 |
| 445 | 2.00798 | 0 |
| 446 | 2.00763 | 0 |
| 447 | 2.00728 | 0 |
| 448 | 2.00694 | 0 |
| 449 | 2.00659 | 0 |
| 450 | 2.00625 | 0 |
| 451 | 2.00591 | 0 |
| 452 | 2.00558 | 0 |
| 453 | 2.00524 | 0 |
| 454 | 2.00491 | 0 |
| 455 | 2.00458 | 0 |
| 456 | 2.00425 | 0 |
| 457 | 2.00393 | 0 |
| 458 | 2.00361 | 0 |
| 459 | 2.00328 | 0 |
| 460 | 2.00297 | 0 |
| 461 | 2.00265 | 0 |
| 462 | 2.00233 | 0 |
| 463 | 2.00202 | 0 |
| 464 | 2.00171 | 0 |
| 465 | 2.0014 | 0 |
| 466 | 2.0011 | 0 |
| 467 | 2.00079 | 0 |
| 468 | 2.00049 | 0 |
| 469 | 2.00019 | 0 |
| 470 | 1.99989 | 0 |
| 471 | 1.99959 | 0 |
| 472 | 1.9993 | 0 |
| 473 | 1.999 | 0 |
| 474 | 1.99871 | 0 |
| 475 | 1.99842 | 0 |
| 476 | 1.99814 | 0 |
| 477 | 1.99785 | 0 |
| 478 | 1.99757 | 0 |
| 479 | 1.99729 | 0 |
| 480 | 1.99701 | 0 |
| 481 | 1.99673 | 0 |
| 482 | 1.99645 | 0 |
| 483 | 1.99618 | 0 |
| 484 | 1.9959 | 0 |
| 485 | 1.99563 | 0 |
| 486 | 1.99536 | 0 |
| 487 | 1.99509 | 0 |
| 488 | 1.99483 | 0 |
| 489 | 1.99456 | 0 |
| 490 | 1.9943 | 0 |
| 491 | 1.99404 | 0 |
| 492 | 1.99378 | 0 |
| 493 | 1.99352 | 0 |
| 494 | 1.99326 | 0 |
| 495 | 1.99301 | 0 |
| 496 | 1.99275 | 0 |
| 497 | 1.9925 | 0 |
| 498 | 1.99225 | 0 |
| 499 | 1.992 | 0 |
| 500 | 1.99175 | 0 |
| 501 | 1.99151 | 0 |
| 502 | 1.99126 | 0 |
| 503 | 1.99102 | 0 |
| 504 | 1.99078 | 0 |
| 505 | 1.99054 | 0 |
| 506 | 1.9903 | 0 |
| 507 | 1.99006 | 0 |
| 508 | 1.98983 | 0 |
| 509 | 1.98959 | 0 |
| 510 | 1.98936 | 0 |
| 511 | 1.98913 | 0 |
| 512 | 1.9889 | 0 |
| 513 | 1.98867 | 0 |
| 514 | 1.98844 | 0 |

TABLE 14-continued

Refractive indices and dispersion curve for a AlOxNy layer having a thickness of 100 nm vs. wavelength.

| Wavelength | Refractive Index | Extinction Coefficient |
|---|---|---|
| 515 | 1.98822 | 0 |
| 516 | 1.98799 | 0 |
| 517 | 1.98777 | 0 |
| 518 | 1.98755 | 0 |
| 519 | 1.98733 | 0 |
| 520 | 1.98711 | 0 |
| 521 | 1.98689 | 0 |
| 522 | 1.98667 | 0 |
| 523 | 1.98645 | 0 |
| 524 | 1.98624 | 0 |
| 525 | 1.98603 | 0 |
| 526 | 1.98581 | 0 |
| 527 | 1.9856 | 0 |
| 528 | 1.98539 | 0 |
| 529 | 1.98519 | 0 |
| 530 | 1.98498 | 0 |
| 531 | 1.98477 | 0 |
| 532 | 1.98457 | 0 |
| 533 | 1.98436 | 0 |
| 534 | 1.98416 | 0 |
| 535 | 1.98396 | 0 |
| 536 | 1.98376 | 0 |
| 537 | 1.98356 | 0 |
| 538 | 1.98336 | 0 |
| 539 | 1.98317 | 0 |
| 540 | 1.98297 | 0 |
| 541 | 1.98277 | 0 |
| 542 | 1.98258 | 0 |
| 543 | 1.98239 | 0 |
| 544 | 1.9822 | 0 |
| 545 | 1.98201 | 0 |
| 546 | 1.98182 | 0 |
| 547 | 1.98163 | 0 |
| 548 | 1.98144 | 0 |
| 549 | 1.98126 | 0 |
| 550 | 1.98107 | 0 |
| 551 | 1.98089 | 0 |
| 552 | 1.9807 | 0 |
| 553 | 1.98052 | 0 |
| 554 | 1.98034 | 0 |
| 555 | 1.98016 | 0 |
| 556 | 1.97998 | 0 |
| 557 | 1.9798 | 0 |
| 558 | 1.97962 | 0 |
| 559 | 1.97945 | 0 |
| 560 | 1.97927 | 0 |
| 561 | 1.9791 | 0 |
| 562 | 1.97892 | 0 |
| 563 | 1.97875 | 0 |
| 564 | 1.97858 | 0 |
| 565 | 1.97841 | 0 |
| 566 | 1.97824 | 0 |
| 567 | 1.97807 | 0 |
| 568 | 1.9779 | 0 |
| 569 | 1.97774 | 0 |
| 570 | 1.97757 | 0 |
| 571 | 1.9774 | 0 |
| 572 | 1.97724 | 0 |
| 573 | 1.97708 | 0 |
| 574 | 1.97691 | 0 |
| 575 | 1.97675 | 0 |
| 576 | 1.97659 | 0 |
| 577 | 1.97643 | 0 |
| 578 | 1.97627 | 0 |
| 579 | 1.97611 | 0 |
| 580 | 1.97596 | 0 |
| 581 | 1.9758 | 0 |
| 582 | 1.97564 | 0 |
| 583 | 1.97549 | 0 |
| 584 | 1.97533 | 0 |
| 585 | 1.97518 | 0 |
| 586 | 1.97503 | 0 |
| 587 | 1.97487 | 0 |
| 588 | 1.97472 | 0 |
| 589 | 1.97457 | 0 |
| 590 | 1.97442 | 0 |
| 591 | 1.97427 | 0 |
| 592 | 1.97413 | 0 |
| 593 | 1.97398 | 0 |
| 594 | 1.97383 | 0 |
| 595 | 1.97369 | 0 |
| 596 | 1.97354 | 0 |
| 597 | 1.9734 | 0 |
| 598 | 1.97325 | 0 |
| 599 | 1.97311 | 0 |
| 600 | 1.97297 | 0 |
| 601 | 1.97283 | 0 |
| 602 | 1.97268 | 0 |
| 603 | 1.97254 | 0 |
| 604 | 1.9724 | 0 |
| 605 | 1.97227 | 0 |
| 606 | 1.97213 | 0 |
| 607 | 1.97199 | 0 |
| 608 | 1.97185 | 0 |
| 609 | 1.97172 | 0 |
| 610 | 1.97158 | 0 |
| 611 | 1.97145 | 0 |
| 612 | 1.97131 | 0 |
| 613 | 1.97118 | 0 |
| 614 | 1.97105 | 0 |
| 615 | 1.97092 | 0 |
| 616 | 1.97078 | 0 |
| 617 | 1.97065 | 0 |
| 618 | 1.97052 | 0 |
| 619 | 1.97039 | 0 |
| 620 | 1.97027 | 0 |
| 621 | 1.97014 | 0 |
| 622 | 1.97001 | 0 |
| 623 | 1.96988 | 0 |
| 624 | 1.96976 | 0 |
| 625 | 1.96963 | 0 |
| 626 | 1.96951 | 0 |
| 627 | 1.96938 | 0 |
| 628 | 1.96926 | 0 |
| 629 | 1.96913 | 0 |
| 630 | 1.96901 | 0 |
| 631 | 1.96889 | 0 |
| 632 | 1.96877 | 0 |
| 633 | 1.96865 | 0 |
| 634 | 1.96853 | 0 |
| 635 | 1.96841 | 0 |
| 636 | 1.96829 | 0 |
| 637 | 1.96817 | 0 |
| 638 | 1.96805 | 0 |
| 639 | 1.96793 | 0 |
| 640 | 1.96782 | 0 |
| 641 | 1.9677 | 0 |
| 642 | 1.96758 | 0 |
| 643 | 1.96747 | 0 |
| 644 | 1.96735 | 0 |
| 645 | 1.96724 | 0 |
| 646 | 1.96712 | 0 |
| 647 | 1.96701 | 0 |
| 648 | 1.9669 | 0 |
| 649 | 1.96679 | 0 |
| 650 | 1.96668 | 0 |
| 651 | 1.96656 | 0 |
| 652 | 1.96645 | 0 |
| 653 | 1.96634 | 0 |
| 654 | 1.96623 | 0 |
| 655 | 1.96612 | 0 |
| 656 | 1.96602 | 0 |
| 657 | 1.96591 | 0 |
| 658 | 1.9658 | 0 |
| 659 | 1.96569 | 0 |
| 660 | 1.96559 | 0 |
| 661 | 1.96548 | 0 |
| 662 | 1.96537 | 0 |
| 663 | 1.96527 | 0 |
| 664 | 1.96516 | 0 |

TABLE 14-continued

Refractive indices and dispersion curve for a AlOxNy layer having a thickness of 100 nm vs. wavelength.

| Wavelength | Refractive Index | Extinction Coefficient |
|---|---|---|
| 665 | 1.96506 | 0 |
| 666 | 1.96496 | 0 |
| 667 | 1.96485 | 0 |
| 668 | 1.96475 | 0 |
| 669 | 1.96465 | 0 |
| 670 | 1.96455 | 0 |
| 671 | 1.96445 | 0 |
| 672 | 1.96434 | 0 |
| 673 | 1.96424 | 0 |
| 674 | 1.96414 | 0 |
| 675 | 1.96404 | 0 |
| 676 | 1.96394 | 0 |
| 677 | 1.96385 | 0 |
| 678 | 1.96375 | 0 |
| 679 | 1.96365 | 0 |
| 680 | 1.96355 | 0 |
| 681 | 1.96346 | 0 |
| 682 | 1.96336 | 0 |
| 683 | 1.96326 | 0 |
| 684 | 1.96317 | 0 |
| 685 | 1.96307 | 0 |
| 686 | 1.96298 | 0 |
| 687 | 1.96288 | 0 |
| 688 | 1.96279 | 0 |
| 689 | 1.96269 | 0 |
| 690 | 1.9626 | 0 |
| 691 | 1.96251 | 0 |
| 692 | 1.96242 | 0 |
| 693 | 1.96232 | 0 |
| 694 | 1.96223 | 0 |
| 695 | 1.96214 | 0 |
| 696 | 1.96205 | 0 |
| 697 | 1.96196 | 0 |
| 698 | 1.96187 | 0 |
| 699 | 1.96178 | 0 |
| 700 | 1.96169 | 0 |
| 701 | 1.9616 | 0 |
| 702 | 1.96151 | 0 |
| 703 | 1.96143 | 0 |
| 704 | 1.96134 | 0 |
| 705 | 1.96125 | 0 |
| 706 | 1.96116 | 0 |
| 707 | 1.96108 | 0 |
| 708 | 1.96099 | 0 |
| 709 | 1.96091 | 0 |
| 710 | 1.96082 | 0 |
| 711 | 1.96073 | 0 |
| 712 | 1.96065 | 0 |
| 713 | 1.96057 | 0 |
| 714 | 1.96048 | 0 |
| 715 | 1.9604 | 0 |
| 716 | 1.96031 | 0 |
| 717 | 1.96023 | 0 |
| 718 | 1.96015 | 0 |
| 719 | 1.96007 | 0 |
| 720 | 1.95998 | 0 |
| 721 | 1.9599 | 0 |
| 722 | 1.95982 | 0 |
| 723 | 1.95974 | 0 |
| 724 | 1.95966 | 0 |
| 725 | 1.95958 | 0 |
| 726 | 1.9595 | 0 |
| 727 | 1.95942 | 0 |
| 728 | 1.95934 | 0 |
| 729 | 1.95926 | 0 |
| 730 | 1.95918 | 0 |
| 731 | 1.95911 | 0 |
| 732 | 1.95903 | 0 |
| 733 | 1.95895 | 0 |
| 734 | 1.95887 | 0 |
| 735 | 1.9588 | 0 |
| 736 | 1.95872 | 0 |
| 737 | 1.95864 | 0 |
| 738 | 1.95857 | 0 |
| 739 | 1.95849 | 0 |
| 740 | 1.95841 | 0 |
| 741 | 1.95834 | 0 |
| 742 | 1.95826 | 0 |
| 743 | 1.95819 | 0 |
| 744 | 1.95812 | 0 |
| 745 | 1.95804 | 0 |
| 746 | 1.95797 | 0 |
| 747 | 1.9579 | 0 |
| 748 | 1.95782 | 0 |
| 749 | 1.95775 | 0 |
| 750 | 1.95768 | 0 |
| 751 | 1.9576 | 0 |
| 752 | 1.95753 | 0 |
| 753 | 1.95746 | 0 |
| 754 | 1.95739 | 0 |
| 755 | 1.95732 | 0 |
| 756 | 1.95725 | 0 |
| 757 | 1.95718 | 0 |
| 758 | 1.95711 | 0 |
| 759 | 1.95704 | 0 |
| 760 | 1.95697 | 0 |
| 761 | 1.9569 | 0 |
| 762 | 1.95683 | 0 |
| 763 | 1.95676 | 0 |
| 764 | 1.95669 | 0 |
| 765 | 1.95662 | 0 |
| 766 | 1.95656 | 0 |
| 767 | 1.95649 | 0 |
| 768 | 1.95642 | 0 |
| 769 | 1.95635 | 0 |
| 770 | 1.95629 | 0 |
| 771 | 1.95622 | 0 |
| 772 | 1.95615 | 0 |
| 773 | 1.95609 | 0 |
| 774 | 1.95602 | 0 |
| 775 | 1.95596 | 0 |
| 776 | 1.95589 | 0 |
| 777 | 1.95583 | 0 |
| 778 | 1.95576 | 0 |
| 779 | 1.9557 | 0 |
| 780 | 1.95563 | 0 |
| 781 | 1.95557 | 0 |
| 782 | 1.9555 | 0 |
| 783 | 1.95544 | 0 |
| 784 | 1.95538 | 0 |
| 785 | 1.95531 | 0 |
| 786 | 1.95525 | 0 |
| 787 | 1.95519 | 0 |
| 788 | 1.95513 | 0 |
| 789 | 1.95506 | 0 |
| 790 | 1.955 | 0 |
| 791 | 1.95494 | 0 |
| 792 | 1.95488 | 0 |
| 793 | 1.95482 | 0 |
| 794 | 1.95476 | 0 |
| 795 | 1.9547 | 0 |
| 796 | 1.95463 | 0 |
| 797 | 1.95457 | 0 |
| 798 | 1.95451 | 0 |

TABLE 15

Refractive indices and dispersion curve for a AlOxNy layer having a thickness of 2000 nm vs. wavelength.

| Wavelength | Refractive Index | Extinction Coefficient |
|---|---|---|
| 350 | 2.03915 | 0.00065 |
| 351 | 2.03836 | 0.00064 |
| 352 | 2.03758 | 0.00064 |
| 353 | 2.03681 | 0.00063 |

TABLE 15-continued

Refractive indices and dispersion curve for a AlOxNy layer having a thickness of 2000 nm vs. wavelength.

| Wavelength | Refractive Index | Extinction Coefficient |
|---|---|---|
| 354 | 2.03605 | 0.00063 |
| 355 | 2.03529 | 0.00062 |
| 356 | 2.03454 | 0.00062 |
| 357 | 2.0338 | 0.00061 |
| 358 | 2.03307 | 0.00061 |
| 359 | 2.03234 | 0.0006 |
| 360 | 2.03162 | 0.0006 |
| 361 | 2.03091 | 0.00059 |
| 362 | 2.03021 | 0.00059 |
| 363 | 2.02951 | 0.00059 |
| 364 | 2.02882 | 0.00058 |
| 365 | 2.02813 | 0.00058 |
| 366 | 2.02746 | 0.00057 |
| 367 | 2.02678 | 0.00057 |
| 368 | 2.02612 | 0.00056 |
| 369 | 2.02546 | 0.00056 |
| 370 | 2.02481 | 0.00055 |
| 371 | 2.02416 | 0.00055 |
| 372 | 2.02352 | 0.00055 |
| 373 | 2.02289 | 0.00054 |
| 374 | 2.02226 | 0.00054 |
| 375 | 2.02164 | 0.00053 |
| 376 | 2.02102 | 0.00053 |
| 377 | 2.02041 | 0.00053 |
| 378 | 2.01981 | 0.00052 |
| 379 | 2.01921 | 0.00052 |
| 380 | 2.01862 | 0.00051 |
| 381 | 2.01803 | 0.00051 |
| 382 | 2.01744 | 0.00051 |
| 383 | 2.01687 | 0.0005 |
| 384 | 2.0163 | 0.0005 |
| 385 | 2.01573 | 0.0005 |
| 386 | 2.01517 | 0.00049 |
| 387 | 2.01461 | 0.00049 |
| 388 | 2.01406 | 0.00048 |
| 389 | 2.01351 | 0.00048 |
| 390 | 2.01297 | 0.00048 |
| 391 | 2.01243 | 0.00047 |
| 392 | 2.0119 | 0.00047 |
| 393 | 2.01137 | 0.00047 |
| 394 | 2.01085 | 0.00046 |
| 395 | 2.01033 | 0.00046 |
| 396 | 2.00982 | 0.00046 |
| 397 | 2.00931 | 0.00045 |
| 398 | 2.00881 | 0.00045 |
| 399 | 2.00831 | 0.00045 |
| 400 | 2.00781 | 0.00044 |
| 401 | 2.00732 | 0.00044 |
| 402 | 2.00683 | 0.00043 |
| 403 | 2.00635 | 0.00043 |
| 404 | 2.00587 | 0.00043 |
| 405 | 2.00539 | 0.00043 |
| 406 | 2.00492 | 0.00042 |
| 407 | 2.00446 | 0.00042 |
| 408 | 2.00399 | 0.00042 |
| 409 | 2.00353 | 0.00041 |
| 410 | 2.00308 | 0.00041 |
| 411 | 2.00263 | 0.00041 |
| 412 | 2.00218 | 0.0004 |
| 413 | 2.00174 | 0.0004 |
| 414 | 2.0013 | 0.0004 |
| 415 | 2.00086 | 0.00039 |
| 416 | 2.00043 | 0.00039 |
| 417 | 2 | 0.00039 |
| 418 | 1.99957 | 0.00039 |
| 419 | 1.99915 | 0.00038 |
| 420 | 1.99873 | 0.00038 |
| 421 | 1.99832 | 0.00038 |
| 422 | 1.99791 | 0.00037 |
| 423 | 1.9975 | 0.00037 |
| 424 | 1.99709 | 0.00037 |
| 425 | 1.99669 | 0.00037 |
| 426 | 1.99629 | 0.00036 |
| 427 | 1.9959 | 0.00036 |
| 428 | 1.9955 | 0.00036 |
| 429 | 1.99511 | 0.00035 |
| 430 | 1.99473 | 0.00035 |
| 431 | 1.99435 | 0.00035 |
| 432 | 1.99397 | 0.00035 |
| 433 | 1.99359 | 0.00034 |
| 434 | 1.99321 | 0.00034 |
| 435 | 1.99284 | 0.00034 |
| 436 | 1.99248 | 0.00034 |
| 437 | 1.99211 | 0.00033 |
| 438 | 1.99175 | 0.00033 |
| 439 | 1.99139 | 0.00033 |
| 440 | 1.99103 | 0.00033 |
| 441 | 1.99068 | 0.00032 |
| 442 | 1.99033 | 0.00032 |
| 443 | 1.98998 | 0.00032 |
| 444 | 1.98963 | 0.00032 |
| 445 | 1.98929 | 0.00031 |
| 446 | 1.98895 | 0.00031 |
| 447 | 1.98861 | 0.00031 |
| 448 | 1.98827 | 0.00031 |
| 449 | 1.98794 | 0.0003 |
| 450 | 1.98761 | 0.0003 |
| 451 | 1.98728 | 0.0003 |
| 452 | 1.98696 | 0.0003 |
| 453 | 1.98663 | 0.00029 |
| 454 | 1.98631 | 0.00029 |
| 455 | 1.986 | 0.00029 |
| 456 | 1.98568 | 0.00029 |
| 457 | 1.98537 | 0.00029 |
| 458 | 1.98506 | 0.00028 |
| 459 | 1.98475 | 0.00028 |
| 460 | 1.98444 | 0.00028 |
| 461 | 1.98414 | 0.00028 |
| 462 | 1.98383 | 0.00028 |
| 463 | 1.98353 | 0.00027 |
| 464 | 1.98324 | 0.00027 |
| 465 | 1.98294 | 0.00027 |
| 466 | 1.98265 | 0.00027 |
| 467 | 1.98235 | 0.00027 |
| 468 | 1.98207 | 0.00026 |
| 469 | 1.98178 | 0.00026 |
| 470 | 1.98149 | 0.00026 |
| 471 | 1.98121 | 0.00026 |
| 472 | 1.98093 | 0.00026 |
| 473 | 1.98065 | 0.00025 |
| 474 | 1.98037 | 0.00025 |
| 475 | 1.9801 | 0.00025 |
| 476 | 1.97982 | 0.00025 |
| 477 | 1.97955 | 0.00025 |
| 478 | 1.97928 | 0.00024 |
| 479 | 1.97902 | 0.00024 |
| 480 | 1.97875 | 0.00024 |
| 481 | 1.97849 | 0.00024 |
| 482 | 1.97823 | 0.00024 |
| 483 | 1.97797 | 0.00023 |
| 484 | 1.97771 | 0.00023 |
| 485 | 1.97745 | 0.00023 |
| 486 | 1.9772 | 0.00023 |
| 487 | 1.97694 | 0.00023 |
| 488 | 1.97669 | 0.00023 |
| 489 | 1.97644 | 0.00022 |
| 490 | 1.97619 | 0.00022 |
| 491 | 1.97595 | 0.00022 |
| 492 | 1.9757 | 0.00022 |
| 493 | 1.97546 | 0.00022 |
| 494 | 1.97522 | 0.00022 |
| 495 | 1.97498 | 0.00021 |
| 496 | 1.97474 | 0.00021 |
| 497 | 1.97451 | 0.00021 |
| 498 | 1.97427 | 0.00021 |
| 499 | 1.97404 | 0.00021 |
| 500 | 1.97381 | 0.00021 |
| 501 | 1.97358 | 0.0002 |

TABLE 15-continued

Refractive indices and dispersion curve for a AlOxNy layer having a thickness of 2000 nm vs. wavelength.

| Wavelength | Refractive Index | Extinction Coefficient |
|---|---|---|
| 502 | 1.97335 | 0.0002 |
| 503 | 1.97312 | 0.0002 |
| 504 | 1.9729 | 0.0002 |
| 505 | 1.97267 | 0.0002 |
| 506 | 1.97245 | 0.0002 |
| 507 | 1.97223 | 0.0002 |
| 508 | 1.97201 | 0.00019 |
| 509 | 1.97179 | 0.00019 |
| 510 | 1.97157 | 0.00019 |
| 511 | 1.97136 | 0.00019 |
| 512 | 1.97114 | 0.00019 |
| 513 | 1.97093 | 0.00019 |
| 514 | 1.97072 | 0.00019 |
| 515 | 1.97051 | 0.00018 |
| 516 | 1.9703 | 0.00018 |
| 517 | 1.97009 | 0.00018 |
| 518 | 1.96989 | 0.00018 |
| 519 | 1.96968 | 0.00018 |
| 520 | 1.96948 | 0.00018 |
| 521 | 1.96928 | 0.00018 |
| 522 | 1.96908 | 0.00017 |
| 523 | 1.96888 | 0.00017 |
| 524 | 1.96868 | 0.00017 |
| 525 | 1.96848 | 0.00017 |
| 526 | 1.96829 | 0.00017 |
| 527 | 1.96809 | 0.00017 |
| 528 | 1.9679 | 0.00017 |
| 529 | 1.96771 | 0.00017 |
| 530 | 1.96752 | 0.00016 |
| 531 | 1.96733 | 0.00016 |
| 532 | 1.96714 | 0.00016 |
| 533 | 1.96695 | 0.00016 |
| 534 | 1.96677 | 0.00016 |
| 535 | 1.96658 | 0.00016 |
| 536 | 1.9664 | 0.00016 |
| 537 | 1.96621 | 0.00016 |
| 538 | 1.96603 | 0.00015 |
| 539 | 1.96585 | 0.00015 |
| 540 | 1.96567 | 0.00015 |
| 541 | 1.96549 | 0.00015 |
| 542 | 1.96532 | 0.00015 |
| 543 | 1.96514 | 0.00015 |
| 544 | 1.96497 | 0.00015 |
| 545 | 1.96479 | 0.00015 |
| 546 | 1.96462 | 0.00015 |
| 547 | 1.96445 | 0.00014 |
| 548 | 1.96428 | 0.00014 |
| 549 | 1.96411 | 0.00014 |
| 550 | 1.96394 | 0.00014 |
| 551 | 1.96377 | 0.00014 |
| 552 | 1.9636 | 0.00014 |
| 553 | 1.96344 | 0.00014 |
| 554 | 1.96327 | 0.00014 |
| 555 | 1.96311 | 0.00014 |
| 556 | 1.96295 | 0.00013 |
| 557 | 1.96278 | 0.00013 |
| 558 | 1.96262 | 0.00013 |
| 559 | 1.96246 | 0.00013 |
| 560 | 1.9623 | 0.00013 |
| 561 | 1.96215 | 0.00013 |
| 562 | 1.96199 | 0.00013 |
| 563 | 1.96183 | 0.00013 |
| 564 | 1.96168 | 0.00013 |
| 565 | 1.96152 | 0.00013 |
| 566 | 1.96137 | 0.00012 |
| 567 | 1.96122 | 0.00012 |
| 568 | 1.96106 | 0.00012 |
| 569 | 1.96091 | 0.00012 |
| 570 | 1.96076 | 0.00012 |
| 571 | 1.96061 | 0.00012 |
| 572 | 1.96046 | 0.00012 |
| 573 | 1.96032 | 0.00012 |
| 574 | 1.96017 | 0.00012 |
| 575 | 1.96002 | 0.00012 |
| 576 | 1.95988 | 0.00012 |
| 577 | 1.95973 | 0.00011 |
| 578 | 1.95959 | 0.00011 |
| 579 | 1.95945 | 0.00011 |
| 580 | 1.95931 | 0.00011 |
| 581 | 1.95917 | 0.00011 |
| 582 | 1.95903 | 0.00011 |
| 583 | 1.95889 | 0.00011 |
| 584 | 1.95875 | 0.00011 |
| 585 | 1.95861 | 0.00011 |
| 586 | 1.95847 | 0.00011 |
| 587 | 1.95834 | 0.00011 |
| 588 | 1.9582 | 0.00011 |
| 589 | 1.95807 | 0.0001 |
| 590 | 1.95793 | 0.0001 |
| 591 | 1.9578 | 0.0001 |
| 592 | 1.95766 | 0.0001 |
| 593 | 1.95753 | 0.0001 |
| 594 | 1.9574 | 0.0001 |
| 595 | 1.95727 | 0.0001 |
| 596 | 1.95714 | 0.0001 |
| 597 | 1.95701 | 0.0001 |
| 598 | 1.95688 | 0.0001 |
| 599 | 1.95676 | 0.0001 |
| 600 | 1.95663 | 0.0001 |
| 601 | 1.9565 | 0.0001 |
| 602 | 1.95638 | 0.00009 |
| 603 | 1.95625 | 0.00009 |
| 604 | 1.95613 | 0.00009 |
| 605 | 1.956 | 0.00009 |
| 606 | 1.95588 | 0.00009 |
| 607 | 1.95576 | 0.00009 |
| 608 | 1.95564 | 0.00009 |
| 609 | 1.95552 | 0.00009 |
| 610 | 1.9554 | 0.00009 |
| 611 | 1.95528 | 0.00009 |
| 612 | 1.95516 | 0.00009 |
| 613 | 1.95504 | 0.00009 |
| 614 | 1.95492 | 0.00009 |
| 615 | 1.9548 | 0.00009 |
| 616 | 1.95469 | 0.00009 |
| 617 | 1.95457 | 0.00008 |
| 618 | 1.95446 | 0.00008 |
| 619 | 1.95434 | 0.00008 |
| 620 | 1.95423 | 0.00008 |
| 621 | 1.95411 | 0.00008 |
| 622 | 1.954 | 0.00008 |
| 623 | 1.95389 | 0.00008 |
| 624 | 1.95378 | 0.00008 |
| 625 | 1.95366 | 0.00008 |
| 626 | 1.95355 | 0.00008 |
| 627 | 1.95344 | 0.00008 |
| 628 | 1.95333 | 0.00008 |
| 629 | 1.95322 | 0.00008 |
| 630 | 1.95312 | 0.00008 |
| 631 | 1.95301 | 0.00008 |
| 632 | 1.9529 | 0.00008 |
| 633 | 1.95279 | 0.00007 |
| 634 | 1.95269 | 0.00007 |
| 635 | 1.95258 | 0.00007 |
| 636 | 1.95248 | 0.00007 |
| 637 | 1.95237 | 0.00007 |
| 638 | 1.95227 | 0.00007 |
| 639 | 1.95216 | 0.00007 |
| 640 | 1.95206 | 0.00007 |
| 641 | 1.95196 | 0.00007 |
| 642 | 1.95186 | 0.00007 |
| 643 | 1.95176 | 0.00007 |
| 644 | 1.95165 | 0.00007 |
| 645 | 1.95155 | 0.00007 |
| 646 | 1.95145 | 0.00007 |
| 647 | 1.95135 | 0.00007 |
| 648 | 1.95125 | 0.00007 |
| 649 | 1.95116 | 0.00007 |

TABLE 15-continued

Refractive indices and dispersion curve for a AlOxNy layer having a thickness of 2000 nm vs. wavelength.

| Wavelength | Refractive Index | Extinction Coefficient |
|---|---|---|
| 650 | 1.95106 | 0.00007 |
| 651 | 1.95096 | 0.00007 |
| 652 | 1.95086 | 0.00006 |
| 653 | 1.95077 | 0.00006 |
| 654 | 1.95067 | 0.00006 |
| 655 | 1.95058 | 0.00006 |
| 656 | 1.95048 | 0.00006 |
| 657 | 1.95039 | 0.00006 |
| 658 | 1.95029 | 0.00006 |
| 659 | 1.9502 | 0.00006 |
| 660 | 1.9501 | 0.00006 |
| 661 | 1.95001 | 0.00006 |
| 662 | 1.94992 | 0.00006 |
| 663 | 1.94983 | 0.00006 |
| 664 | 1.94973 | 0.00006 |
| 665 | 1.94964 | 0.00006 |
| 666 | 1.94955 | 0.00006 |
| 667 | 1.94946 | 0.00006 |
| 668 | 1.94937 | 0.00006 |
| 669 | 1.94928 | 0.00006 |
| 670 | 1.94919 | 0.00006 |
| 671 | 1.94911 | 0.00006 |
| 672 | 1.94902 | 0.00006 |
| 673 | 1.94893 | 0.00006 |
| 674 | 1.94884 | 0.00005 |
| 675 | 1.94876 | 0.00005 |
| 676 | 1.94867 | 0.00005 |
| 677 | 1.94858 | 0.00005 |
| 678 | 1.9485 | 0.00005 |
| 679 | 1.94841 | 0.00005 |
| 680 | 1.94833 | 0.00005 |
| 681 | 1.94824 | 0.00005 |
| 682 | 1.94816 | 0.00005 |
| 683 | 1.94808 | 0.00005 |
| 684 | 1.94799 | 0.00005 |
| 685 | 1.94791 | 0.00005 |
| 686 | 1.94783 | 0.00005 |
| 687 | 1.94774 | 0.00005 |
| 688 | 1.94766 | 0.00005 |
| 689 | 1.94758 | 0.00005 |
| 690 | 1.9475 | 0.00005 |
| 691 | 1.94742 | 0.00005 |
| 692 | 1.94734 | 0.00005 |
| 693 | 1.94726 | 0.00005 |
| 694 | 1.94718 | 0.00005 |
| 695 | 1.9471 | 0.00005 |
| 696 | 1.94702 | 0.00005 |
| 697 | 1.94694 | 0.00005 |
| 698 | 1.94687 | 0.00005 |
| 699 | 1.94679 | 0.00005 |
| 700 | 1.94671 | 0.00005 |
| 701 | 1.94663 | 0.00005 |
| 702 | 1.94656 | 0.00004 |
| 703 | 1.94648 | 0.00004 |
| 704 | 1.94641 | 0.00004 |
| 705 | 1.94633 | 0.00004 |
| 706 | 1.94625 | 0.00004 |
| 707 | 1.94618 | 0.00004 |
| 708 | 1.94611 | 0.00004 |
| 709 | 1.94603 | 0.00004 |
| 710 | 1.94596 | 0.00004 |
| 711 | 1.94588 | 0.00004 |
| 712 | 1.94581 | 0.00004 |
| 713 | 1.94574 | 0.00004 |
| 714 | 1.94566 | 0.00004 |
| 715 | 1.94559 | 0.00004 |
| 716 | 1.94552 | 0.00004 |
| 717 | 1.94545 | 0.00004 |
| 718 | 1.94538 | 0.00004 |
| 719 | 1.94531 | 0.00004 |
| 720 | 1.94524 | 0.00004 |
| 721 | 1.94517 | 0.00004 |
| 722 | 1.9451 | 0.00004 |
| 723 | 1.94503 | 0.00004 |
| 724 | 1.94496 | 0.00004 |
| 725 | 1.94489 | 0.00004 |
| 726 | 1.94482 | 0.00004 |
| 727 | 1.94475 | 0.00004 |
| 728 | 1.94468 | 0.00004 |
| 729 | 1.94461 | 0.00004 |
| 730 | 1.94455 | 0.00004 |
| 731 | 1.94448 | 0.00004 |
| 732 | 1.94441 | 0.00004 |
| 733 | 1.94434 | 0.00004 |
| 734 | 1.94428 | 0.00003 |
| 735 | 1.94421 | 0.00003 |
| 736 | 1.94415 | 0.00003 |
| 737 | 1.94408 | 0.00003 |
| 738 | 1.94401 | 0.00003 |
| 739 | 1.94395 | 0.00003 |
| 740 | 1.94388 | 0.00003 |
| 741 | 1.94382 | 0.00003 |
| 742 | 1.94376 | 0.00003 |
| 743 | 1.94369 | 0.00003 |
| 744 | 1.94363 | 0.00003 |
| 745 | 1.94356 | 0.00003 |
| 746 | 1.9435 | 0.00003 |
| 747 | 1.94344 | 0.00003 |
| 748 | 1.94338 | 0.00003 |
| 749 | 1.94331 | 0.00003 |
| 750 | 1.94325 | 0.00003 |
| 751 | 1.94319 | 0.00003 |
| 752 | 1.94313 | 0.00003 |
| 753 | 1.94307 | 0.00003 |
| 754 | 1.94301 | 0.00003 |
| 755 | 1.94294 | 0.00003 |
| 756 | 1.94288 | 0.00003 |
| 757 | 1.94282 | 0.00003 |
| 758 | 1.94276 | 0.00003 |
| 759 | 1.9427 | 0.00003 |
| 760 | 1.94264 | 0.00003 |
| 761 | 1.94259 | 0.00003 |
| 762 | 1.94253 | 0.00003 |
| 763 | 1.94247 | 0.00003 |
| 764 | 1.94241 | 0.00003 |
| 765 | 1.94235 | 0.00003 |
| 766 | 1.94229 | 0.00003 |
| 767 | 1.94223 | 0.00003 |
| 768 | 1.94218 | 0.00003 |
| 769 | 1.94212 | 0.00003 |
| 770 | 1.94206 | 0.00003 |
| 771 | 1.94201 | 0.00003 |
| 772 | 1.94195 | 0.00003 |
| 773 | 1.94189 | 0.00003 |
| 774 | 1.94184 | 0.00003 |
| 775 | 1.94178 | 0.00003 |
| 776 | 1.94172 | 0.00003 |
| 777 | 1.94167 | 0.00003 |
| 778 | 1.94161 | 0.00002 |
| 779 | 1.94156 | 0.00002 |
| 780 | 1.9415 | 0.00002 |
| 781 | 1.94145 | 0.00002 |
| 782 | 1.94139 | 0.00002 |
| 783 | 1.94134 | 0.00002 |
| 784 | 1.94129 | 0.00002 |
| 785 | 1.94123 | 0.00002 |
| 786 | 1.94118 | 0.00002 |
| 787 | 1.94113 | 0.00002 |
| 788 | 1.94107 | 0.00002 |
| 789 | 1.94102 | 0.00002 |
| 790 | 1.94097 | 0.00002 |
| 791 | 1.94091 | 0.00002 |
| 792 | 1.94086 | 0.00002 |
| 793 | 1.94081 | 0.00002 |
| 794 | 1.94076 | 0.00002 |
| 795 | 1.94071 | 0.00002 |
| 796 | 1.94066 | 0.00002 |

TABLE 15-continued

Refractive indices and dispersion curve for a AlOxNy layer having a thickness of 2000 nm vs. wavelength.

| Wavelength | Refractive Index | Extinction Coefficient |
|---|---|---|
| 797 | 1.9406 | 0.00002 |
| 798 | 1.94055 | 0.00002 |

Modeled Example 11 is an article having a structure as shown in Table 16 and includes a chemically strengthened ABS glass substrate and an anti-reflection coating disposed on the substrate. The anti-reflection coating materials and thicknesses of each layer of material, in the order arranged in the anti-reflection coating, are provided in Table 16.

TABLE 16

Structure of Modeled Example 11, in pristine condition.

| Material | Thickness (nm) |
|---|---|
| Air | Immersed |
| $SiO_2$ | 95 |
| $AlO_xN_y$ | 167 |
| $SiO_2$ | 31 |
| $AlO_xN_y$ | 37 |
| $SiO_2$ | 57 |
| $AlO_xN_y$ | 14 |
| ABS glass | immersed |

Figure 14A:
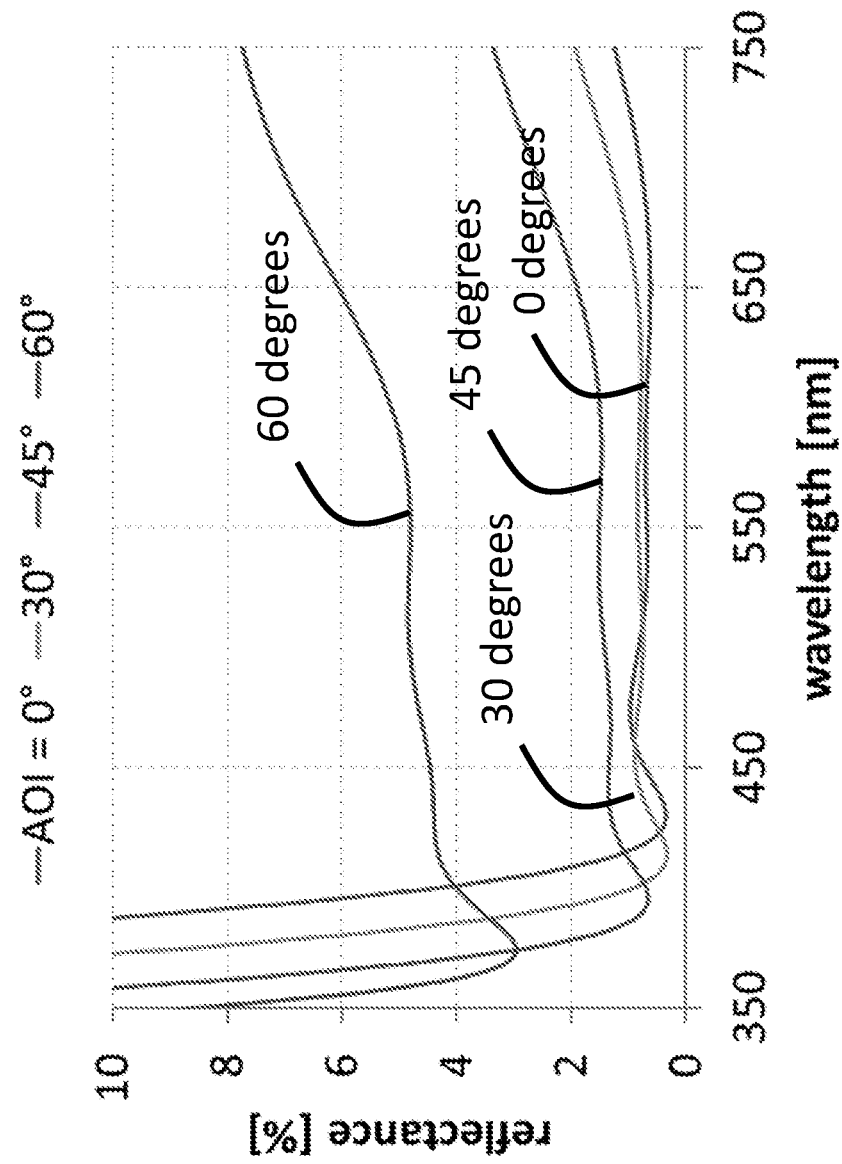
FIG. 14A is a graph of reflectance spectra of Modeled Example 11 at different incident illumination angles.
Figure 14B:
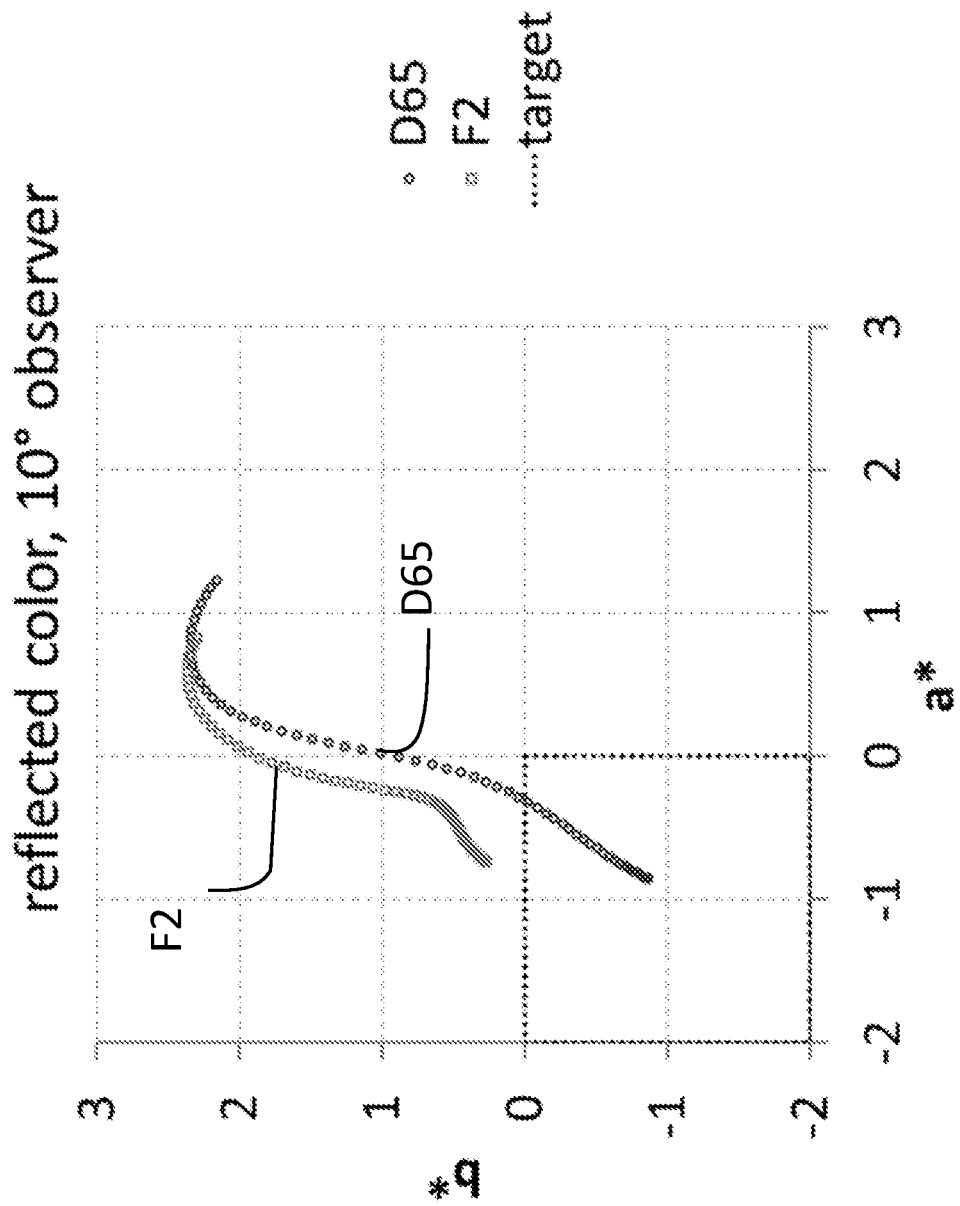
FIG. 14B is graph showing the a* and b* coordinates for Modeled Example 11 at different incident illumination angles and under illuminants D65 and F2.

FIG. 14A illustrates the change in modeled reflectance of the coated surface of Modeled Example 11 in pristine condition, at different incident illumination angles. FIG. 14B illustrates the a* and b* color coordinates in reflection of the coated surface under a 10 degree observer and under a D65 illuminant and F2 illuminant.

Modeled Example 12 is an article having a structure as shown in Table 17 and includes a chemically strengthened ABS glass substrate and an anti-reflection coating disposed on the substrate. The anti-reflection coating materials and thicknesses of each layer of material, in the order arranged in the anti-reflection coating, are provided in Table 17.

TABLE 17

Structure of Modeled Example 12, in pristine condition.

| Material | Thickness (nm) | Refractive Index | Extinction Coefficient | Optical Thickness (FWOT) |
|---|---|---|---|---|
| Air | Immersed | 1 | 0 | |
| $SiO_2$ | 107 | 1.4764 | 0.00005 | 0.2867163 |
| $AlO_xN_y$ | 44 | 1.98107 | 0 | 0.15888173 |
| $SiO_2$ | 10 | 1.4764 | 0.00005 | 0.02754151 |
| $AlO_xN_y$ | 86 | 1.98107 | 0 | 0.31124395 |
| $SiO_2$ | 26 | 1.4764 | 0.00005 | 0.06990069 |
| $AlO_xN_y$ | 27 | 1.98107 | 0 | 0.09595578 |
| $SiO_2$ | 47 | 1.4764 | 0.00005 | 0.12707752 |
| $AlO_xN_y$ | 9 | 1.98107 | 0 | 0.03083264 |
| ABS glass | Immersed | 1.51005 | 0 | |

Figure 15A:
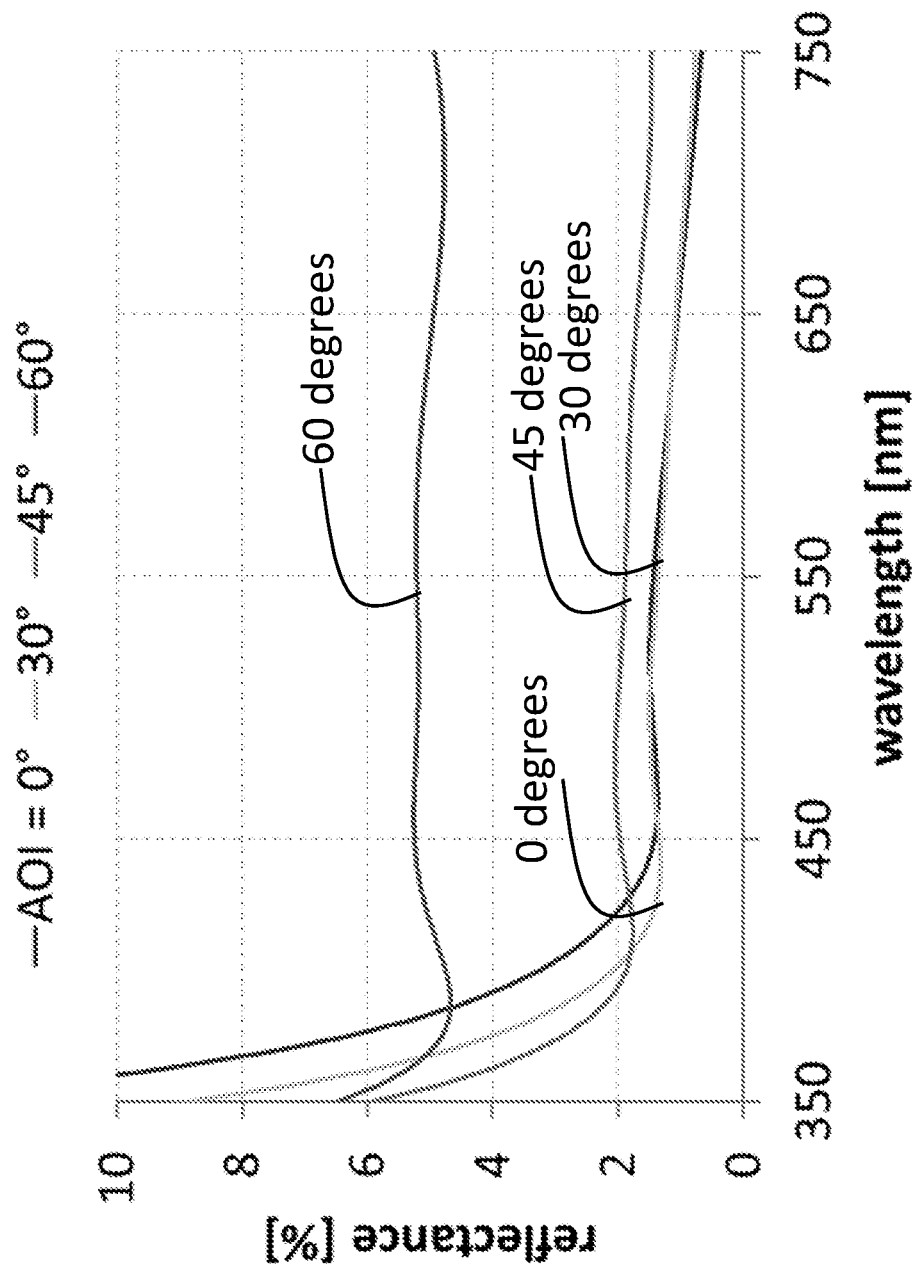
FIG. 15A is a graph of reflectance spectra of Modeled Example 12 at different incident illumination angles.
Figure 15B:
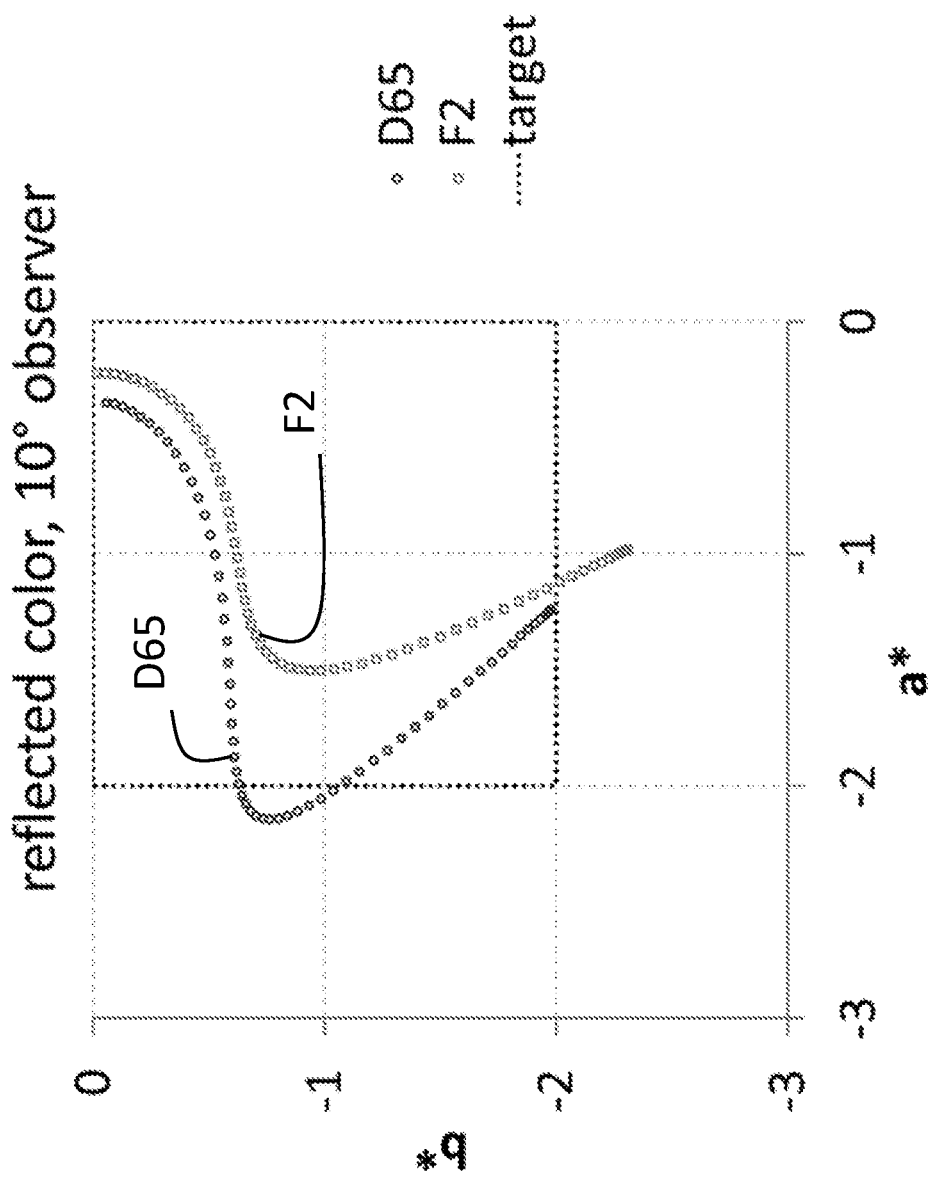
FIG. 15B is graph showing the a* and b* coordinates for Modeled Example 12 at different incident illumination angles and under illuminants D65 and F2.

FIG. 15A illustrates the change in modeled reflectance of the coated surface of Modeled Example 12 in pristine condition, at different incident illumination angles. FIG. 15B illustrates a* and b* color coordinates in reflection of the coated surface under a 10 degree observer and under a D65 illuminant and F2 illuminant.

As shown in the Examples, where surface defects including surface thickness removal are evaluated, as the surface thickness increased from 0 nm up to about 150 nm, the reflectance tends to increase and the reflected color also changes continuously or quasi-continuously, as shown in Figures. No discontinuous jumps in the reflectance, contrast ratios, or color shifts were observed at any surface thickness removal.

Without being bound by theory, it is believed that the lower absolute reflectance of some anti-reflection coatings according to one or more embodiments having a surface defect of the addition of a fingerprint droplet (when compared to higher reflectance observed in a conventional anti-reflection coatings with the same fingerprint residue) may be explained by a lower reflectance at the interface between the fingerprint droplet and anti-reflection coating according to one or more embodiments as compared to the interface between the fingerprint residue and conventional anti-reflection coating, as shown in FIGS. 11A-B, 12A-B and 13A-B. Stated another way, because the conventional anti-reflection coating is more perfectly impedance-matched to air, it is less perfectly impedance-matched to fingerprint oils. While the anti-reflection coatings according to one or more embodiments may be less perfectly impedance-matched to air, they can be more perfectly impedance-matched to fingerprint oils, resulting in a lower total reflectance, as compared to a conventional anti-reflection coatings, when both are combined with a surface defect including a fingerprint droplet having a finite thickness (e.g., from about 100 nm to about 2000 nm) disposed on the coated surface and surrounded by air.

Without being bound by theory, some embodiments of the anti-reflection coatings described herein may exhibit a higher reflectance at some visible wavelengths; however at the system level (i.e., when combined with other elements of a display or electronic device), this increase in reflectance can be less significant than it appears at the component level (i.e., in the article without the other elements of a display or electronic device). Specifically, buried surface reflections in the range from about 0.5% to about 3% are common in displays, even those that have a directly adhesive-bonded cover material. A display device having buried surface reflections of about 2% will have a total reflectance of about 2.1% when combined with a conventional anti-reflection coating having reflectance of 0.1%. Accordingly, the same display device will have a total reflectance of 3.2% when combined with an anti-reflection coating according to one or more embodiments having reflectance of 1.2%. This difference is relatively small, and both coatings impart substantially lower reflectance than the same display system would have without any anti-reflection coating (i.e., uncoated glass exhibits about 6% reflectance and uncoated sapphire exhibits about 10% reflectance).

The anti-reflection coating designs described herein can be adjusted to accommodate surface defects of different sizes or having refractive indices. For example, the thicknesses of the layers can be adjusted without departing from the spirit of the invention. In one example, the anti-reflection coating could include a scratch resistant layer that is 2000 nm thick; however this layer may be made thinner (e.g., in the range from about 100 nm to about 2000 nm), while still providing some resistance to scratch, abrasion, or damage events, potentially including drop events such as when an article is dropped onto a hard surface such as asphalt, cement, or sandpaper. In other examples, the scratch resistant layer can be made thicker (e.g., in the range from about 2000 nm to about 10000 nm thick). The top layer of the anti-reflection coating (which includes $SiO_2$ in the examples) can have varying thicknesses. In one embodiment, the thickness is in the range from about 1 nm to about 200 nm. A top SiO$_2$ layer can also provide compatibility with additional coatings disposed on the anti-reflection coating such as silane-based low-friction coating layers, including fluorosilane layers, alkyl silane layers, silsesquioxane layers, and the like, that may be formed by liquid deposition or vapor deposition means.

It will be apparent to those skilled in the art that various modifications and variations can be made without departing from the spirit or scope of the invention.

What is claimed is:

1. An article comprising:
a substrate having a substrate surface; and
an anti-reflection coating disposed on the substrate surface forming a coated surface, wherein the anti-reflection coating comprises a first low RI sub-layer and a second high RI sub-layer,
wherein the first low RI sub-layer comprises SiO$_2$,
wherein the second high RI sub-layer comprises Si$_u$Al$_v$O$_x$N$_y$, AlO$_x$N$_y$, or combinations thereof,
wherein the coated surface exhibits a first average reflectance when the coated surface is in a pristine condition, and a second average reflectance after removal of a surface thickness of about 20 nm to about 500 nm of the anti-reflection coating from the coated surface that provides a contrast ratio (the second average reflectance: the first average reflectance) in the range from about 0.5 to about 10, over the visible spectrum, wherein the anti-reflection coating has a thickness that is greater than the surface thickness and wherein the reflectance is measured under a CIE illuminant.

2. The article of claim 1, wherein the first average reflectance is in the range from about 0.6% to about 6% over at least a portion of the visible spectrum in the range from about 450 nm to about 650 nm and the second average reflectance is about 8% or less over the visible spectrum.

3. The article of claim 1, wherein the anti-reflection coating comprises a first layer disposed on the substrate surface and a second layer having a layer thickness disposed on the first layer, wherein the surface thickness is greater than or equal to the layer thickness of the second layer.

4. The article of claim 1, wherein at least one of the first reflectance and the second reflectance comprises an average oscillation amplitude of about 2% absolute reflectance or less, over the visible spectrum.

5. The article of claim 4, wherein over a wavelength width of about 100 nm within the visible spectrum, at least one of the first reflectance and the second reflectance comprises a maximum oscillation amplitude of about 2% absolute reflectance or less.

6. The article of claim 4, wherein the reflectance is measured at an incident illumination angle in the range from about 0 degrees to about 60 degrees.

7. The article of claim 4, wherein at least one of the first reflectance and the second reflectance comprises reflectance oscillations of less than 20% relative to a mean reflectance value, over the visible spectrum.

8. The article of claim 7, wherein the second average reflectance is less than about 3%.

9. The article of claim 8, wherein the surface thickness is about 20 nm to about 25 nm, wherein the second average reflectance comprises about 6% or less, and wherein the coated surface exhibits a contrast ratio (the second average reflectance: the first average reflectance) in the range from about 0.5 to about 10, over the visible spectrum.

10. The article of claim 8, wherein the surface thickness is about 20 nm to about 50 nm, wherein the second average reflectance comprises about 8% or less, and wherein the coated surface exhibits a contrast ratio (the second average reflectance: the first average reflectance) in the range from about 0.5 to about 20, over the visible spectrum.

11. The article of claim 8, wherein the surface thickness is about 20 nm to about 500 nm, wherein the second average reflectance comprises about 12% or less, and wherein the coated surface exhibits a contrast ratio (the second average reflectance: the first average reflectance) in the range from about 0.5 to about 50, over the visible spectrum.

12. The article of claim 8, wherein the coated surface exhibits a contrast ratio of (the second average reflectance: the first average reflectance) of about less than 10, over the visible spectrum, and wherein the first average reflectance and the second average reflectance are measured under an incident illumination angle in the range from about 0 degrees to about 60 degrees.

13. The article of claim 8, wherein the contrast ratio comprises oscillations having an average amplitude of about 1 or less in absolute ratio units, over the visible spectrum.

14. The article of claim 1, wherein the first average reflectance and the second average reflectance are measured under an incident illumination angle in the range from about 0 degrees to about 60 degrees.

15. An article comprising:
a substrate having a surface; and
an anti-reflection coating disposed on the surface forming a coated surface,
wherein the anti-reflection coating comprises a first low RI sub-layer and a second high RI sub-layer,
wherein the first low RI sub-layer comprises SiO$_2$,
wherein the second high RI sub-layer comprises Si$_u$Al$_v$O$_x$N$_y$, AlO$_x$N$_y$, or combinations thereof,
wherein the coated surface of the article exhibits a first average reflectance in the range from about 0.6% to about 6.0% over a visible spectrum in the range from about 450 to about 650 nm as tested when the article is in a pristine condition, and a second average reflectance of about 10% or less over the visible spectrum as tested when the coated surface comprises a layer of fingerprint-simulating medium having a thickness in the range from about 100 nm to about 2000 nm, wherein the fingerprint-simulating medium comprises a refractive index of 1.4-1.6.

16. The article of claim 15, wherein the ratio of the second average reflectance: the first average reflectance is about 20 or less, and the ratio comprises oscillations having an average amplitude of about 10 or less in absolute ratio units, over the visible spectrum.

17. The article of claim 15, wherein when the coated surface comprises the layer of fingerprint-simulating medium, the coated surface comprises a maximum reflectance value of about 8% absolute reflectance or less and a maximum oscillation amplitude of about 7.5% absolute reflectance or less, across the visible spectrum.

18. The article of claim 1,
wherein the coated surface exhibits a first color coordinate (a*$_1$, b*$_1$), when measured using an incident illumination angle in the range from about 0 degrees to about 75 degrees from normal incidence under an illuminant in a pristine condition, and a second color coordinate (a*$_2$, b*$_2$), when measured using the incident illumination angle under the illuminant after removal of a surface thickness in the range from about 0.1 nm to about 140 nm of the anti-reflection coating from the coated surface, and
wherein Δa*b* is about 6 or less.

19. The article of claim 18, wherein the article exhibits a hardness of about 5 GPa or greater as measured on the coated surface by a Berkovitch Indentation Hardness test over an indentation depth of about 100 nm or greater from the coated surface.

20. The article of claim 19, wherein the incident illumination angle is about 60 degrees, wherein the surface thickness is in a range from about 0.1 to about 100 nm, and wherein Δa*b* is less than about 3.

* * * * *

UNITED STATES PATENT AND TRADEMARK OFFICE
CERTIFICATE OF CORRECTION

PATENT NO. : 10,620,344 B2
APPLICATION NO. : 15/313733
DATED : April 14, 2020
INVENTOR(S) : Shandon Dee Hart et al.

Page 1 of 1

It is certified that error appears in the above-identified patent and that said Letters Patent is hereby corrected as shown below:

In the Claims

In Column 53, Lines 25-26, Claim 1, delete "reflectance: the" and insert -- reflectance:the --, therefor.

In Column 55, Line 3, Claim 19, delete "Berkovitch" and insert -- Berkovich --, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*